United States Patent
Yoshida et al.

(10) Patent No.: US 6,291,959 B1
(45) Date of Patent: Sep. 18, 2001

(54) METHOD AND APPARATUS FOR CONTROLLING NUMERICALLY CONTROLLED MACHINE TOOL

(75) Inventors: Jun Yoshida; Yoshikatsu Teraoka; Norio Mori, all of Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 09/529,538

(22) PCT Filed: Sep. 17, 1999

(86) PCT No.: PCT/JP99/05094

§ 371 Date: Apr. 7, 2000

§ 102(e) Date: Apr. 7, 2000

(87) PCT Pub. No.: WO00/56500

PCT Pub. Date: Sep. 28, 2000

(30) Foreign Application Priority Data

Mar. 24, 1999 (JP) ................................. 11-080055

(51) Int. Cl.⁷ .................................... G05B 19/18
(52) U.S. Cl. .................... 318/569; 318/567; 318/568.11; 700/108
(58) Field of Search .................... 318/567, 569, 318/568.11; 700/108

(56) References Cited

U.S. PATENT DOCUMENTS

| | | | |
|---|---|---|---|
| 3,725,651 | * 4/1973 | Cutler | 235/151.11 |
| 4,041,287 | * 8/1977 | Kolell et al. | 235/151.11 |
| 4,628,233 | * 12/1986 | Bradus | 318/306 |
| 5,073,748 | * 12/1991 | Boehm | 318/569 |
| 5,444,343 | * 8/1995 | Enomoto et al. | 318/568.11 |
| 5,923,132 | * 7/1999 | Boyer | 318/34 |
| 6,008,609 | * 12/1999 | Sawashima et al. | 318/570 |

FOREIGN PATENT DOCUMENTS

| | | |
|---|---|---|
| 58-155143 | 9/1983 | (JP) . |
| 3-163603 | 7/1991 | (JP) . |
| 4-57107 | 2/1992 | (JP) . |
| 4-315552 | 11/1992 | (JP) . |
| 6-289917 | 10/1994 | (JP) . |
| 4-88506 | 3/1995 | (JP) . |
| 7-308846 | 11/1995 | (JP) . |
| 9-91025 | 4/1997 | (JP) . |
| 9-179603 | 7/1997 | (JP) . |
| 9-179623 | 7/1997 | (JP) . |

* cited by examiner

Primary Examiner—Robert E. Nappi
Assistant Examiner—Rita Leykin
(74) Attorney, Agent, or Firm—Paul & Paul

(57) ABSTRACT

A method and an apparatus for controlling a numerically controlled machine tool, wherein the heat generation amount and the temperature of a drive unit including a servo amplifier 15b and a feed shaft motor 3 are computed by a drive unit heat generation amount computing unit 31 by simulation, and from the computed heat generation amount and the computed temperature, the total heat generation amount of the drive unit, the cutting feed heat generation amount, the cutting load heat generation amount, etc. are computed by a feed heat generation amount computing unit 39, so that the cutting feed rate override value of the numerically controlled machine tool 1 is computed by a cutting feed rate override computing unit 27 and effectuated by being output to a NC unit. Further, based on the temperature of the drive unit computed by a computing unit 31 or the temperature computed by a temperature data computing unit 47 or the temperature detected by a temperature detection sensor 49, etc., the proper values of the feed acceleration/deceleration time constants τr and τc are computed and output as a ratio with respect to the set and stored initial values τr0 and τc0 thereby to control the NC commanded rate. The overheating of the feed axis drive unit is prevented while at the same time improving the machining efficiency.

20 Claims, 30 Drawing Sheets

METHOD AND APPARATUS FOR CONTROLLING NUMERICALLY CONTROLLED MACHINE TOOL

TECHNICAL FIELD

The present invention relates generally to a method and an apparatus for controlling a numerically controlled machine tool or, in particular, to a method and an apparatus for controlling a numerically controlled machine tool wherein the machining operation is performed by numerically controlling the feed operation of a plurality of feed axes while preventing an alarm which otherwise might be issued due to the overheating of the drive means of each feed axis, thus making it possible to carry out the machining operation at as high a speed as possible to realize an improved machining efficiency. The above-described machine tool is not limited to a machine tool used only for cutting or grinding, but includes a punch press machine having a feed axis mechanism with a feed motor and a laser beam machine for machining a work with a high energy laser beam. The present invention is widely applicable to machine tools including these machines.

PRIOR ART

Consideration will be given to a typical machine tool for performing the cutting or grinding operation. In the case where the machining operation of the machine tool is numerically controlled, as is well known, a feed motor for each of a plurality of feed axes is controlled, with the rotation of the main spindle of the machine tool, in accordance with a numerical control program (NC program) which is input to a numerical control unit (NC unit) in advance, and the relative machining operation between the work and the machining tool (hereinafter referred to simply as the tool) is controlled so that the desired machining operation is performed on the work based on the machining program.

In this type of numerically controlled machine tool, it is indispensable for securing the machining precision to accurately control the operation of each feed motor for driving the feed operation along each feed axis. At the same time, it is crucial to prevent overheating of the respective feed motors, thereby protecting the machine from breakage or malfunction, in order to achieve a high efficiency in the machining operation.

A basic configuration of a numerically controlled machine tool will be considered hereinbelow. Generally, the numerically controlled machine is provided with a machine tool, a numerical control unit, a machine control unit and an electric power unit. The numerical control unit includes a program read-interpret unit for reading and interpreting the NC program, an interpreted program storage unit for temporarily storing an interpreted program, a program execution command unit for fetching the stored program from the interpreted program storage unit whenever necessary and issuing execution program data, an interpolation and acceleration/deceleration control unit for computing by interpolation the travel data of the operation designated by the NC program, distributing the travel data to each feed axis and controlling the acceleration and deceleration of each feed axis, and a servo control unit for issuing a position command and for correcting the position command and the speed command in accordance with a feedback signal. The servo control unit, in turn, includes a control unit for outputting a motor command signal and a servo amplifier for amplifying the output of the control unit and generating a motor drive current, wherein the current generated by the servo amplifier is used for controlling and driving each of the feed motors of the machine tool.

Also, the machine body of the machine tool includes a main spindle having a tool or the like mounted thereon and rotationally driven by the spindle motor, a spindle head for rotatably supporting the main spindle, a feed motor configured with a servo motor for driving the feeding operation of each of a plurality of feed axes described above, a position detector provided for each feed axis to detect the current position data with the feeding operation of each feed axis, and a worktable having appropriately mounted thereon a workpiece to be machined and adapted to travel along a plurality of feed axes with respect to the base of the machine body. The main spindle motor, each feed motor and the position detector are connected to the numerical control unit, the machine control unit and the electric power unit through a signal line and a power line. The servo amplifier for the numerical control unit described above supplies a desired amount of electric drive current to each feed motor of the machine body of the machine tool, based on the power introduced from the electric power unit, and each feed motor is driven so as to set the tool at a desired machining position. Also, the tool and the workpiece are moved relatively along the feed axes so that the machining operation such as cutting or grinding of the workpiece is performed. In the present invention, all elements for drive use, including the servo amplifier of the servo control unit provided for the numerical control unit and the feed motor supplied with the electric drive current from the servo amplifier, are collectively called a drive means for a feed axis or feed axes.

Now, the drive means of a feed axis, which includes a servo amplifier and a feed motor provided for a numerically controlled machine tool, is basically designed to be capable of exhibiting a sufficient machining performance at a rated current value. As long as the machine tool is operated or driven at or below the rated current value, continuous operation is possible, but in a case where the rated current is exceeded, a discontinuous operation may be permitted. When the operation exceeding the rated current occur frequently, the heat generation by the feed motor increases, so that the motor-temperature MT of the feed motor for the feed axis exceeds a tolerable motor-temperature MTa, determined to maintain the desired motor performance. In such a case, therefore, an alarm signal indicating overheating is generated to stop the operation of the feed motor. FIG. 11, in which the abscissa represents the time T and the ordinate the motor temperature MT, shows temperature curves for three cases including (I) the case in which the machine tool is operated without controlling the heat generation amount of the feed motor, (II) the case in which the machine tool is operated by maintaining a rated heat generation amount determined from the design, and (III) the case in which the machine tool is operated while controlling the tolerable heat generation amount in accordance with the motor temperature of the feed motor. In the case (I) where the heat generation amount is not controlled, the motor temperature MT quickly exceeds the tolerable motor-temperature MTa. In the case (II) where the machine tool is operated to maintain a rated amount of heat generation or in the case (III) where the machine tool is operated to control the tolerable amount of heat generation in accordance with the motor temperature, however, it is found that the operation can be continued without exceeding the tolerable motor-temperature MTa.

The feeding operation performed by each of the feed motors, on the other hand, includes a machining-feed in which the tool engaging a workpiece is fed to perform the machining operation, and a rapid-feed for quickly accomplishing the positioning operation for determining the relative positions of the tool and the workpiece along each of the feed axes. The rapid-feed is a non-machining operation, and therefore desirably contributes to the improvement in the machining efficiency by increasing the speed thereof as far as possible. In fact, the acceleration or deceleration of the rapid-feed causes an electric current flow three or four times as large as the rated current in the feed motor. The drive means is, however, so configured that unless the electric current value averaged for a predetermined elapsed time exceeds the rated current value, the temperature of the feed motor does not increase beyond the tolerable motor-temperature $MT_a$ to such a level as to cause an overheating.

The high-speed machines currently provided are intended to increase the speed of rotation of the main spindle in order to improve the machining efficiency and also to increase the speed of the feeding operation.

However, the machining conditions required for the numerically controlled machine tool, such as implementing of quick acceleration or deceleration of the rapid feed and the machining feed, machining of workpiece stock lacking good machinability, and acquiring of a complicated machined contour in a workpiece are so severe that the electric current supplied for the operation of the feed motors often exceeds the rated current during a machining operation with a large machining load. The result is often that, in both the rapid feed and the machining feed, even the average current value described above exceeds the rated current value. In other words, the feeding operation accompanied by a rise and fall in short cycles is repeatedly commanded, with the result that the temporal average current value of the drive means exceeds the rated current. Consequently, the drive means including the servo amplifier and the feed motor exceeds the tolerable temperature, with the occasional result that the machine is stopped, by an alarm, to stop the machining operation.

Once the machine tool stops during the machining operations, not only the machining efficiency is deteriorated but also a generation of defective workpiece occurs, and in the case of unmanned operations, the machine tool is left stationary for a long time before the operation is restored by the operator. In the prior art, in order to avoid this inconvenience, the servo amplifier or the servo motor having an unnecessary large capacity has been employed or the numerical control program is produced by the programmer to allow some time margin for reducing the chance of frequent acceleration or deceleration. In other words, there still remains a strong demand for the provision of a method and an apparatus, for performing the feeding operation of the numerically controlled machine tool, which are capable of obtaining a high machining efficiency with the positive intention to increase the speed of both rapid feed and machining feed and are thus applicable to the machining operation under severe machining conditions with a large machining load.

Such being the situation, in the current technical field of numerically controlling the operation of a drive means for a numerically controlled machine tool and an industrial robot, various propositions have been made especially to shorten the tact time by optimizing the operation of the drive motor providing the drive means on the one hand and to improve the security of the machine tools and robots as well as the drive motor on the other hand.

Specifically, Japanese Unexamined Patent publication (Kokai) No. 6-289917 discloses a method of controlling the feed motor of the machine tool, including a servo motor, intended to improve the machining precision and the security of the tools and the machine by reducing the feeding rate or stopping the machining operation with the increase in a load applied to a feed axis. In the method of controlling the feed motor the feed motor control system includes a disturbance estimating means for estimating the disturbance load torque, which is supplied with a command torque for the feed motor and an actual speed of the feed motor to compute and estimate the total disturbance torque. An amount equivalent to the friction torque due to dynamic friction is subtracted from the estimated total disturbance torque. Thus, the estimated disturbance torque, i.e. a disturbance load is determined and written in a memory. Then, it is determined at what level the estimated disturbance torque is located relative to an upper limiting value preset for stopping the machining operation and a lower limiting value for preventing the deterioration of the machining precision. In this way, an override value with respect to the commanded feeding rate is adjusted, and when the lower limiting value is exceeded, the speed of the feed motor is reduced. If the estimated disturbance torque is reduced below the low limiting value as a result, the override value is adjusted again to increase the speed of the feed motor in a feed axis while continuing the machining operation and to maintain the machining precision. In the case where the estimated disturbance torque has exceeded the upper limiting value, on the other hand, the feed motor in the feed axis is stopped to protect the tools and workpiece and the machine from an abnormal load.

In the method of controlling the feed motor by the estimated disturbance torque disclosed in Japanese Unexamined Patent Publication (Kokai) No. 6-289917 described above, a load imposed on the feed motor is estimated by a special disturbance estimating observer means from the speed command value and the feedback value of the actual speed data of the feed motor, and the estimated value is compared with a preset reference value thereby to determine and control the speed of the feed motor. In this way, the operating condition of the feed motor is determined only from the speed, and therefore the operation is not controlled taking into consideration the thermal factors of the feed motor and the motor drive amplifier constituting the drive means of the machine tool. The resulting problem is that, especially in the case where a numerically controlled machine tool is operated as a high-speed machine for a long time, the drive means is not necessarily properly controlled. Another problem is the lack of versatility arising from the use of the special means called the disturbance estimating observer means.

On the other hand, a method has been proposed for adequately controlling the drive motor of the machine by taking a thermal limit into consideration, in controlling the operation of the drive motor.

Specifically, Japanese Unexamined Patent publication (Kokai) No. 9-91025 discloses method of controlling a drive motor for driving a joint of an industrial robot about its own axis, in the shortest possible time, taking the thermal limitation into consideration. In the control method, for controlling the drive of the drive motor and controlling the robot operation for the shortest possible time, a time constant in the acceleration/deceleration of the drive motor is shortened to assure the shortest cycle time, while at the same time monitoring heat generation of the motor during the regenerating operation of the robot to take the thermal limitation of the motor into consideration. Using the result of this monitor operation, the time constant in the acceleration/ deceleration is adjusted in steps, as required. In this way, according to this technique, the drive motor of each axis can be operated within the range of thermal limitation.

In the method of controlling the robot drive motor for the shortest possible length of time disclosed in Japanese Unexamined Patent publication (Kokai) No. 0-91025, however, the robot regenerating operation is carried out several times by repeating the operating cycles, from which the thermal limitation, i.e. the tolerable range in an amount of heat generation of the drive motor for each axis is determined. Therefore, in an application of this technique to the machine tool, for example, the operating cycle is repeated and the heat generation of the drive motor is monitored each time the machining condition or the machining load undergoes a change, thereby making it difficult to accomplish an efficient machining operation.

Further, the machining operation by a numerically controlled machine tool often lasts for a long time, and often has an extremely long operating cycle as compared with the operating cycle of industrial robots. Therefore, it is considered inadequate to use the control method of Japanese Unexamined Patent publication (Kokai) No. 9-91025 described above for determining the thermal condition of the drive means for the machining operation of a numerically controlled machine tool.

On the other hand, Japanese Unexamined Patent Publication (Kokai) No. 9-179623 of the present applicant has disclosed an invention relating to a method and an apparatus for numerically controlling a machining apparatus without overheating the drive means even after continuous high-speed operation repeating acceleration and deceleration of the drive means of the feed axes at the time of rapid feed. In this particular invention, the temperature of the drive means including a motor drive amplifier and a feed motor for each axis of the drive system of the machining apparatus is predictively computed according to the electric current data or the torque command data fed back to a temperature data computing unit from a servo control unit, and thus temperature data is produced. This temperature data is compared with a predetermined temperature data tolerable for the drive means stored in a data storage unit in advance, by an acceleration/deceleration time constant computing unit connected to the temperature data computing unit, and in accordance with the result of comparison, the acceleration/deceleration time constant of any particular feed axis is changed. Thus, in the disclosed method and apparatus for controlling a numerically controlled machining apparatus operable with high efficiency, the thermal conditions of the drive means are taken into account, so that the machining apparatus can be operated continuously without overheating the drive means or reducing the commanded feeding rate. The acceleration/deceleration time constant in this case is a constant to determine an acceleration when a feeding speed in a feed axis is changed, and the constant is closely associated with a time required for changing the feeding speed in the feed axis.

The aforementioned invention can be regarded to include the technical means for permitting a continuous high-speed operation of the drive means without overheating by changing the acceleration/deceleration time constant while taking the thermal factors into consideration, and thus can be considered as being highly advantageous in that when it is applied to the numerically controlled machine tool an efficient machining operation can be performed even under severe machining conditions and heavy machining load, such as machining of a workpiece into one having a complicated shape, rigid dimensional requirements in machining of a workpiece, and worse machinability of a workpiece stock.

Nevertheless, the invention relating to a method and an apparatus for numerically controlling a machining apparatus, provided by the present applicant and described above, emphasizes only temperature data of the drive means and fails to take into consideration a change in the mode of the rapid feed of the drive means and the machining feed for the machining operations such as cutting, grinding, laser beam machining and the punch press or the heat generation amount of the drive means. Therefore, it is desired to provide a method and an apparatus for more precisely controlling the drive means in each of the feed axes.

DISCLOSURE OF THE INVENTION

Accordingly, an object of the present invention is to advance a further step from the aforementioned invention relating to a method and an apparatus for numerically controlling a machining system proposed by the present applicant, i.e., to provide a method and an apparatus, for controlling a numerically controlled machine tool, in which a rapid feed and a machining feed are driven by the drive means of each of the feed axes and the machining operation can be continued for long time with a high machining efficiency without causing overheating even under repetitive heavy machining loads.

In view of the above-described object of the present invention, in accordance with one aspect of the present invention, there is provided a method of controlling a numerically controlled machine tool by performing a numerical control program supplied from a read and interpret unit of a numerical control unit to control a drive means of at least one feed axis via an execution command unit, an interpolation unit and a servo control unit, comprising the steps of:

presetting acceleration/deceleration time constants for rapid feed and cutting feed of the feed axis, and data on predetermined temperature and heat generation amount tolerable for the drive means of said feed axis;

computing a temperature of said drive means based on control data of said numerical control program;

determining a heat generation amount tolerable for said drive means in accordance with the computed temperature of said drive means;

computing a total amount of heat generation of said drive mean within a predetermined time, a rapid feed heat generation amount within a predetermined time during a rapid feed operation and a cutting feed heat generation amount within a predetermined time during a cutting feed operation, based on the control data of the numerical control program;

comparing each of the computed total heat generation amount within the predetermined time, the rapid feed heat generation amount within the predetermined time and the cutting feed heat generation amount within the predetermined time with the afore-determined tolerable heat generation amount, respectively; and controlling an acceleration/deceleration time constant for at least one of the rapid feed operation and the cutting feed operation of the feed axis in accordance with the result of comparison.

In accordance with another embodiment of the present invention, there is provided a method of controlling a numerically controlled machine tool by performing a numerical control program supplied from a read and interpret unit of a numerical control unit so as to control a drive means of at least one feed axis via an execution command unit, an interpolation unit and a servo control unit, comprising the steps of:

presetting acceleration/deceleration time constants for rapid and cutting feed operations of the feed axis, a cutting feed rate, and predetermined temperature and heat generation amount data tolerable for said drive means of the feed axis;

computing a temperature of said drive means based on the control data in said numerical control program;

determining an amount of heat generation tolerable for said drive means in accordance with the computed temperature of said drive means;

computing, during the cutting feed operation, a cutting feed heat generation amount and a cutting load heat generation amount in response to a cutting load, based on control data of the numerical control program;

comparing the determined tolerable heat generation amount with the computed cutting feed heat generation amount; and controlling a cutting feed rate of said feed axis from the result of said comparing step while taking a ratio that the computed amount of the cutting load heat generation represents of the cutting feed heat generation amount into consideration.

In accordance with still another embodiment of the present invention, there is provided a method of controlling a numerically controlled machine tool by performing a numerical control program supplied from a read and interpret unit of a numerical control unit so as to control a drive means of at least one feed axis, via an execution command unit, an interpolation unit and a servo control unit, comprising the steps of:

presetting acceleration/deceleration time constants $\tau_{r0}$ and $\tau_{C0}$ during rapid and cutting feed operations, respectively, of the feed axis, and temperature data representing a predetermined temperature MT and heat generation amount data representing a predetermined heat generation amount Qa which are tolerable for said drive means of the feed axis;

computing the temperature and the heat generation amount at each moment of said drive means from the current data or the torque command data output from said servo control unit to said drive means;

determining the heat generation amount Qa tolerable within a predetermined time t of said drive means in accordance with the computed temperature at each moment;

computing the total heat generation amount $Q_A$ within said predetermined time t, the rapid feed heat generation amount $Q_R$ at the time of rapid feed and the cutting feed heat generation amount $Q_C$ at the time of cutting feed of said drive means from the computed heat generation amount at each moment;

comparing the total heat generation amount $Q_A$ within the computed predetermined time t with the determined tolerable heat generation amount Qa;

computing the acceleration/deceleration time constants $\tau_r$ and $\tau_C$ for rapid feed and cutting feed, respectively, of said feed axis in accordance with the ratio which the rapid feed heat generation amount $Q_R$ and the cutting feed heat generation amount $Q_C$ represent of said total heat generation amount $Q_A$ within the predetermined time t, in the case where said total heat generation amount $Q_A$ within said predetermined time t is larger than said tolerable heat generation amount Qa; and controlling the acceleration/deceleration time constants for rapid feed and cutting feed of said feed axis by changing the set time constants $\tau_{r0}$ and $\tau_{C0}$ to the computed time constants $\tau_r$ and $\tau_C$, respectively.

In accordance with a further embodiment of the present invention, there is provided a method of controlling a numerically controlled machine tool by performing a numerical control program supplied from a read and interpret unit of a numerical control unit so as to control a drive means of at least one feed axis, via an execution command unit, an interpolation unit and a servo control unit, comprising the steps of:

presetting acceleration/deceleration time constants of the feed axis, a cutting feed rate, predetermined temperature data tolerable for the drive means of the feed axis and tolerable predetermined heat generation amount data;

predictively computing a temperature at each moment of the drive means based on control data of the numerical control program and a heat generation amount at each moment;

comparing the computed temperature with the set tolerable predetermined temperature data;

controlling acceleration/deceleration time constants of the feed axis in accordance with the result of comparison while determining a tolerable heat generation amount of the drive means in accordance with the computed temperature at each moment;

computing a cutting feed heat generation amount of the drive means during a cutting feed operation from the computed heat generation amount at each moment;

computing a cutting load heat generation amount corresponding to a cutting load of the drive means based on the control data of the numerical control program;

comparing the computed cutting feed heat generation amount with the determined tolerable heat generation amount; and controlling a cutting feed rate of the feed axis in accordance with the ratio which the computed cutting load heat generation amount represents of the cutting feed heat generation amount from the result of comparison.

In accordance with a further embodiment of the present invention, there is provided a method of controlling a numerically controlled machine tool for executing, through an execution command unit, an interpolation unit and a servo control unit, a numerical control program fetched from a read and interpret unit of a numerical control unit and controlling a drive means of at least one feed axis, comprising the steps of:

presetting curves representing acceleration/deceleration time constants for the feed axis, cutting feed rates and tolerable predetermined temperatures of the drive means of the feed axis and a curve representing predetermined tolerable heat generation amount;

computing temperatures at respective moments of the drive means from current data or torque command data output from a servo control unit to the drive means to produce a temperature curve containing the computed temperatures and to compute heat generation amounts at the respective moments;

comparing an inclination of the produced temperature curve with an inclination of the temperature curve representing the set predetermined tolerable temperatures;

computing acceleration/deceleration time constants of the feed axis from a relation between the inclination of the temperature curve representing the set tolerable predetermined temperatures and the acceleration/
deceleration time constants to control the acceleration/
deceleration time constants of the feed axis and to
determine the tolerable heat generation amount of the
drive means in accordance with the computed temperatures at the respective moments, when the inclination of
the produced temperature curve is larger than that of the
temperature curve representing the set tolerable predetermined temperature;

computing the cutting feed heat generation amount during
cutting feed operation of the drive means from the
computed heat generation amount at the respective
moments;

computing a cutting load heat generation amount corresponding to a cutting load applied to the drive means
from the current data or the torque command data
output from the servo control unit to the drive means;

comparing the computed cutting feed heat generation
amount with the determined tolerable heat generation
amount; and controlling the cutting feed rate of the feed axis in
accordance with the ratio which the computed cutting
load heat generation amount represents of the cutting
feed heat generation amount from the result of comparison.

In accordance with a still further embodiment of the
present invention, there is provided a method of controlling
a numerically controlled machine tool for executing,
through an execution command unit, an interpolation unit
and a servo control unit, a numeral control program fetched
from a read and interpret unit of a numerical control unit and
controlling a drive means of at least one feed axis, comprising the steps of:

presetting acceleration/deceleration time constants for the
feed axis, cutting feed rates, predetermined tolerable
temperature data of the drive means for the feed axis,
predetermined tolerable heat generation amount data
and tolerable number of times accelerated/decelerated
per unit time;

counting number of times accelerated/decelerated per unit
of the drive means from the program data transferred
from the read and interpret unit or the execution
command unit of the numerical control unit;

comparing the counted number of times accelerated/
decelerated per unit time with the set tolerable number
of times accelerated/decelerated per unit time;

computing the acceleration/deceleration constants for the
feed axis from a relation between the set number of
times accelerated/decelerated per unit time and the
acceleration/deceleration time constants to control the
acceleration/deceleration time constants of the feed
axis, and to compute the cutting load heat generation
amount corresponding to temperatures, heat generation
amount and cutting load at respective moments of the
drive means from the current data or the torque command data output from the servo control means to the
drive means, when the counted number of times
accelerated/decelerated exceeds the tolerable number
of times accelerated/decelerated;

determining the tolerable heat generation amount of the
drive means in accordance with the computed temperatures at respective moments to compute a cutting feed
heat generation amount during cutting feed operation of
the drive means from the heat generation amounts at
respective moments;

comparing the computed cutting feed heat generation
amount with the determined tolerable heat generation
amount; and controlling the cutting feed rate of the feed axis in
accordance with the ratio which the computed cut load
generation amount represents of the cutting feed heat
generation amount from the result of comparison.

In accordance with a yet further embodiment of the
invention, there is provided a method of controlling a
numerically controlled machine tool for executing, through
an execution command unit, an interpolation unit and a
servo control unit, a numeral control program fetched from
a read and interpret unit of a numerical control unit and
controlling a drive means of at least one feed axis, comprising the steps of:

presetting acceleration/deceleration time constants of the
feed axis, cutting feed rates, tolerable predetermined
temperature data of the drive means for the feed axis
and tolerable predetermined heat generation amount
data;

detecting a temperature of the drive means;

comparing the detected temperature data with the set
tolerable predetermined temperature data;

adjustably increasing the acceleration/deceleration time
constants of the feed axis, while computing the heat
generation amount at each moment of the drive means
and the cutting load heat generation amount corresponding to a cutting load from the current data or the
torque command data output from the servo control
unit to the drive means, when the detected temperature
data is higher than the set tolerable predetermined
temperature data;

determining the tolerable heat generation amount of the
drive means corresponding to the detected temperature;

computing the cutting feed heat generation amount at the
time of cutting feed of the drive means from the
computed heat generation amount at each moment;

comparing the computed cutting feed heat generation
amount with the determined tolerable heat generation
amount; and controlling the cutting feed rate of the feed axis in
accordance with the ratio which the computed cut load
heat generation amount represents of the cutting feed
heat generation amount from the result of comparison.

In accordance with another aspect of the present
invention, there is provided an apparatus for controlling a
numerically controlled machine tool for executing, through
an execution command unit, an interpolation unit and a
servo control unit, a numeral control program fetched from
a read and interpret unit of a numerical control unit and
controlling a drive means of at least one feed axis, comprising:

data storage means for setting and storing acceleration/
deceleration time constants for rapid feed and cutting
feed of the feed axis, tolerable predetermined temperature data of the drive means of the feed axis and
predetermined tolerable heat generation amount data;

temperature computing means for computing a temperature of the drive means based on control data of the
numerical control program;

tolerable heat generation amount determining means for
determining a tolerable heat generation amount of the
drive means in accordance with the temperature computed in the temperature computing means;

heat generation amount computing means for computing
a total heat generation amount of the drive means
within a predetermined time, a rapid feed heat generation amount at the time of rapid feed and a cutting feed heat generation amount at the time of cutting feed based on the control data of the numerical control program; and acceleration/deceleration time constant computing means for computing and outputting the acceleration/deceleration time constants for the feed axis based on the total heat generation amount within a predetermined time, the rapid feed heat generation amount and the cutting feed heat generation amount computed in said heat generation amount computing means and the tolerable heat generation amount determined in the tolerable heat generation amount determining means.

In accordance with another embodiment of the present invention, there is provided an apparatus for controlling a numerically controlled machine tool for executing, through an execution command unit, an interpolation unit and a servo control unit, the numerical control program fetched from a read and interpret unit of a numerical control unit and controlling the drive means of at least one feed axis, comprising:

data storage means for setting and storing cutting feed rate of the feed axis and tolerable predetermined heat generation amount data of the drive means of the feed axis;

temperature computing means for computing a temperature of the drive means based on a control data of the numerical control program;

tolerable heat generation amount determining means for determining a tolerable heat generation amount of the drive means in accordance with the temperature computed in the temperature computing means;

heat generation amount computing means for computing a heat generation amount of the drive means based on the control data of the numerical control program; and cutting feed rate computing means for computing a cutting load of the drive means based on the control data of the numerical control program to compute and deliver a cutting feed rate of the feed axis based on a cutting load heat generation amount corresponding to the computed cutting load, a cutting feed heat generation amount computed by the heat generation amount computing means and the tolerable heat. generation amount determined by the tolerable heat generation amount determining means.

BEST MODE OF CARRYING OUT THE INVENTION

The present invention will be described below, in more detail, based on the various embodiments shown in the accompanying drawings. These embodiments will be explained with reference to the case in which a numerically controlled machine tool performs the cutting operation on a work, and therefore the feed modes of the machine tool are assumed to include the rapid feed mode and the cutting feed mode. In the case of other machines such as the punch press and the laser beam machine for performing press work and fusing work, respectively, therefore, the present invention can be understood to include the two feed modes of rapid feed and machining feed as described above.

Figure 1:
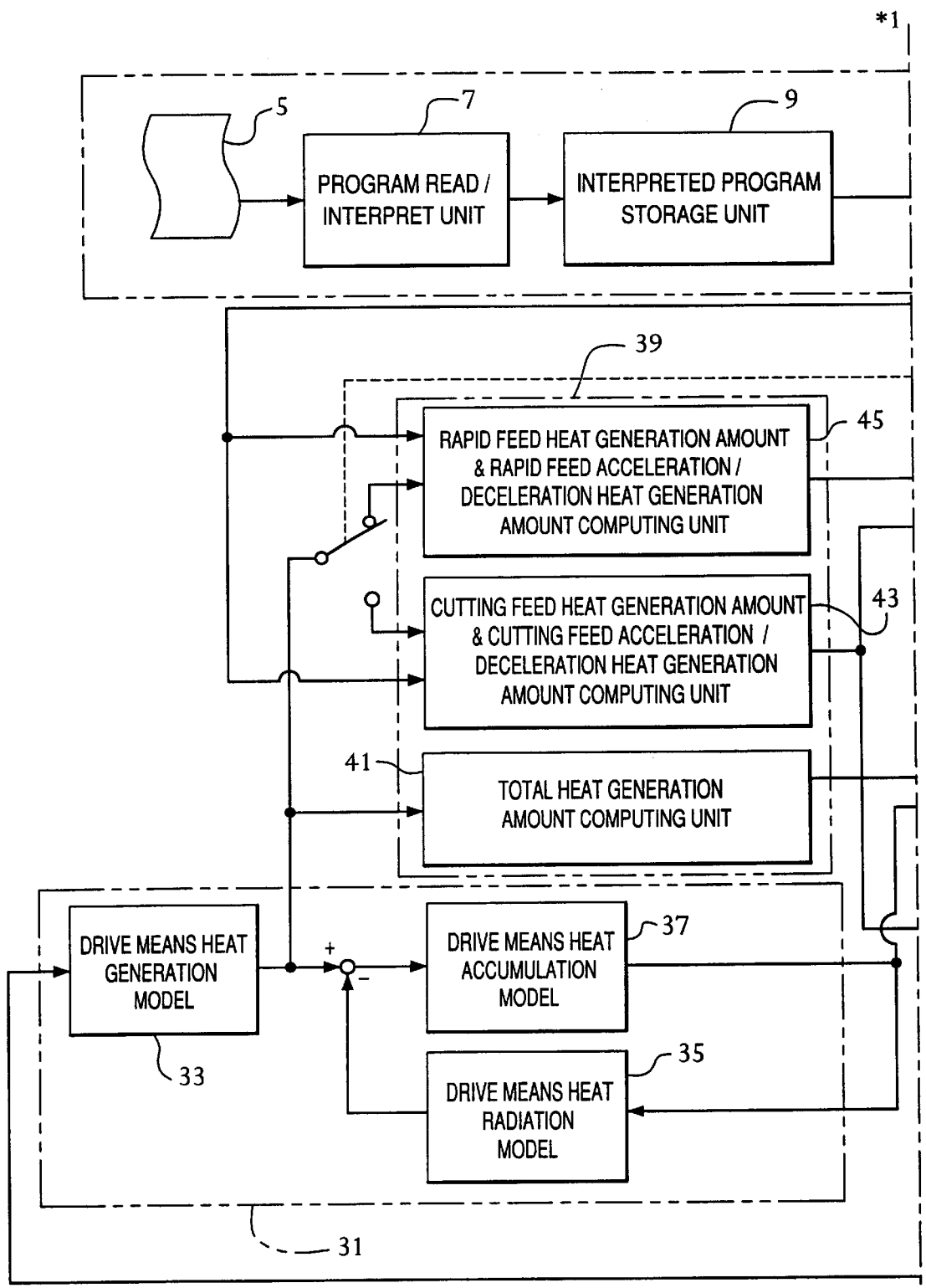
FIG. 1 is a block diagram showing the left half portion of the configuration, divided for simplicity's sake, of a control unit of a numerically controlled machine tool according to a first embodiment of the present invention.
Figure 2:
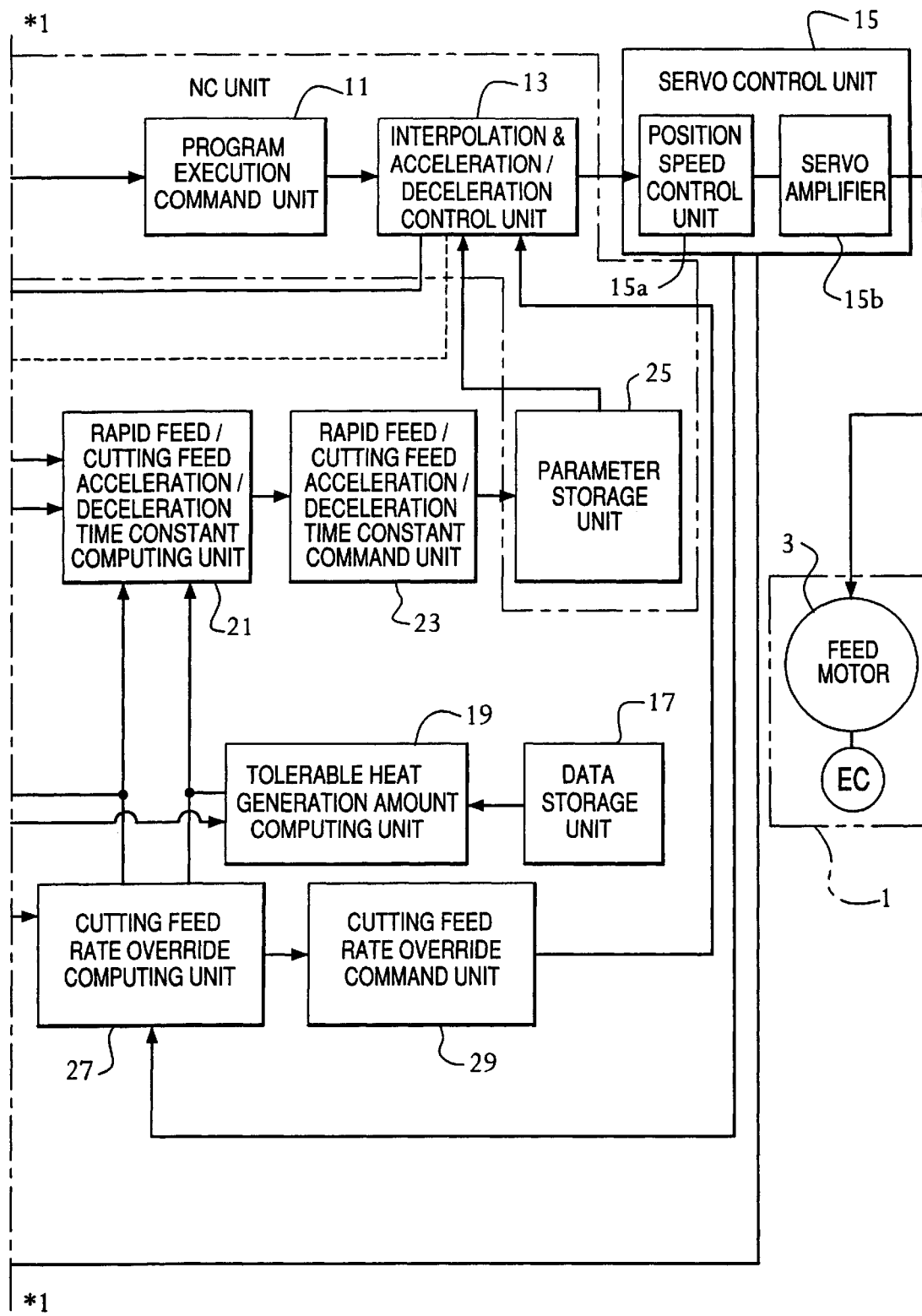
FIG. 2 is a block diagram showing the right half portion of the configuration, divided for simplicity's sake, of the control unit of the numerically controlled machine tool according to a first embodiment of the present invention.

First, by referring to the block diagrams of FIGS. 1 and 2 showing a first embodiment of the invention, a configuration is shown for numerically driving and controlling a plurality of feed axes, each being provided with a linear feed mechanism or a rotational feed mechanism of a numerically controlled machine tool 1. In this way, the numerically controlled machine tool 1 generally has a plurality of feed axes. One of the feed axes, shown as a representative, is driven by a feed motor 3 having a feed amount detection means EC including a pulse coder, for example, for detecting the amount of feed along a feed axis. An NC program 5 includes sequentially coded operation commands to be performed by the numerically controlled machine tool 1. The NC program 5 is read and interpreted by a program read and interpret unit 7, and temporarily stored in an interpreted program storage unit 9 forming a buffer unit. A program execution command unit 11 connected to the interpreted program storage unit 9 receives the program from the interpreted program storage unit 9 and sends out the program data in accordance with the progress of the operation of the numerically controlled machine tool 1. The program data mainly contains the travel commands for each feed axis.

The program data thus sent out is received by the interpolation and acceleration/deceleration control unit 13 for performing the interpolation computation for travel of each feed axis and the acceleration/deceleration computation according to the speed curve of acceleration and deceleration of the feed axis before or after interpolation. The result of computation is sent out to a servo control unit 15. This servo control unit 15 includes a position & speed control unit 15a and a servo amplifier 15b for driving the motor. The position and speed control unit 15a generates a drive current value or a torque command value to be supplied to the feed motor 3, from the position command, the speed command and the acceleration command of each feed axis and sends the resulting value to the servo amplifier 15b. The servo amplifier 15b, upon receipt of the drive current value or the torque command value, fetches and generates the current for actually driving the feed motor 3 from a power unit not shown, and supplies it to the feed motor 3. Thus, the numerically controlled machine tool 1 performs the machining operation under a desired numerical control by the sequence of operations beforehand input to the NC program 5.

In the event that this machining operation is accompanied by repetitive acceleration/deceleration of the feeds between a tool (not shown) held by a main spindle of the machine tool body and a workpiece to be machined, i.e. the two feeds including a rapid feed mainly intended for positioning and a cutting feed mainly intended for machining such as cutting, then the servo amplifier 15b and the feed motor 3 generate heat. When either of them reaches an upper limit of a tolerable temperature, a thermal alarm is issued so that the operation of the numerically controlled machine tool 1 is stopped in an emergency mode. In the configuration described above, the various function units from the NC program 5 to the first stage of the servo control unit 15 are associated with the numerical control unit (hereinafter referred to as a NC unit) including a later-described parameter storage unit 25. Of course, the feed motor 3 is a component element belonging to the body of the numerically controlled machine tool 1. The "drive means" described throughout the specification of the present invention is intended to include the servo amplifier 15b and the feed motor 3. A first embodiment constituting a control method and a control apparatus in which neither the servo amplifier 15b nor the feed motor 3 is overheated will be described in more detail.

First, a data storage unit 17 is provided as a means for storing the constants and the data required for performing a control method according to the invention. The design parameters and the known data, determined by experiment in advance and stored and set in the data storage unit 17, include the computation formulae executed and used in the execution in the drive means heat generation model 33, the drive means heat radiation model 35 and the drive means heat accumulation model 37 of the drive means heat generation amount computing unit 31 described later, the constants in the formulae and the initial values therein. Also included are the motor constant associated with the performance of the feed motor 3, the tolerable temperature and the rated current value, the rated heat generation amount $Q_T$ based on the rated current value of the feed motor 3 and the servo amplifier 15b, the acceleration/deceleration time constant $\tau_0$ of the feed axis adapted for the numerically controlled machine tool 1, the relation between the current data or the torque command data produced from the servo control unit 15 and the temperature of the drive means, the temperature curve representing the temperature change of the drive means supplied with the rated current continuously, and the relation between the inclination $\theta$ of the temperature curve and the acceleration/deceleration time constant $\tau$ of the feed axis.

The tolerable heat generation amount computing unit 19 computes the tolerable heat generation amount $Q_a$ of the drive means based on the rated heat generation amount $Q_T$ due to the data stored and set in the data storage unit 17 and the temperature output from the drive means heat accumulation model 37 described later.

The tolerable heat generation amount computing unit 19 is connected to the rapid feed/cutting feed acceleration/deceleration time constant computing unit 21 and the cut feed rate override computing unit 27. The rapid feed/cutting feed acceleration/deceleration time constant computing unit 21 computes the acceleration/deceleration time constants (the cutting feed acceleration/deceleration time constant $\tau c$ and the rapid feed acceleration/deceleration time constant $\tau r$) for the rapid feed mode and the cutting feed mode in accordance with the heat generation amount data, described later, for the two modes computed based on the current value or the torque command value produced from the position/speed control unit 15a of the servo control unit 15 through a feedback circuit on the one hand and the data of the tolerable heat generation amount Qa obtained from the tolerable heat generation amount computing unit 19 on the other hand. This process will be further described later.

The cutting feed rate override computing unit 27, on the other hand, determines by computation whether or not to use a cutting feed rate override value, i.e. the (percent) value obtained by multiplying the command value of a predetermined cutting feed rate designated in the NC program 5 in advance in design stage by the percentage value of 0 through several hundred % (normally, 0 through 100%), as an actual override value, based on the tolerable heat generation amount data obtained from the tolerable heat generation amount computing unit 19, the various heat generation amount data of the drive means obtained from the total heat generation amount computing unit 41 of the feed heat generation amount computing unit 39 described later and the cutting feed heat generation amount/cutting feed acceleration/deceleration heat generation amount computing unit 43, and the machining load data including the cutting load obtained by conversion and computation of the torque command value produced from the position/speed control unit 15a of the servo control unit 15 through a feedback circuit. The override value of the cutting feed rate computed by the cutting feed rate override computing unit 27 is supplied as a priority feed rate data to the interpolation and acceleration/deceleration control unit 13 of the NC unit described above through the cutting feed rate override command unit 29.

The acceleration/deceleration time constants $\tau c$ and $\tau r$ for the two modes computed by the rapid feed/cutting feed acceleration/deceleration time constant computing unit 21 are sent to the parameter storage unit 25 of the NC unit through the rapid feed/cutting feed acceleration/deceleration time constant command unit 23, and then sent out to the interpolation and acceleration/deceleration control unit 13 at an appropriate timing.

The drive means heat generation amount computing unit 31 includes a drive means heat generation model 33 constituting a function unit for performing the model computation of the heat generation amount of the servo amplifier 15b and the feed motor 3 constituting the drive means according to a predetermined computation formula, a drive means heat radiation model 35 for performing the model computation of the heat radiation amount corresponding to the ambient temperature environment and the cooling conditions of the drive means according to a predetermined computation formula, and a drive means heat accumulation model 37 for performing the model computation of the heat accumulation amount of the drive means according to a predetermined computation formula. The drive means heat generation model 33 computes the heat generation amount of the drive means by introducing the current value or the torque command value at each moment fetched from the servo control unit 15 of the NC unit into the computation formula. In this case, the current value or the torque command value are fetched from the servo control unit 15 by sampling. The drive means heat accumulation model 37 substrates the heat radiation amount computed by the drive means heat radiation model 35 from the heat generation amount of the drive means computed by the drive means heat generation model 33 thereby to determine the heat accumulation amount of the drive means. The drive means accumulates the heat and has a temperature according to this heat accumulation amount, which temperature value is provided by the drive means heat accumulation model 37 as an output temperature. Of course, the output temperature is fed back also from the drive means heat accumulation model 37 to the drive means heat radiation model 35 and thus, directly participates in the computation of the heat radiation amount. By the way, in the case of the feed motor 3, for example, the computation by the drive means heat generation model 33, the drive means heat radiation model 35 and the drive means heat accumulation model 37 is executed by simulation according to equations (1) to (3) shown below. Specifically, Motor heat generation amount:

$$Qm=\gamma I^2 \tag{1}$$

where $\gamma$ is the heat generation constant, I is the current and the motor heat radiation amount per unit time is given as $$Qr=\alpha(Tm-1-Ta) \tag{2}$$

where $\alpha$ is the heat radiation constant, Tm the motor temperature and Ta the ambient temperature. The motor temperature is given as $$Tm=Tm-1+\beta(a_1 Qm-a_2 Qr) \tag{3}$$

where $\beta$ is a constant, $a_1$ is a constant and $a_2$ is a constant.

In similar fashion, in the case of the servo amplifier 15b, the heat generation amount due to the current flowing in the electrical elements making up the amplifier 15b, it may be understood that the heat radiation amount involved in the heat radiation and cooling of the electrical elements using a fan or a cooling fan and the heat accumulation amount generated from the difference between the two preceding heat amounts is computed by the models 33, 35, 37 according to a predetermined formula.

Figure 15:
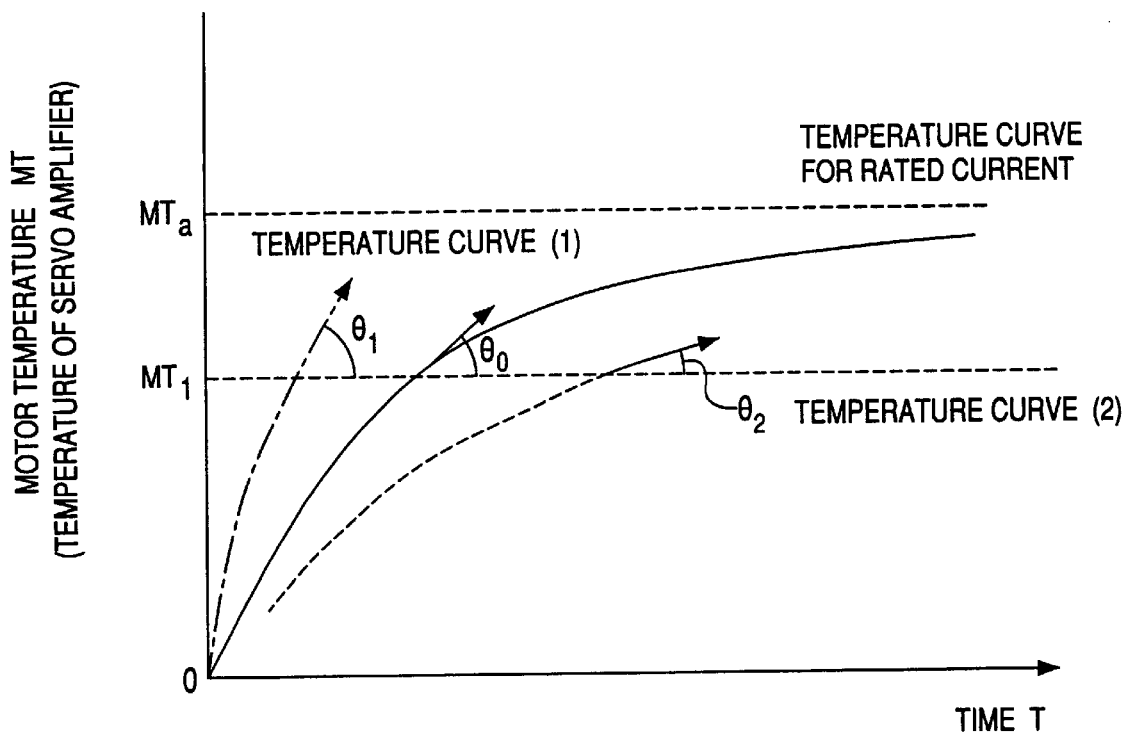
FIG. 15 is a graph showing temperature curves of the feed motor or the servo amplifier with respect to the elapsed time T and the change in the inclination θ thereof according to the first to fifth embodiments.
Figure 16:
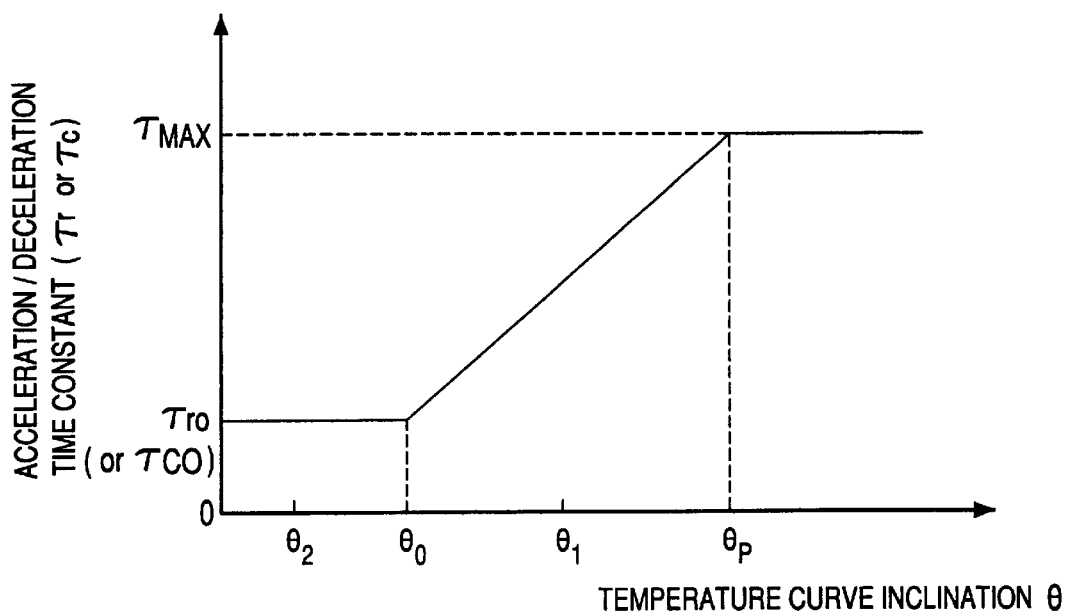
FIG. 16 is a graph showing the relation between the inclination θ of the temperature curve shown in FIG. 15 and the acceleration/deceleration time constant τ according to the second to fifth embodiments.

The temperature value of the drive means obtained from the drive means heat accumulation model 37 exhibits a temperature curve as shown in FIG. 15 for both the feed motor 3 and the servo amplifier 15b.

Also, the feed heat generation amount computing unit 39 includes a total heat generation amount computing unit 41, a cutting feed heat generation amount/cutting feed acceleration/deceleration heat generation amount computing unit 43, a rapid feed heat generation amount/rapid feed acceleration/deceleration heat generation amount computing unit 45. The total heat generation amount computing unit 41 is provided as a function unit for computing the total heat generation amount $Q_A$ by fetching and accumulating the heat generation amount of the drive means from the drive means heat generation model 33 of the drive means heat generation amount computing unit 31 at intervals of a predetermined time t.

The cutting feed heat generation amount/cutting feed acceleration/deceleration heat generation amount computing unit 43 is similarly provided as a function unit for accumulating and computing the heat generation amount $Q_C$ of the drive means in the cutting feed mode and the cutting feed acceleration/deceleration heat generation amount $Q_{CA}$ constituting the heat generation amount accompanying the acceleration/deceleration operation during the cutting feed at intervals of a predetermined time t. The cutting feed heat generation amount $Q_C$ is computed as the sum ($Q_C=Q_{CL}+Q_{CA}+Q_{CF}$) of the dynamic friction heat generation amount $Q_{CF}$ generated by the dynamic friction in the case where the feed motor 3 rotationally operates mainly as a drive means, the cutting load heat generation amount $Q_{CL}$ generated by the drive means under a cut load and the cutting feed acceleration/deceleration heat generation amount $Q_{CA}$ described above generated based on the acceleration/deceleration operation at the time of cutting feed.

The rapid feed heat generation amount/rapid feed acceleration/deceleration heat generation amount computing unit 45 is provided as a function unit for computing the heat generation amount $Q_R$ of the drive means in rapid feed mode and the rapid feed acceleration/deceleration heat generation amount $Q_{RA}$ providing the heat generation amount resulting from the acceleration/deceleration operation during the rapid feed. The rapid feed heat generation amount $Q_R$ is accumulated and computed in similar fashion at intervals of a predetermined time t as the sum ($Q_R=Q_{RA}+Q_{RF}$) of the rapid feed acceleration/deceleration heat generation amount $Q_{RA}$ and the heat generation amount $Q_{RF}$ due to the dynamic friction during the rapid feed.

By the way, in the drive means, the vertical feed axis system requires a predetermined amount of power for holding the main spindle head or the like element to be fed, for example, at a desired position in the vertical direction against free fall, and based on this component of the power for holding the gravity along the vertical axis, the drive means for the vertical feed shaft system generates heat even when stationary. This heat generation amount $Q_S$ during the stationary state of the drive means is included in the total heat generation amount $Q_A$ of the drive means and is accumulated in the total heat generation amount computing unit 41 at intervals of a predetermined time t. As a result, the total heat generation amount $Q_A$ is given as the sum ($Q_A=Q_R+Q_C+Q_S$) of the three heat generation amounts including the rapid feed heat generation amount $Q_R$, the cutting feed heat generation amount $Q_C$ and the stationary state heat generation amount $Q_S$.

The total heat generation amount computing unit 41 is constantly connected to the drive means heat generation model 33. The cutting feed heat generation amount/cutting feed acceleration/deceleration heat generation amount computing unit 43 and the rapid feed heat generation amount/rapid feed acceleration/deceleration heat generation amount computing unit 45, on the other hand, are alternately connected to the drive means heat generation model 33 by being switched in response to the rapid feed/cutting feed mode signal obtained from the interpolation and acceleration/deceleration control unit 13 of the NC unit, i.e. the signal indicating the rapid feed mode or the cutting feed mode of the feed axis mechanism. In the case where the feed axis mechanism is in the acceleration/deceleration operation, the computing units 43, 45 acquire a signal indicating the acceleration/deceleration from the interpolation and acceleration/deceleration control unit 13 of the NC unit, and performs the computation of the cutting feed acceleration/deceleration heat generation amount $Q_{CA}$ or the rapid feed acceleration/deceleration heat generation amount $Q_{RA}$.

Figure 12:
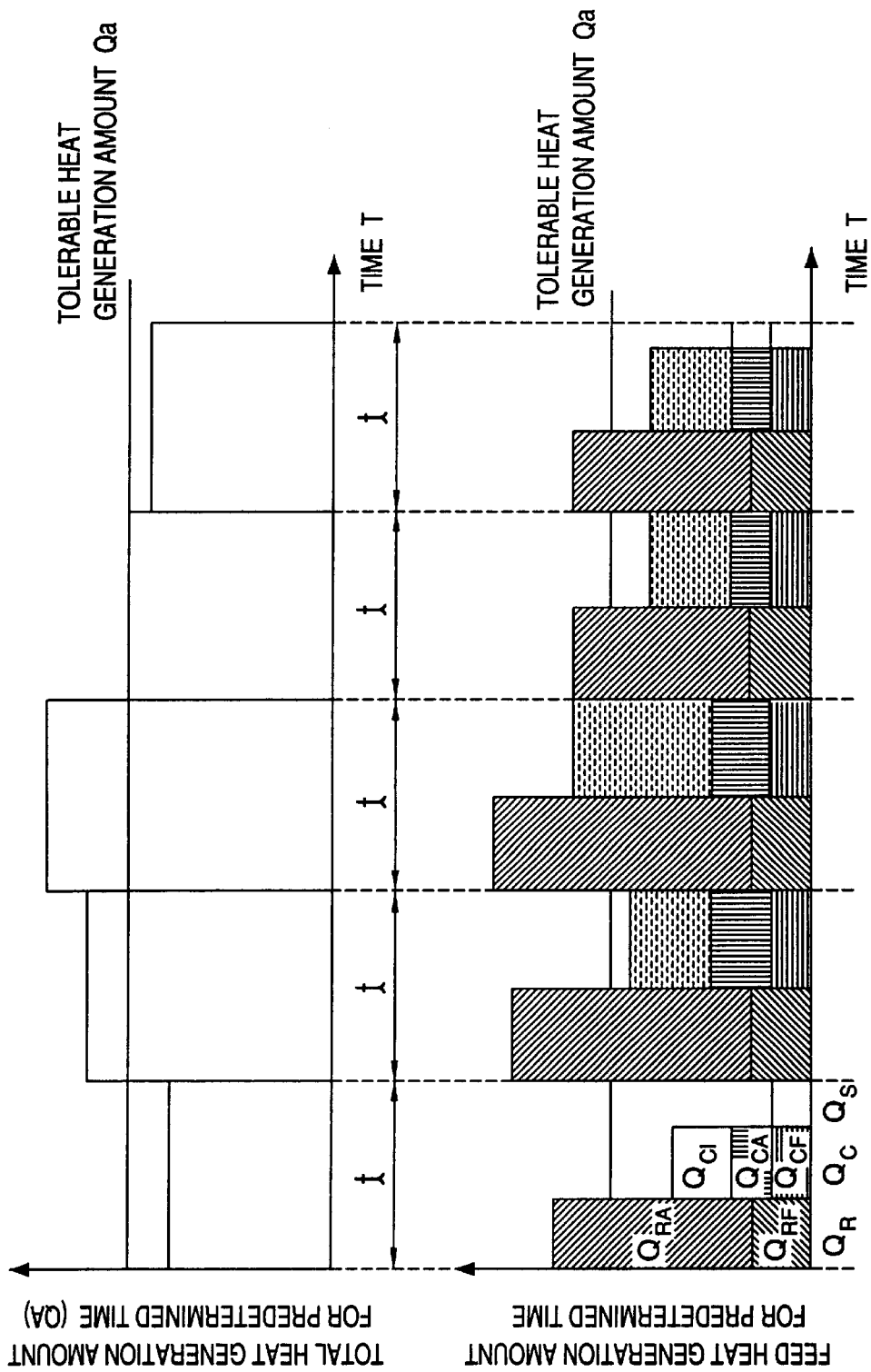
FIG. 12 is a graph showing the total heat generation amount QA of a drive means including a servo amplifier and a feed motor and heat generation amounts by the type of feeding including a rapid feed and a cutting feed with the respective tolerable heat generation amounts Qa, compared with each other along the ordinate for each predetermined time t of the abscissa representing the time T.
Figure 14:
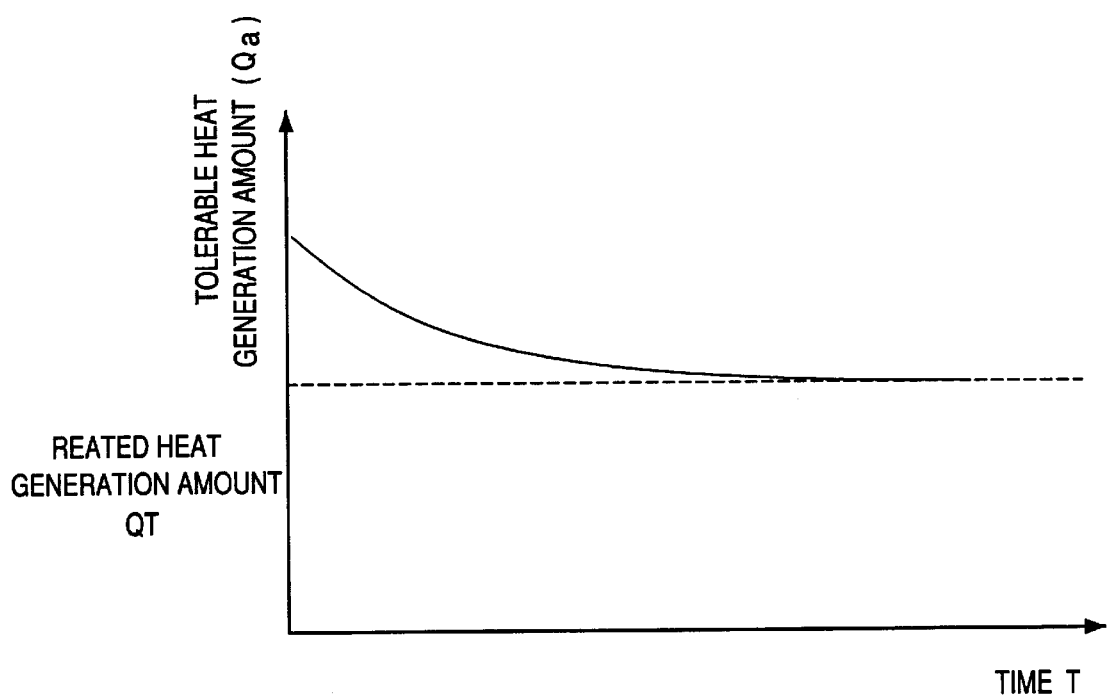
FIG. 14 is a graph showing the curve of the tolerable heat generation amount Qa of the drive means changing with time against a rated heat generation amount QT corresponding to the rated current, with the abscissa thereof representing the time T and the ordinate thereof representing the tolerable heat generation amount Qa.

The heat generation amount computed at intervals of a predetermined time t in the total heat generation amount computing unit 41, the cutting feed heat generation amount/cutting feed acceleration/deceleration heat generation amount computing unit 43 and the rapid feed heat generation amount/rapid feed acceleration/deceleration heat generation amount computing unit 45 are shown in relation to the tolerable heat generation amount Qa of the drive means in the graph of FIG. 12. Under this condition, in the case where the temperature of the drive means obtained from the drive means heat accumulation model 37 is sufficiently low as compared with the tolerable temperature, the drive means may be operated under the tolerable heat generation amount Qa which is larger than the rated heat generation amount $Q_T$, as described later. Accordingly, the tolerable heat generation amount Qa is neither predetermined nor constant and assumes various values as shown in FIG. 14.

Figure 13:
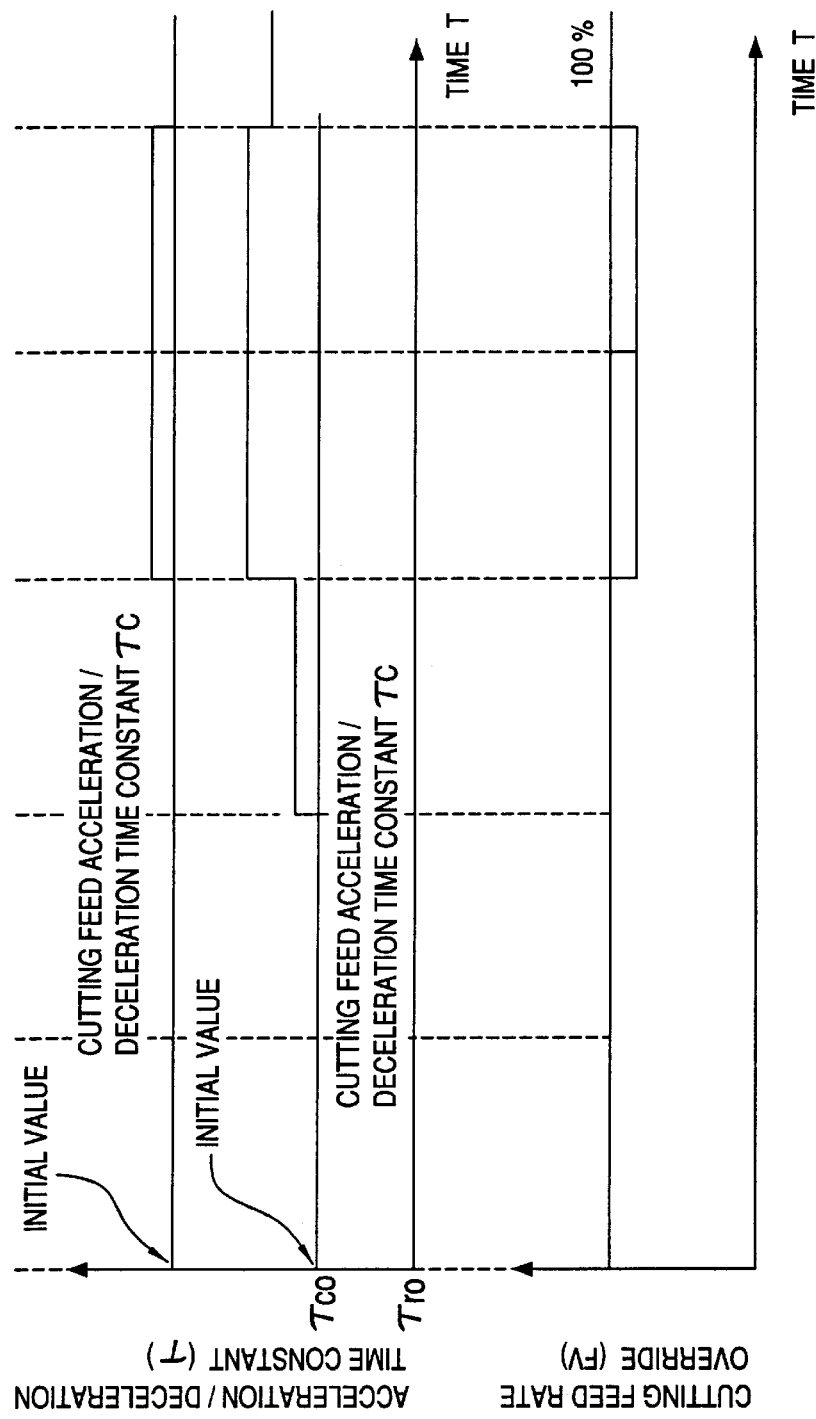
FIG. 13 is a graph showing the acceleration/deceleration time constants and the cutting feed rate override value with the operation timing along the ordinate for each predetermined time t of the abscissa representing the time T.

The rapid feed/cutting feed acceleration/deceleration time constant computing 21, in response to the result of computation from the above-described computing units 41, 43, and 45 of the feed heat generation amount computing unit 39, computes and outputs the acceleration/deceleration time constants $\tau_r$ and $\tau_C$ in the feed axis conforming with the state at each moment in the two modes including rapid feed and cutting feed, based on the relation with the tolerable heat generation amount Qa computed in the tolerable heat generation amount computing unit 19. The graph in the upper part of FIG. 13 shows the acceleration/deceleration time constants $\tau_r$ and $\tau_C$ at predetermined intervals of time t, as a variation amount from the initial values $\tau_{r0}$ and $\tau_{C0}$, respectively, computed and determined by the feed heat generation amount computing unit 39 in accordance with the total heat generation amount $Q_A$, the rapid feed or cutting feed heat generation amount $Q_R$ or $Q_C$, respectively, and the tolerable heat generation amount Qa at intervals of a predetermined time t.

The rapid feed/cutting feed acceleration/deceleration time constant command unit 23 connected to the rapid feed/cutting feed acceleration/deceleration time constant computing unit 12 temporarily stores, in the parameter storage unit 25, the acceleration/deceleration time constants $\tau_r$ and $\tau_C$ in the feed axis conforming to the state, at each moment, of each feed mode output in order to match the timing with the progress of operation of the numerically controlled machine tool 1, and then gives a command and inputs the acceleration/deceleration time constants $\tau_r$, $\tau_C$ to the interpolation and acceleration/deceleration control unit 13 of the NC unit. The tolerable heat generation amount Qa computed and supplied by the tolerable heat generation amount computing unit 19, depending on the temperature in the data storage unit 17 or the temperature output from the drive means heat accumulation model 37, is increased beyond the rated heat generation amount $Q_T$ (the heat generation amount with the drive means operated at a rated current value) in the stage where the drive means is low in temperature such as in the daily process of starting operation of the machine tool, and with an increase in temperature, the tolerable heat generation amount Qa is brought nearer to the rated heat generation amount $Q_T$ based on the tolerable heat generation curve as shown in FIG. 14. The tolerable heat generation amount Qa, therefore, is not always set at a constant value.

The total heat generation amount $Q_A$ computed in the total heat generation amount computing unit 41 of the feed heat generation amount computing unit 39, the cutting feed heat generation amount $Q_C$ and the cutting feed acceleration/deceleration heat generation amount $Q_{CA}$ computed in the cutting feed heat generation amount/cutting feed acceleration/deceleration heat generation amount 43 are sent to the cutting feed rate override computing unit 27. At the same time, the cutting feed rate override computing unit 27 computes the override value of the cutting feed rate by fetching, together with $Q_A$ and $Q_C$ described above, the tolerable heat generation amount Qa from the tolerable heat generation amount computing unit 19 and the cutting load value from the position/speed control unit 15a of the servo control unit 15 described above through a feedback circuit. The cut feed rate override value computed by the cut feed rate override computing unit 27 is applied to the interpolation and acceleration/deceleration control unit 13 of the NC unit through the cut feed rate override common unit 29, so that the cutting feed rate of each feed axis due to the drive means is controlled in accordance with the override value thus computed. The graph in the lower part of FIG. 13 shows the override value FV of the cutting feed rate computed for a predetermined time t described above.

Figure 18:
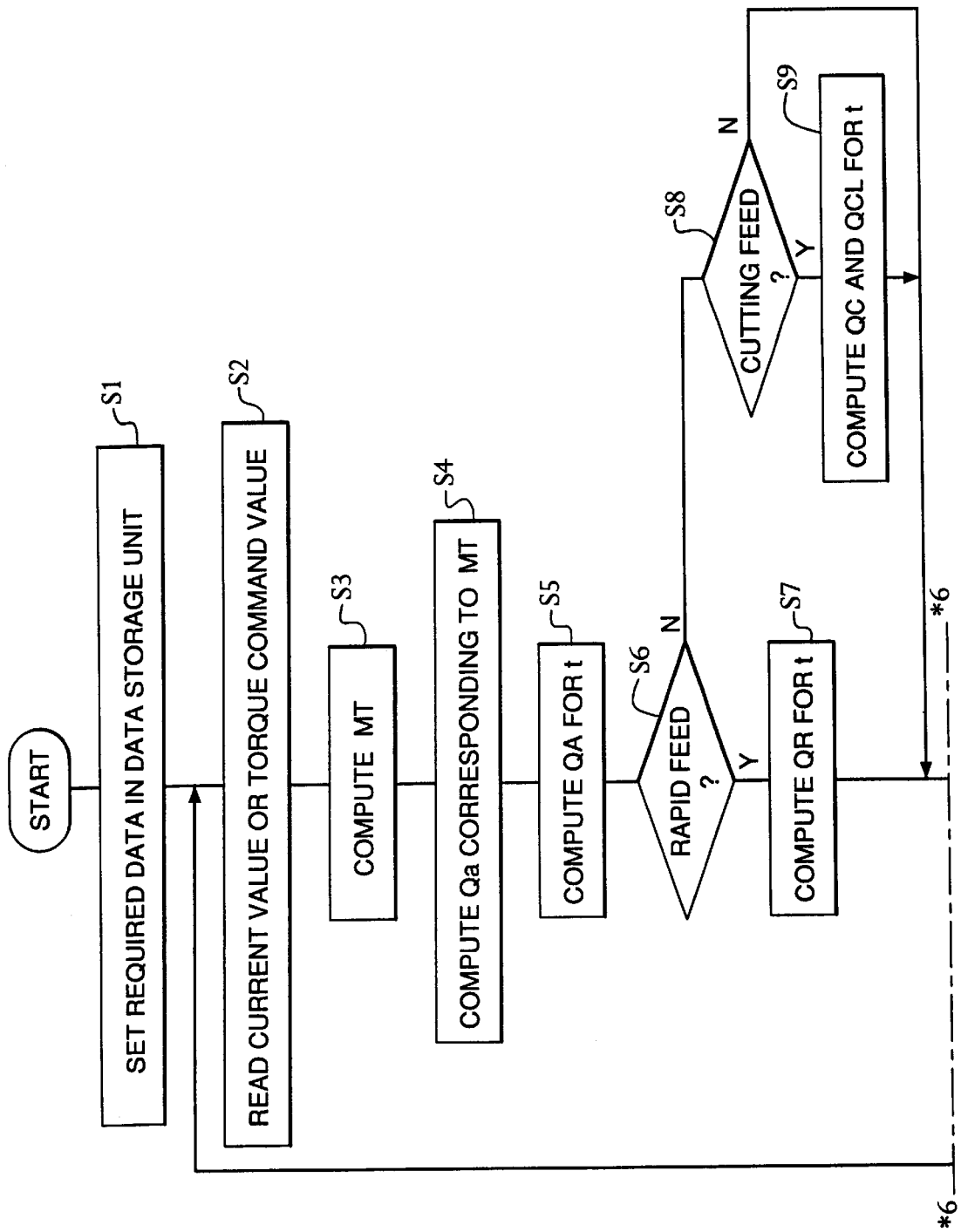
FIG. 18 shows the first half portion of the flowchart representing the control steps of a control method according to the first embodiment.
Figure 19:
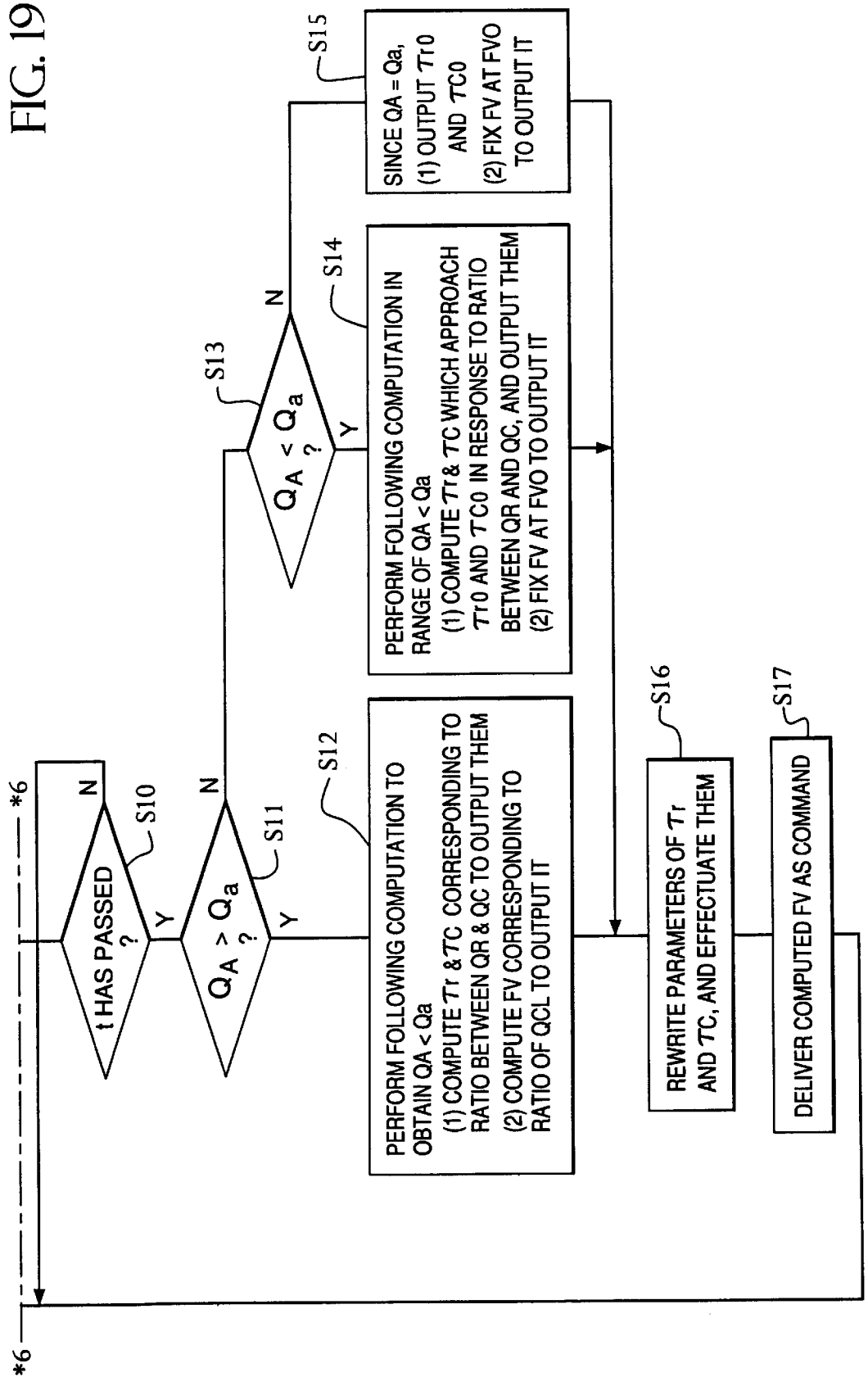
FIG. 19 shows the last half portion of the same flowchart.

A control method according to the first embodiment having the configuration of FIGS. 1 and 2 will be explained hereinbelow with reference to FIGS. 18 and 19. In the flow charts in and subsequent to FIGS. 18 and 19, alphanumeric characters are used as symbols for simplicity's sake. These characters have the meaning and contents described above and are listed again for reference.

MT is a motor temperature, MTa is a motor tolerable temperature, T is the time along the time axis, t is a predetermined time interval for accumulating and computing the heat generation amount, $Q_A$ is the total heat generation amount, $Q_R$ is the rapid feed heat generation amount, $Q_C$ is the cutting feed heat generation amount, $Q_S$ is the stationary state heat generation amount, $Q_{RA}$ is the rapid feed acceleration/deceleration heat generation amount, $Q_{RF}$ is the rapid feed dynamic friction heat generation amount, $Q_{CL}$ is the cutting load heat generation amount $Q_T$ is the rated heat generation amount of the drive means, Qa is the tolerable heat generation amount of the drive means, $\tau_C$ is the cutting feed acceleration/deceleration time constant, $\tau_r$ is the rapid feed acceleration/deceleration time constant, and FV is the override value.

First, various required data are stored in the data storage unit 17 (step S1). The required data include various constants and the rated current determined in the design stage, tolerable temperature data, initial values $\tau_{C0}$ and $\tau_{r0}$ of the acceleration/deceleration time constant for the servo amplifier 15b and the feed motor 3, and the contents of various equations including (1) through (3) used for computation in the drive means heat generation amount computing unit 31. In this setting operation, normally, the above-described design data and the data determined by experiment in advance are stored and set in the manufacturing and assembling stages of the numerically controlled machine tool 1. Then, when the numerically controlled machine tool 1 is operated according to the NC program 5, the current data or the torque command data from the servo control unit 15 are sequentially introduced into the drive means heat generation model 33 (step S2). In this case, the current data or the torque command data are fetched by sampling at very small intervals of time on the order of 5 ms, for example.

Then, in accordance with the current data or the torque command data thus fetched, the drive means heat generation mode 33, the drive means heat radiation model 35 and the drive means heat accumulation model 37 perform computation by simulation, at each moment, of the servo amplifier 15b and the feed motor 3 constituting the drive means according to the respective computation formula, and output the temperature data (the temperature curves (1), (2), etc. in FIG. 15, for example) of the drive means with the lapse of time from the drive means heat accumulation model 37 to the drive means heat generation amount computing unit 31 (step S3).

Thus, the tolerable heat generation amount computing unit 19 computes the tolerable heat generation amount Qa corresponding to the temperature of the feed motor, for example, based on the rated heat generation amount data preset in the data storage unit 17 and the temperature data of the drive means obtained from the drive means heat generation amount computing unit 31 (step S4). In this case, when the motor temperature MT is sufficiently low as compared with the tolerable temperature MTa stored in the data storage unit 17, the curve of FIG. 14 is beforehand stored in the data storage unit 17 or the tolerable heat generation amount computing unit 19 in such a manner that the tolerable heat generation amount Qa may assume a large value located on the left side of the curve of FIG. 14.

Upon complete computation of the tolerable heat generation amount Qa, the computation in the feed heat generation amount computing unit 39 is started. Specifically, the total heat generation amount $Q_A$ (=$Q_R$+$Q_C$+$Q_S$) is computed in the total heat generation computing unit 41 at intervals of a predetermined time t (step S5). In the case where the sampling time in the example mentioned above is 5 msec, for example, the predetermined time is selected at about 1 through 3 minutes.

Then, in accordance with the rapid feed mode signal or the cutting feed mode signal transferred from the interpolation and acceleration/deceleration control unit 13, it is determined whether or not the operation in the feed axis is in rapid feed mode (step S6). In the case of rapid feed mode, a process is performed to compute the rapid feed heat generation amount $Q_R$ for a predetermined time t (step S7). Unless the rapid mode is prevailing, on the other hand, the process proceeds to the step of determining whether or not the cutting feed mode is prevailing (step S8). In the case of cutting feed mode, the cutting feed heat generation amount/cutting feed acceleration/deceleration heat generation amount computing unit 43 computes the cutting feed heat generation amount $Q_C$ and the cutting load heat generation amount $Q_{CL}$ at intervals of time t (step S9). When it is determined that neither the rapid feed mode nor the cutting feed mode is prevailing, it is determined that the feeding in the feed axis is stopped and the process proceeds to the next step and waits for the lapse of a predetermined time t (step S10).

In this way, in step S10, it is first determined whether or not a preset time t has elapsed as a time interval performing the heat generation amount computation.

In the case where the predetermined time t has not yet elapsed, the process returns to the above-described step S2 to restart the computation thereby to compute the heat generation amounts $Q_A$, $Q_R$, $Q_C$, $Q_{CL}$ for a predetermined time interval t.

The total heat generation amount $Q_A$, the rapid feed mode heat generation amount $Q_R$ and the cutting feed mode heat generation amounts $Q_C$, $Q_{CL}$ computed at intervals of predetermined time t are transferred from the computing units 41, 43, 45, respectively, to be sent to the rapid feed/cutting feed acceleration/deceleration time constant computing unit 21 and the cut feed rate override computing unit 27.

In this way, the relative magnitudes of the total heat generation amount $Q_A$ and the tolerable heat generation amount Qa are determined in the rapid feed/cutting feed acceleration/deceleration time constant computing unit 21 and the cutting feed rate override computing unit 27 (step S11). When the total heat generation amount $Q_A$ of the drive means is larger than the tolerable heat generation amount Qa, i.e. when the line of the tolerable heat generation amount Qa is exceeded in the graph in the upper part of FIG. 12, the acceleration/deceleration time constants $\tau r$ and $\tau C$ are changed and adjusted to make sure that the total heat generation amount $Q_A$ becomes less than that tolerable heat generation amount Qa. Also, the computation for changing and adjusting the override FV of the cutting feed rate is performed in the rapid feed/cutting feed acceleration/ deceleration time constant computing unit 21 and the cutting feed rate override computing unit 27 (step S12).

The computation in step S12 will be explained more specifically. When $Q_A > Q_a$, the proportion of the excess of $Q_A$ which represents Qa is computed. At the same time, the proper rapid feed and cut feed acceleration/deceleration time constants $\tau r$, $\tau C$ corresponding to the ratio which the rapid feed heat generation amount $Q_R$ and the cutting feed heat generation amount, $Q_C$ represent of the total heat generation amount $Q_A$ are computed and output by the rapid feed/ cutting feed acceleration/deceleration time constant computing unit 21. On the other hand, based on the cutting load value fetched from the servo control unit 15, the cutting feed rate override computing unit 27 computes the ratio at which the cutting feed rate override value FV is changed to the reference override value $FV_0$ set according to the cutting feed rate command based on the NC program 5 to it output in accordance with the ratio which the cut load heat generation amount $Q_{CL}$ represents of the cut feed heat generation amount $Q_C$.

In the case where it is determined in the process of step S11 that the condition $Q_A > Q_a$ is not satisfied, on the other hand, the process proceeds to step S13 for determining whether or not the total heat generation amount $Q_A$ is smaller than the tolerable heat generation amount Qa ($Q_A < Q_a$). If the relation $Q_A < Q_a$ is established as a result, it indicates that the total heat generation amount $Q_A$ is smaller than the tolerable heat generation amount Qa of the drive means, and therefore the acceleration/deceleration time constants $\tau r$, $\tau C$ and the override value FV for increasing the total heat generation amount $Q_A$ or the cutting feed rate to the extent not to exceed the tolerable heat generation amount Qa are computed (step S14). More specifically, in step S14, the acceleration/deceleration time constants $\tau r$, $\tau C$ are computed and transferred in such a manner as to reach a value near the initial values $\tau r0$ and $\tau C0$ thereof, respectively, in accordance with the ratio which the rapid feed/cutting feed heat generation amounts $Q_R$ and $Q_C$ represent of the total heat generation $Q_A$. Also, the value of the override FV of the cut feed rate is computed and output as a value near the reference override value $FV_0$ initially set (for example, the commanded rate in the NC program 5 is set to 100% of the initially set override value) in accordance with the ratio which the cutting load heat generation amount $Q_{CL}$ represents of the cut feed heat generation amount $Q_C$.

In the case where it is determined in step S13 that the relation $Q_A < Q_a$ is not satisfied, on the other hand, it is determined that the total heat generation amount $Q_A$ is equal to the tolerable heat generation amount Qa ($Q_A = Q_a$), and the next process (step S15) is implemented. In this case, the rapid feed/cutting feed acceleration/deceleration time constant computing unit 21 and the cutting feed rate override computing unit 27 output the initial values $\tau r0$ and $\tau C0$ as the preset acceleration/deceleration time constants $\tau r$ and $\tau C$ in rapid feed or cutting feed mode and at the same time, the initially set reference override value $FV_0$ (=100%) as the override value FV of the cutting feed rate.

Once the override values of the acceleration/deceleration time constants and the cutting feed rate are transferred through the process of steps S12, S14 or S15 in this way, these data are temporarily stored in the parameter storage unit 25 from the rapid feed/cutting feed acceleration/ deceleration time constant command unit 23, and output to the interpolation and acceleration/deceleration control unit 13 of the NC unit at an appropriate timing. Thus, the parameters of the acceleration/deceleration time constants are effectively rewritten (step S16), and the override value of the cutting feed rate is transferred from the cutting feed rate override command unit 29 to the interpolation and acceleration/deceleration control unit 13 as a command value (step S17).

Upon completion of controlling process after a predetermined time t in this way, the process is returned to the step S2 to perform the process for the next predetermined time t, so that the above-described steps of determination and processing are repeated for the new predetermined time t.

The graph of FIG. 13 indicates a change with time of the acceleration/deceleration time constants $\tau r$ and $\tau C$ and the override value FV in the two modes of rapid feed and cutting feed after the determination step and the processing step repeated for each predetermined time t.

As clear from the foregoing description, the control method and the apparatus according to the first embodiment realizes a numerically controlled machine tool for machining a workpiece by executing the commands in accordance with the NC program, in which during the operation of the feed axis drive means including the servo amplifier 15b and the feed motor 3, the heat generation of the drive means is computed by simulation from the numerical control command data thereby to determine the temperature condition, at each moment, of the drive means. In addition, the heat generation amount of the drive means is computed not only as the total heat generation amount for a predetermined time, but the heat generation amount is computed based on a difference between the rapid feed and cutting feed modes, the acceleration or deceleration or the load change in the machining operation. The drive means is controlled not to exceed the tolerable temperature based on the computed data of the temperature and the heat generation amount. Thus, even a machining operation with high acceleration/ deceleration frequency or a heavy cutting operation with a large cutting load can be properly controlled against the tolerable heat generation amount while preventing overheating. As a result, the machine tool can be operated for a long time, and the machining efficiency of the numerically controlled machine tool can be improved.

Figure 3:
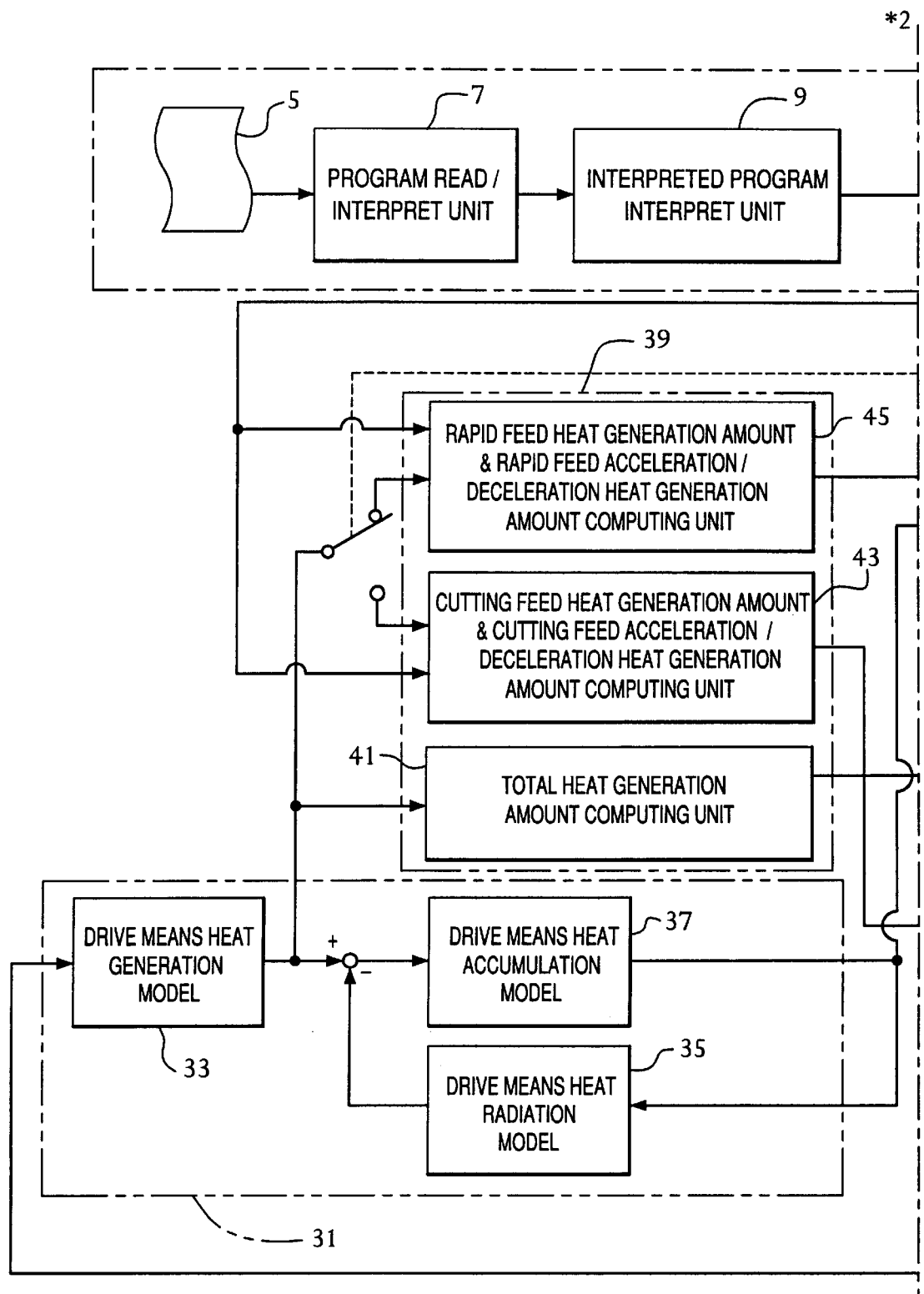
FIG. 3 is a block diagram showing the left half portion of the configuration, divided for simplicity's sake, of a control unit of a numerically controlled machine tool according to a second embodiment of the present invention.
Figure 4:
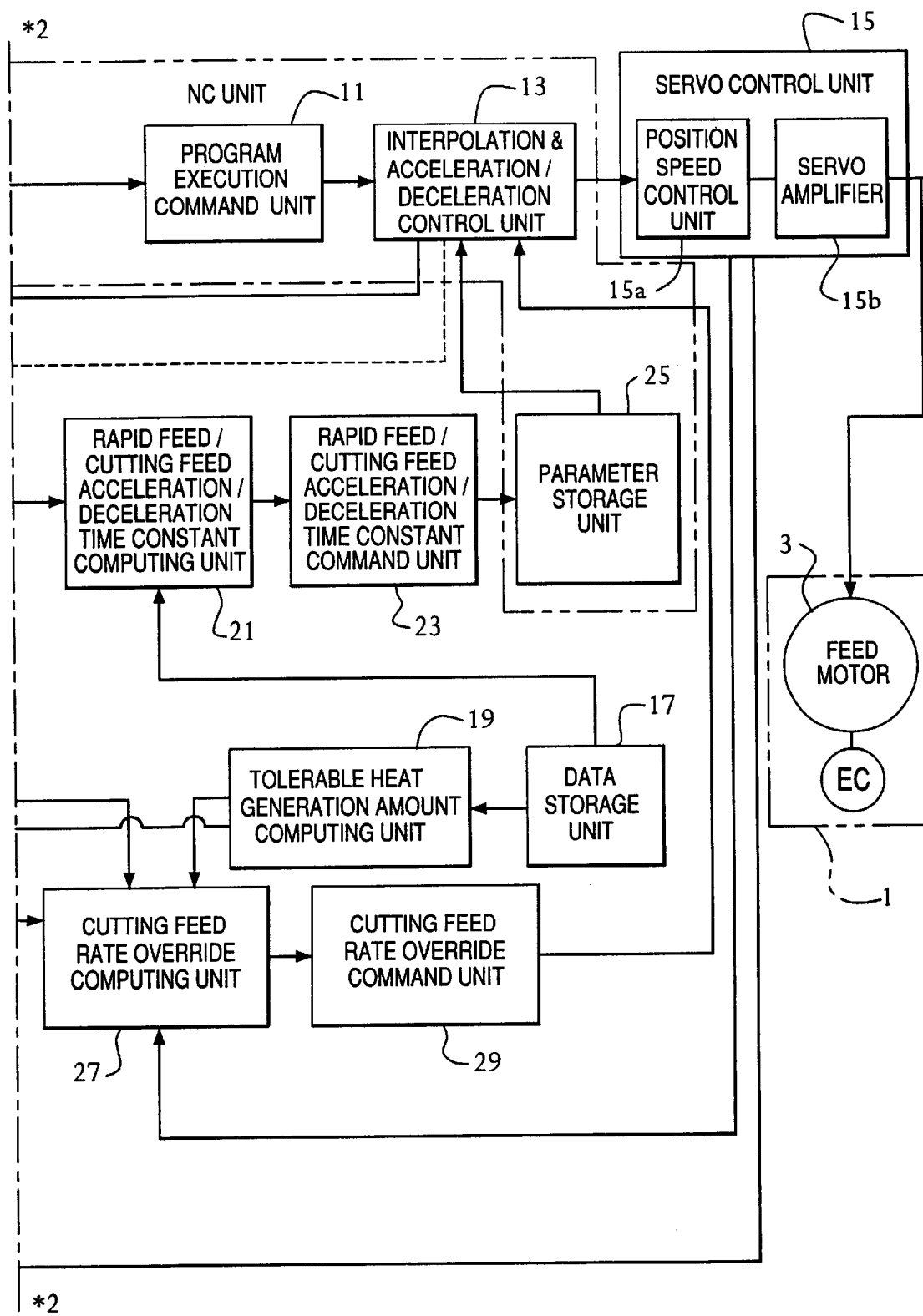
FIG. 4 is a block diagram showing the right half portion of the configuration, divided for simplicity's sake, of the control unit of the numerically controlled machine tool according to the second embodiment of the present invention.

The configuration of a second embodiment of the invention will be explained hereinbelow with reference to FIGS. 3 and 4.

A difference of the second embodiment from the above-described first embodiment lies in the configuration and the method of computation of the acceleration/deceleration time constants for the two modes of rapid feed and cutting feed. For this reason, the function units having the same or similar configuration as or to those of the preceding embodiments are designated by the same reference numerals, respectively.

Specifically, according to the second embodiment, the rapid feed/cutting feed acceleration/deceleration time constant computing unit 21 has such a configuration as to receive the temperature data at each moment of the drive means from the drive means heat generation amount computing unit 31. On the other hand, the temperature condition of the drive means experimentally determined in advance for each of the feed modes is set and stored as set temperature data in the data storage unit 17, and the set temperature data is input directly from the data storage unit 17 to the rapid feed/cutting feed acceleration/deceleration time constant computing unit 21. Of course, as in the preceding embodiment, the data storage unit 17 has set and stored therein the various constants of predetermined computation formulae for computing the heat generation amount, the heat radiation amount and the heat accumulation amount of the drive means, the initial values, the various constants for the performance of the feed motor and the servo amplifier, the rated current, the tolerable temperature, etc. together with the set temperature data described above. By the way, in this case, the tolerable temperature of the drive means is set to high when the drive means is low in its temperature, and as the temperature increases, set and stored as temperature data nearer to the rated temperature (steady temperature value for continuous operation at rated current), and the values of the acceleration/deceleration time constants $\tau_C$ and $\tau_r$ corresponding to the temperature data are also set and stored.

A control method according to the second embodiment having the configuration of FIGS. 3 and 4 will be explained in detail with reference to the flow chart of FIGS. 20, 21 and 22.

First, the required data are stored in the data storage unit 17 (step S101). In this case, the required data include the various constants, the rated current and the tolerable temperature curve required for designing of the servo amplifier 15b and the feed motor 3, the acceleration/deceleration time constants $\tau_C$ and $\tau_r$ corresponding to the tolerable temperature curve, the initial values $\tau_{C0}$ and $\tau_{r0}$ thereof, and the constants for the various formula including equations (1) through (3) used for the computation in the drive means heat generation amount computing unit 31. As in the above-described embodiments, the designing data and the data experimentally determined in advance are stored and set in the stage of manufacturing and assembling of the numerically controlled machine tool 1. Then, when the numerically controlled machine tool 1 is brought into operation according to the NC program 5, the current data or the torque command data are sequentially transferred from the servo control unit 15 into the drive means heat generation model 33 (step S102). In this case, the current data or the torque command data are fetched by sampling for very short times as in the preceding embodiment.

Then, in accordance with the current data or the torque command data thus fetched, the drive means heat generation model 33, the drive means heat radiation model 35 and the drive means heat accumulation model 37 perform the computation by simulation at each moment according to the computation formulae for the servo amplifier 15b and the feed motor 3 making up the drive means. The temperature obtained from the computation result at each moment is output, as the temperature data of the drive means against the lapse of time (the temperature curves (1) and (2) of FIG. 15, for example), from the drive means heat accumulation model 37 in the form of output data of the drive means heat generation amount computing means 31 (step S103).

Thus, the tolerable heat generation amount computing unit 19 computes the tolerable heat generation amount Qa corresponding to the temperature of the feed shaft motor, for example, based on the data of the rated heat generation amount set in the data storage unit 17 in advance and the temperature data of the drive means output from the drive means heat generation amount computing unit 31 (step S104).

In the case where the motor temperature MT is sufficiently low as compared with the tolerable temperature MTa stored in the data storage unit 17, the curve of FIG. 14 is set and stored in the data storage unit 17 in such a manner as to increase the tolerable heat generation amount Qa to such a large value as to be located on the left side of the curve of FIG. 14.

Figure 22:
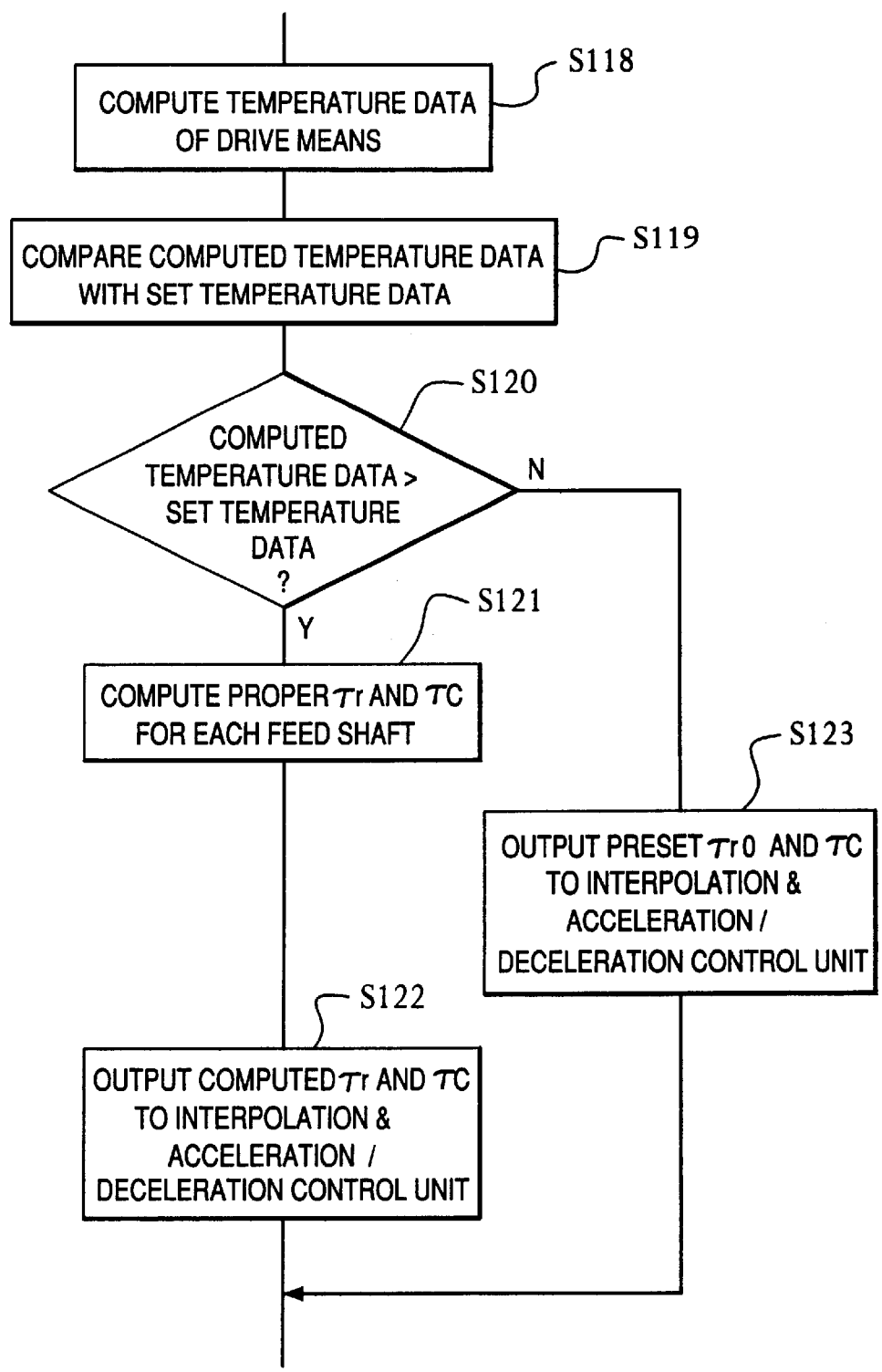
FIG. 22 is a flowchart showing the remaining portion of the control steps of a control method according to the second embodiment.

When the temperature of the drive means computed by simulation in the drive means heat generation amount computing unit 31 is output from the drive means heat accumulation model 37, on the other hand, the process of computing the acceleration/deceleration time constants is also carried out in accordance with the flow chart of FIG. 22, based on the output data of the drive means heat accumulation model 37. This will be later described.

After the computation of the tolerable heat generation amount Qa in step S104, the computation in the feed heat generation amount computing unit 39 is executed. Specifically, the total heat generation amount computing unit 41 computes the total heat generation amount $Q_A$ ($=Q_R+Q_C+Q_S$) of the drive means for each predetermined time t (step S105). By the way, as in the aforementioned first embodiment, in the case where the sampling time is 5 msec, for example, the predetermined time t is selected at about 1 through 3 min.

Then, in accordance with the rapid feed/cutting feed mode signal output from the interpolation and acceleration/deceleration control unit 13, it is determined whether or not the operation of the feed shaft is in rapid feed mode (step S106). If the rapid feed mode is involved, the process of computing the rapid feed heat generation amount $Q_R$ for predetermined time t is executed (step S107). In the case where the rapid feed mode is not involved, on the other hand, the process proceeds to the step for determining whether or not the cutting feed mode is prevailing (step S108). If the cutting feed mode is prevailing, the cutting feed heat generation amount $Q_C$ and the cutting load heat generation amount $Q_{CL}$ for the predetermined time t are computed by the cutting feed heat generation amount/cutting feed acceleration/deceleration heat generation amount computing unit 43 (S109). In the case where it is determined that neither the rapid feed mode nor the cutting feed mode is prevailing, on the other hand, it is determined that feeding in feed axis is stopped, and the process proceeds to the next step to wait for the lapse of the predetermined time t (step S110).

In step S110, first, it is determined whether or not a predetermined time t has passed as a time interval for executing the computation of a heat generation amount of the drive means.

In the case where the predetermined time t has not yet passed, the process returns to step S102 for restarting the computation of the various heat generation amounts $Q_A$, $Q_R$, $Q_C$ and $Q_{CL}$ for the predetermined time t.

At this stage, in accordance with the control method of the second embodiment, the total heat generation amount $Q_A$ and the cutting feed mode heat generation amounts $Q_C$ and $Q_{CL}$ are transferred from the computing units 41 and 43, respectively, to the cutting feed rate override computing unit 27.

In this way, the cutting feed rate override computing unit 27 determines the relative magnitudes of the total heat generation amount $Q_A$ and the tolerable heat generation amount Qa (step S111). When the total heat generation amount $Q_A$ is larger than the tolerable heat generation amount Qa of the drive means, i.e. when the total heat generation amount $Q_A$ exceeds a line indicating the tolerable heat generation amount Qa in the graph in the upper part of FIG. 12, the cutting feed rate override computing unit 27 performs computation in order to change and adjust the cutting feed rate override value FV in such a manner as to reduce the total heat generation amount $Q_A$ below the tolerable heat generation amount $Q_a$ (step S112).

A more specific description of the computation in step S112 will be provided below. When a heat generation amount takes a condition $Q_A>Q_a$, the ratio which the excess of $Q_A$ represents of the tolerable heat generation amount $Q_a$ is computed. At the same time, the cutting feed rate override computing unit 27 computes and outputs, based on the value of the cutting load fetched from the servo control unit 15, the ratio at which the cutting feed rate override value FV is changed with respect to the reference override value $FV_0$ determined based on the cutting feed rate command from the NC program 5, in accordance with the ratio which the cutting load heat generation amount $Q_{CL}$ represents of the cutting feed heat generation amount $Q_C$.

On the other hand, when it is determined in step S111 that the condition $Q_A>Q_a$ cannot be met, the process proceeds to step S113 to determine whether or not the total heat generation amount $Q_A$ is smaller than the tolerable heat generation amount $Q_a$ ($Q_A<Q_a$). As a result, when the condition $Q_A<Q_a$ is satisfied, it can be understood that the total heat generation amount $Q_A$ of the drive means is less than the tolerable heat generation amount $Q_a$. Therefore, the cutting feed rate override value FV is computed to control the cutting feed rate upward within a range in which the total heat generation amount $Q_A$ does not exceed the tolerable heat generation amount $Q_a$ (step S114).

Specifically, in step S114, the value of the override FV near to the reference override value $FV_0$ (which is set at 100% of the override value set initially for the commanded rate according to the NC program, for example) initially set as the cutting feed rate override value in accordance with the ratio which the cutting load heat generation amount $Q_{CL}$ represents of the cutting feed heat generation amount $Q_C$. When it is determined in step S113 that the relation $Q_A<Q_a$ is not satisfied, on the other hand, it is determined that the total heat generation amount $Q_A$ is equal to the tolerable heat generation amount $Q_a$ ($Q_A=Q_a$), and the next step (step S115) is performed. Specifically, the cutting feed rate override computing unit 27 outputs a reference override value $FV_0$ (=100%) initially set as the cutting feed rate override value FV for the two preset modes of rapid feed and cutting feed.

In this way, when the process to output the override value for the cutting feed rate is completed through step S112, S114 or S115, the override value FV for the cutting feed rate is transferred from the cutting feed rate override command unit 29 to the interpolation and acceleration/deceleration control unit 13 (Step 116).

With reference to the flow chart of FIG. 22, it is explained that the temperature of the above-described drive means, for example, the temperature MT of the feed motor 3 is computed in step S103 and the motor temperature MT indicating the result of computation is transferred as an output from the drive means heat generation amount computing unit 31 to the rapid feed/cutting feed acceleration/deceleration time constant computing unit 21. Then, the acceleration/deceleration time constants $\tau_r$ and $\tau_C$ are computed and output as explained. Similarly, the amplifier temperature of the servo amplifier 15b is computed and output by the drive means heat generation amount computing unit 31 from the current data or the torque command data fetched from the servo control unit 15.

Thus, the temperature data of the drive means is computed from the motor temperature MT and the amplifier temperature (step S118). The rapid feed/cutting feed acceleration/deceleration time constant computing unit 21, on the other hand, reads the temperature data of the drive means preset and stored in the data storage unit 17, so that the computed temperature data is compared with the temperature data preset and stored (step S119).

When it is determined that the computed temperature data is larger than the set temperature data (step S120), the rapid feed acceleration/deceleration time constants and the initial values $\tau_0$ and $\tau_{C0}$ of the cutting feed acceleration/deceleration time constants set and stored in the data storage unit 17 are adjusted so that the proper acceleration/deceleration time constants $\tau_r$ and $\tau_C$ for each of the feed axes are computed (step S121).

The acceleration/deceleration time constants $\tau_r$ and $\tau_C$ thus computed are transferred to the rapid feed/cutting feed acceleration time constant command unit 23 and, after being temporarily stored in the parameter storage unit 25, are delivered to the interpolation and acceleration/deceleration control unit 13 of the NC unit in time with the progress of the operation of the numerically controlled machine tool 1 (step S122).

On the other hand, when it is determined in step S120 that the computed temperature data is smaller than the set temperature data, either the acceleration/deceleration time constants $\tau_{r0}$ and $\tau_{C0}$ set and stored as data corresponding to the temperature data preset in the data storage unit 17 or the acceleration/deceleration time constants which are computed and adjusted to approach $\tau_{r0}$, $\tau_{C0}$, are output to and stored in the parameter storage unit 25 through the rapid feed/cut feed acceleration/deceleration time constant command unit 23. Subsequently, the stored data are transferred as an output to the interpolation and acceleration/deceleration control unit 13 of the NC unit at an appropriate timing in similar manner (step S123).

Figure 20:
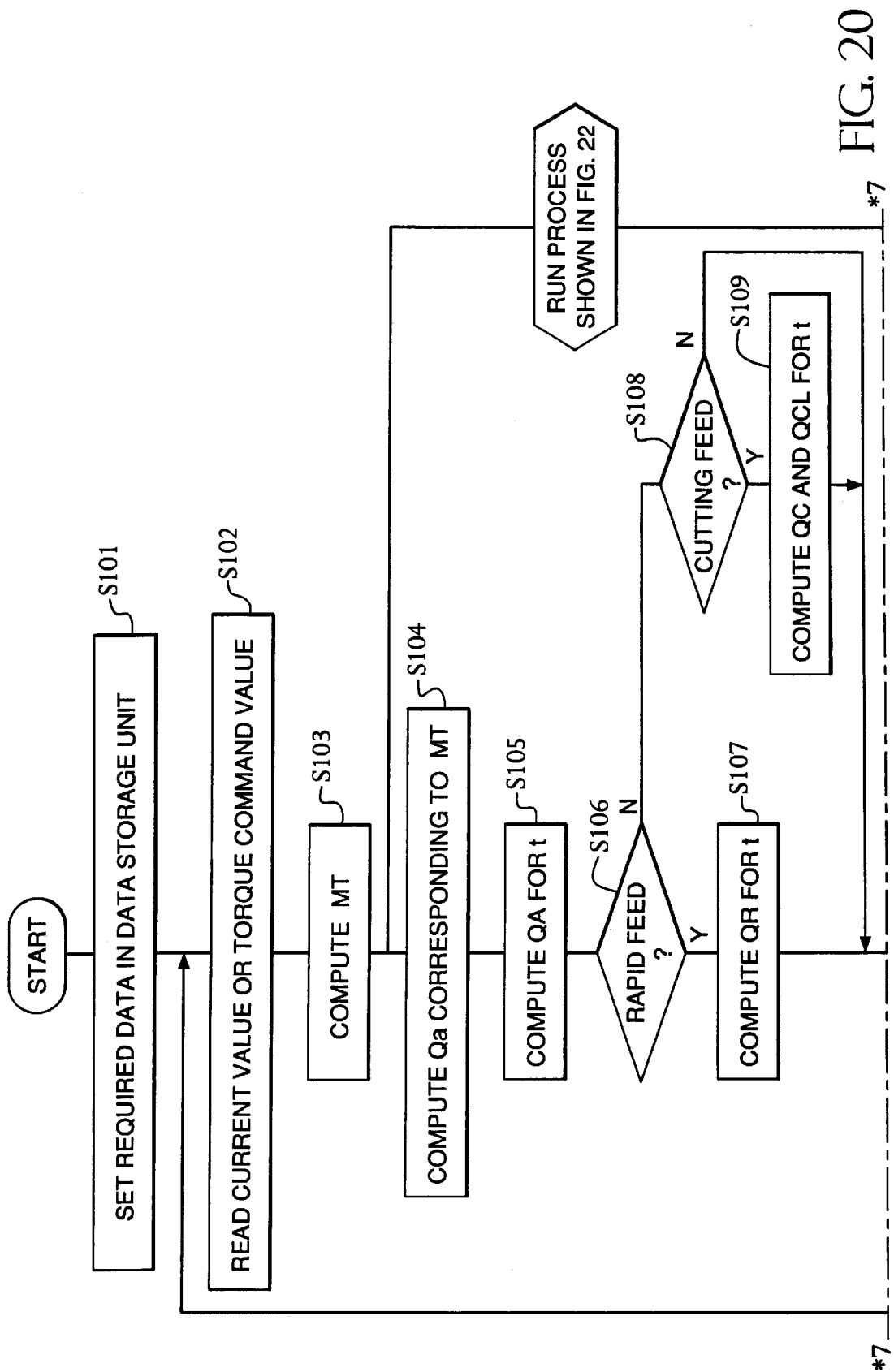
FIG. 20 shows the first half portion of the flowchart representing the control steps of a control method according to the second embodiment.
Figure 21:
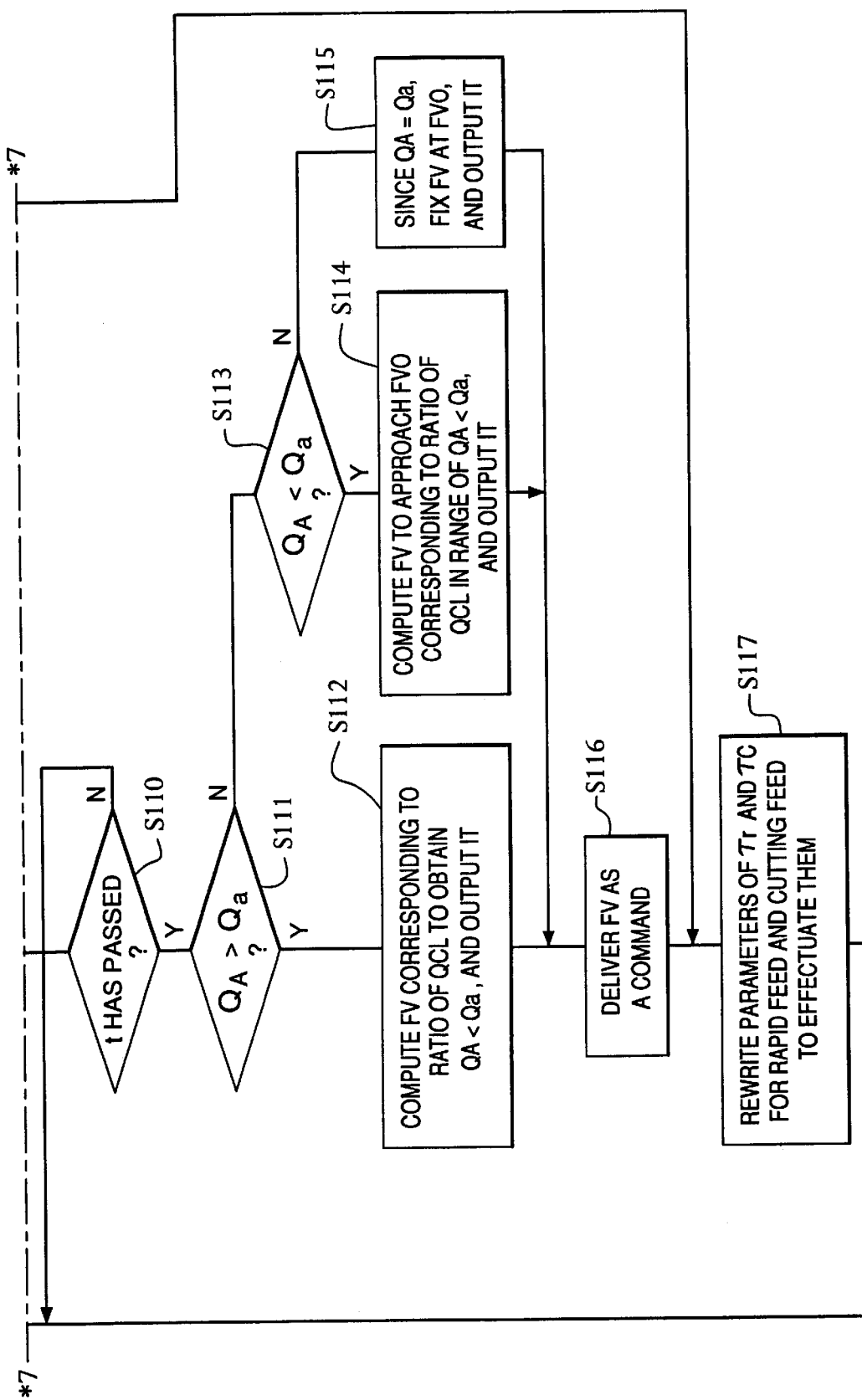
FIG. 21 shows the last half portion of the same flowchart.

In this way, once the acceleration/deceleration time constants $\tau_r$ and $\tau_C$ are transferred as an output to the interpolation and acceleration/deceleration control unit 15 in accordance with the temperature data of the drive means computed by simulation, the interpolation and acceleration/deceleration control unit 15, as shown in step S117 of the flow chart of FIG. 20, rewrites the parameters of the rapid feed/cutting feed acceleration time constants $\tau_r$ and $\tau_C$, effectuates them as command data and delivers them to the servo control unit 15.

Once the control processing for the predetermined time t is completed in this way, the process returns to step S102 for executing an identical control processing for the next predetermined time t, so that the above-described determination and processing are repeatedly performed for the new predetermined time t.

As described above, in the method and apparatus for controlling the numerically controlled machine tool according to the second embodiment, the numerically controlled machine tool for machining a workpiece by executing the commands in accordance with the NC program computes by simulation the heat generation of the feed axis drive means including the servo amplifier 15b and the feed motor 3 from the NC command data (the drive current value or the torque command value of the drive means) based on the NC program during the operation of the same feed axis drive means. Thus, the temperature data at each moment of the drive means is determined. In addition, heat generation amounts due to a change in the operating mode from the rapid feed to cutting feed and vice versa, to a change in a condition from acceleration to deceleration and vice versa, and to a change in a cutting load are computed, respectively, and the drive means is controlled not to exceed the tolerable temperature based on the determined temperature data and the computed data of the heat generation amount and the data set and stored in advance as the design value or the experimental value. As a result, even in the machining operation with frequent sessions of acceleration/deceleration or the heavy cutting operation under a large cutting load, the drive means is adequately controlled with respect to the tolerable heat generation amount, to thereby prevent the drive means from overheating. In this way, the machine tool can be continuously run for a long time, with the result that the machining efficiency of the numerically controlled machine tool is improved, as in the preceding embodiment.

Figure 5:
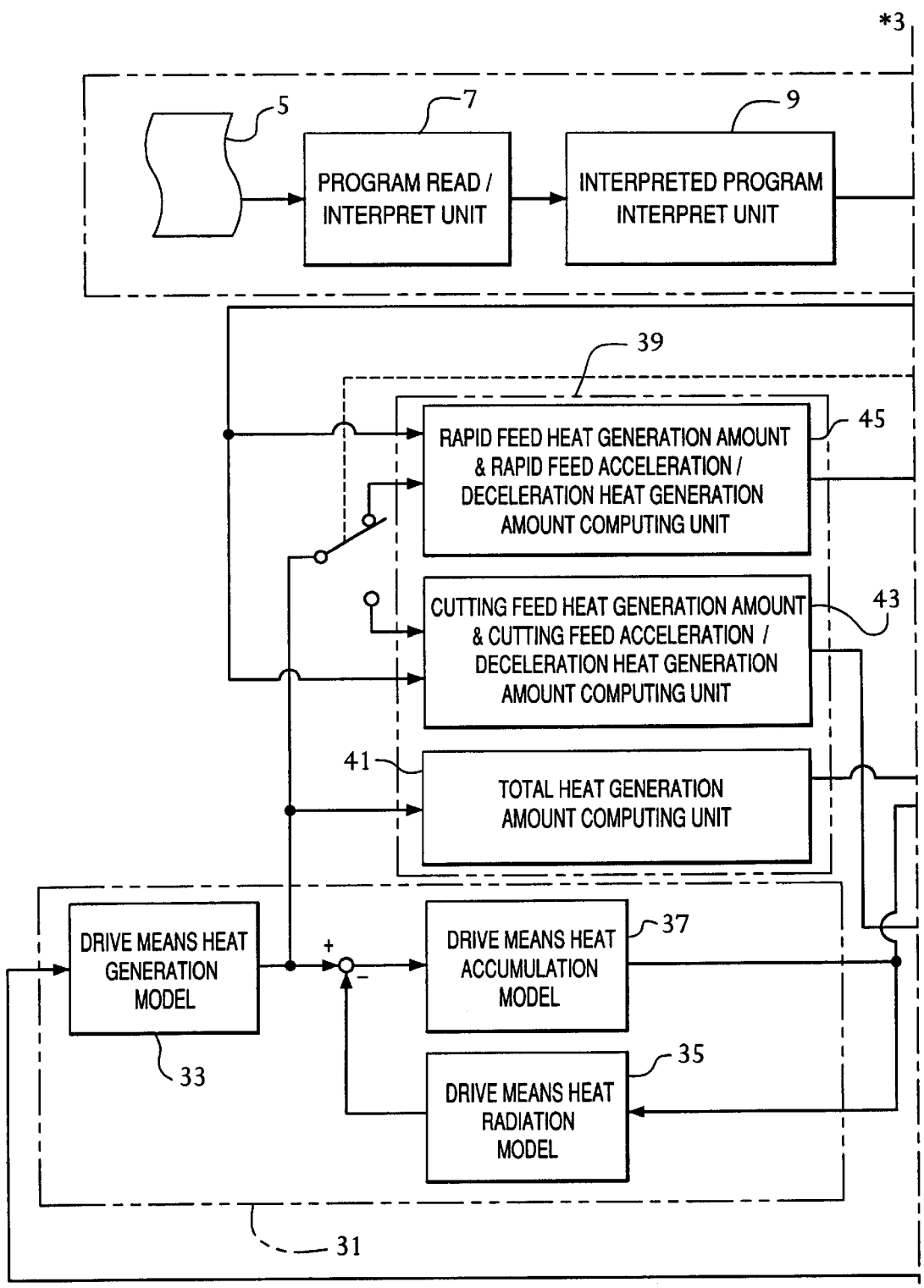
FIG. 5 is a block diagram showing the left half portion of the configuration, divided for brevity's sake, of a control unit of a numerically controlled machine tool according to a third embodiment of the present invention.
Figure 6:
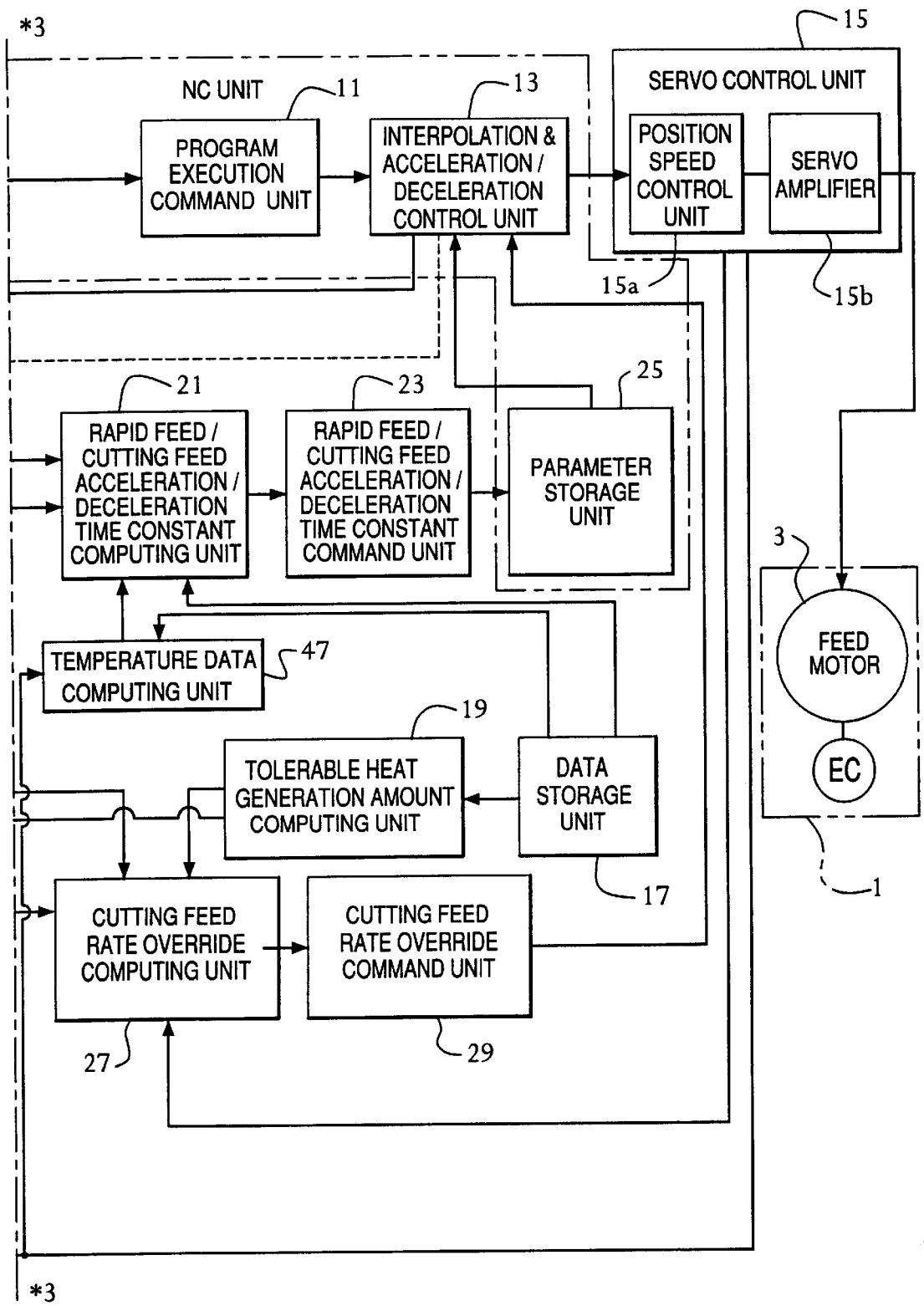
FIG. 6 is a block diagram showing the right half portion of the configuration, divided for simplicity's sake, of the control unit of the numerically controlled machine tool according to the third embodiment of the present invention.

Now, the configuration according to a third embodiment of the invention will be explained with reference to FIGS. 5 and 6.

The third embodiment is different from the first and second embodiments in the configuration and the method for computing the acceleration/deceleration time constants in the two modes of rapid feed and cutting feed. The function units identical or similar to those included in the configuration of the first and second embodiments, therefore, are designated by the same reference numerals, respectively.

Specifically, the third embodiment is configured in similar manner to the previous embodiments, in that the current data or the torque command data for the feed shaft drive means fetched from the servo control unit 15 of the NC unit are input to the drive means heat generation amount computing unit 31 so that the temperature data of the drive means are computed by simulation. The third embodiment is also similar to the previous embodiments in that a drive means heat generation model 33 of the drive means heat generation amount computing unit 31 is provided with a feed heat generation amount computing unit 39 for computing the heat generation amount for each of rapid and cutting feed modes and a total heat generation amount of the drive means, based on the heat generation amount computed in accordance with a predetermined computation formula.

Also, the data storage unit 17 has set and stored therein, as a temperature curve, the temperature of the drive means for each of the feed modes determined experimentally in advance. Further, as in the preceding embodiment, the data storage unit 17 has stored therein, together with the above-described set temperature curve, the various constants and initial values of predetermined computation formulae (1) through (3) for computing the heat generation amount, the heat radiation amount and the heat accumulation amount of the drive means, the various constants for the performance of the feed motor 3 and the servo amplifier 15b, the rated current, and the relation between the current data or the torque command data and the temperature of the drive means, the tolerable temperature, etc. The tolerable temperature of the drive means is set and stored as data indicating the temperature curve (FIG. 15) indicating a temperature change of the drive means supplied with the rate current continuously and the relation between the inclination θ of the temperature curve and the acceleration/deceleration time constant τ of the feed axis. These data are of course determined experimentally in advance. The temperature curve of the tolerable temperature is set at a high level when the drive means is low in temperature in a manner to approach the rated temperature (the steady temperature value for the continuous operation at the rated current) with the increase in temperature. The acceleration/deceleration time constants τC and τr corresponding to this temperature curve are also set and stored.

Now, the third embodiment, unlike the preceding two embodiments, is provided with a temperature data computing unit 47. The temperature data computing unit 47 acquires the current data and the torque command data as command data from the servo control unit 15 of the NC unit, and referring to the relation between the current data or the torque command data and the temperature of the drive means obtained from the data storage unit 17, predictively computes the temperature of the drive means at each moment, thereby obtaining the temperature curves (1) and (2) of FIG. 15. Each of the temperature curves computed in the temperature data computing unit 47 is compared with the temperature curve of the tolerable temperature stored in the data storage unit 17 in advance and, based on the result of comparison, the acceleration/deceleration time constants τC and τr for the two feed modes of rapid feed and cutting feed are computed in the rapid feed/cutting feed acceleration/deceleration time constant computing unit 21. The result of the computation is transferred to the rapid feed/cutting feed acceleration/deceleration time constant command unit 23 and, further, through the parameter storage unit 25 of the NC unit to the interpolation and acceleration/deceleration control unit 13. The cutting feed rate override computing unit 27, on the other hand, is so connected as to acquire the computation data of the total heat generation amount of the drive means from the total heat generation amount computing unit 41 of the feed heat generation amount computing unit 39 on the one hand and the computation data of the cutting feed heat generation amount $Q_C$ and the cutting load heat generation amount $Q_{CL}$ of the drive means from the cutting feed heat generation amount/cutting feed acceleration/deceleration heat generation amount computing unit 43 on the other hand. It is also connected to acquire the command data on the cutting load value from the servo control unit 15. Further, the cutting feed rate override computing unit 27 is connected to the tolerable heat generation amount computing unit 19 and so configured as to acquire the tolerable heat generation amount Qa computed by the computing unit 19 based on the rated heat generation amount $Q_T$ of the drive means fetched from the data storage unit 17 and the temperature data of the drive means obtained from the drive means heat generation amount computing unit 31.

In this way, the cutting feed rate override computing unit 27 computes a proper cutting feed rate override value FV from the relation between the total heat generation amount QA and the tolerable heat generation amount Qa of the drive means in association with the cutting load, and delivers it to the interpolation and acceleration/deceleration control unit 13 through the cutting feed rate override command unit 29.

Figure 23:
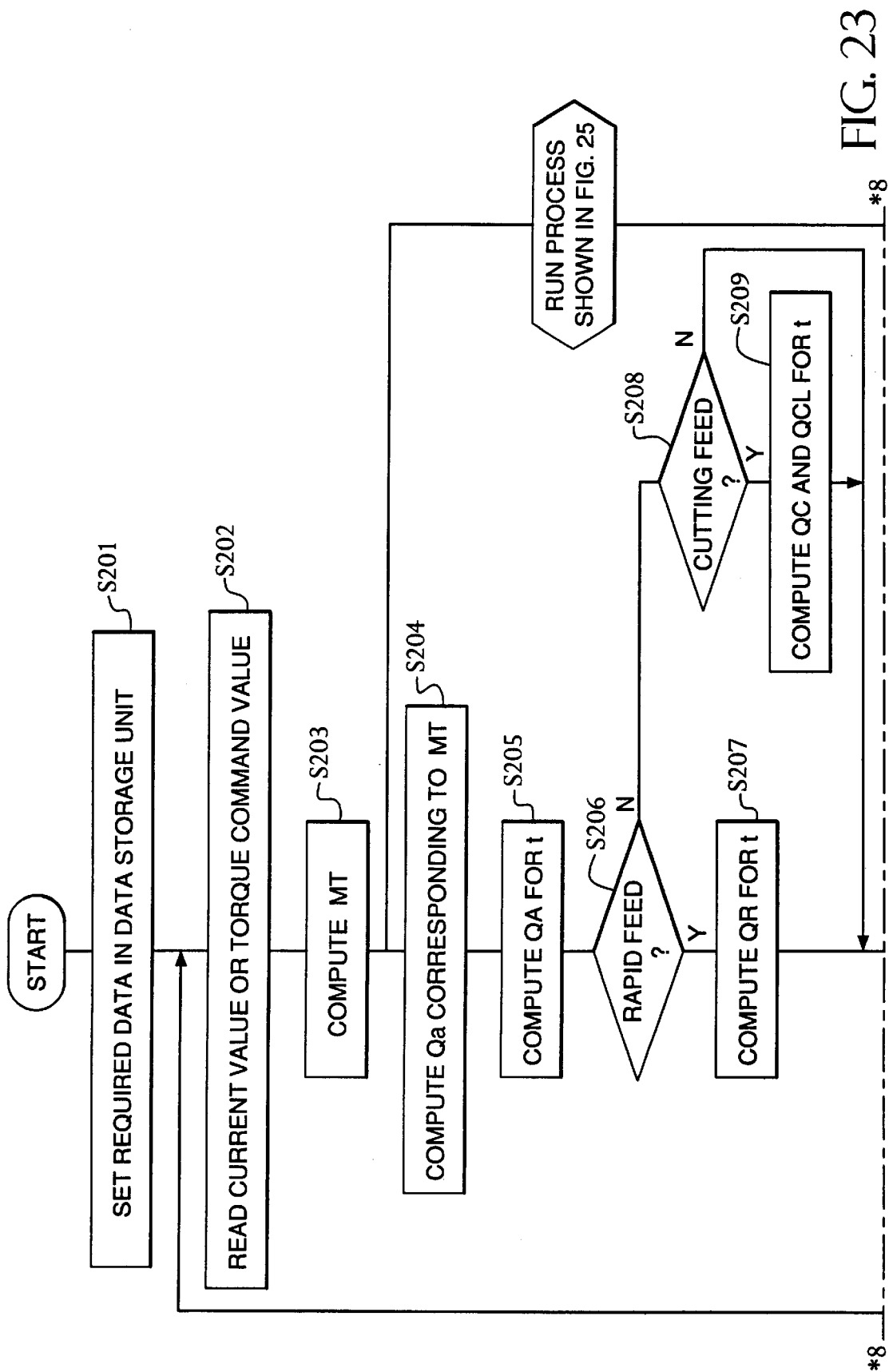
FIG. 23 shows the first half portion of the flowchart representing a part of the control steps of a control method according to the third embodiment.
Figure 24:
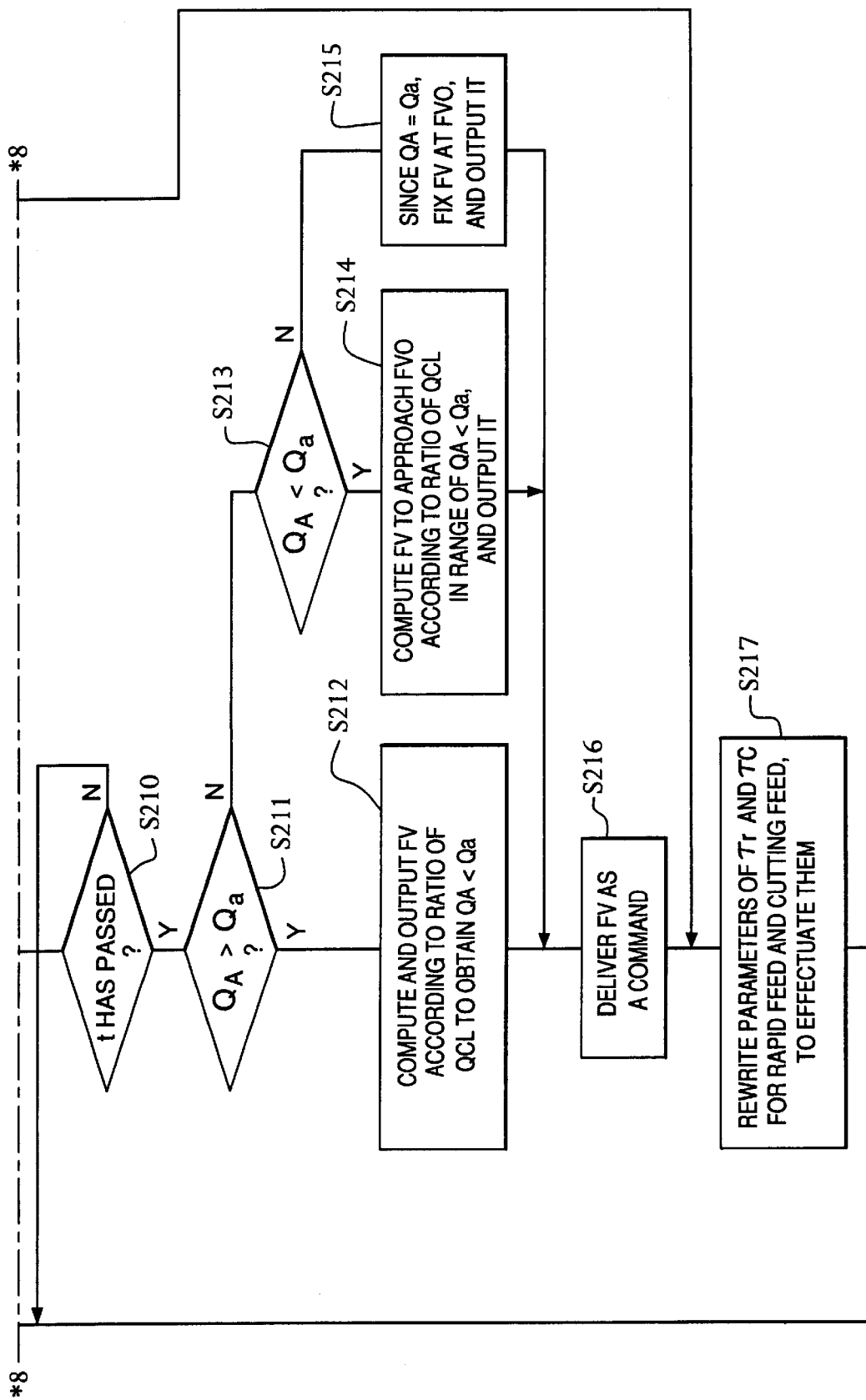
FIG. 24 shows the last half portion of the same flowchart.

Now, a control method according to the third embodiment will be described in detail with reference to the flow charts shown in FIGS. 23, 24 and 25.

First, the required data are stored in the data storage unit 17 (step S201). The required data include, as described above, the design values, the various data and curves based on experiments and are stored and set in the manufacturing and assembling stage of the numerically controlled machine tool 1. Then, when the numerically controlled machine tool 1 is operated on the NC program 5, the current data or the torque command data from the servo control unit 15 are sequentially input into the drive means heat generation model 33 (step S202). In this case, the current data or the torque command data are input by sampling at intervals of a very short time as in the aforementioned embodiments.

In accordance with the current or the torque command data thus fetched, the drive means heat generation model 33, the drive means heat radiation model 35 and the drive means heat accumulation model 37 perform the simulated computation at each moment on the servo amplifier 15b and the feed motor 3 making up the drive means, according to the respective computation formulae, and deliver the temperature resulting from the computation at each moment in the form of output data of the drive means heat generation amount computing unit 31 from the drive means heat accumulation model 37 (step S203).

Thus, based on the data of the rated heat generation amount set in the data storage unit 17 in advance and the temperature data of the drive means output from the drive means heat generation amount computing unit 31, the tolerable heat generation amount computing unit 19 computes the tolerable heat generation amount Qa corresponding to, for example, the temperature of the feed shaft motor 3 of the drive means (step S204).

The curve of FIG. 14 is also set and stored in the data storage unit 17 so that the tolerable heat generation amount Qa assumes so large a value as to be located on the left side of the curve of FIG. 14 in the case where the motor temperature is sufficient low as compared with the tolerable temperature MTa stored in the data storage unit 17.

Figure 25:
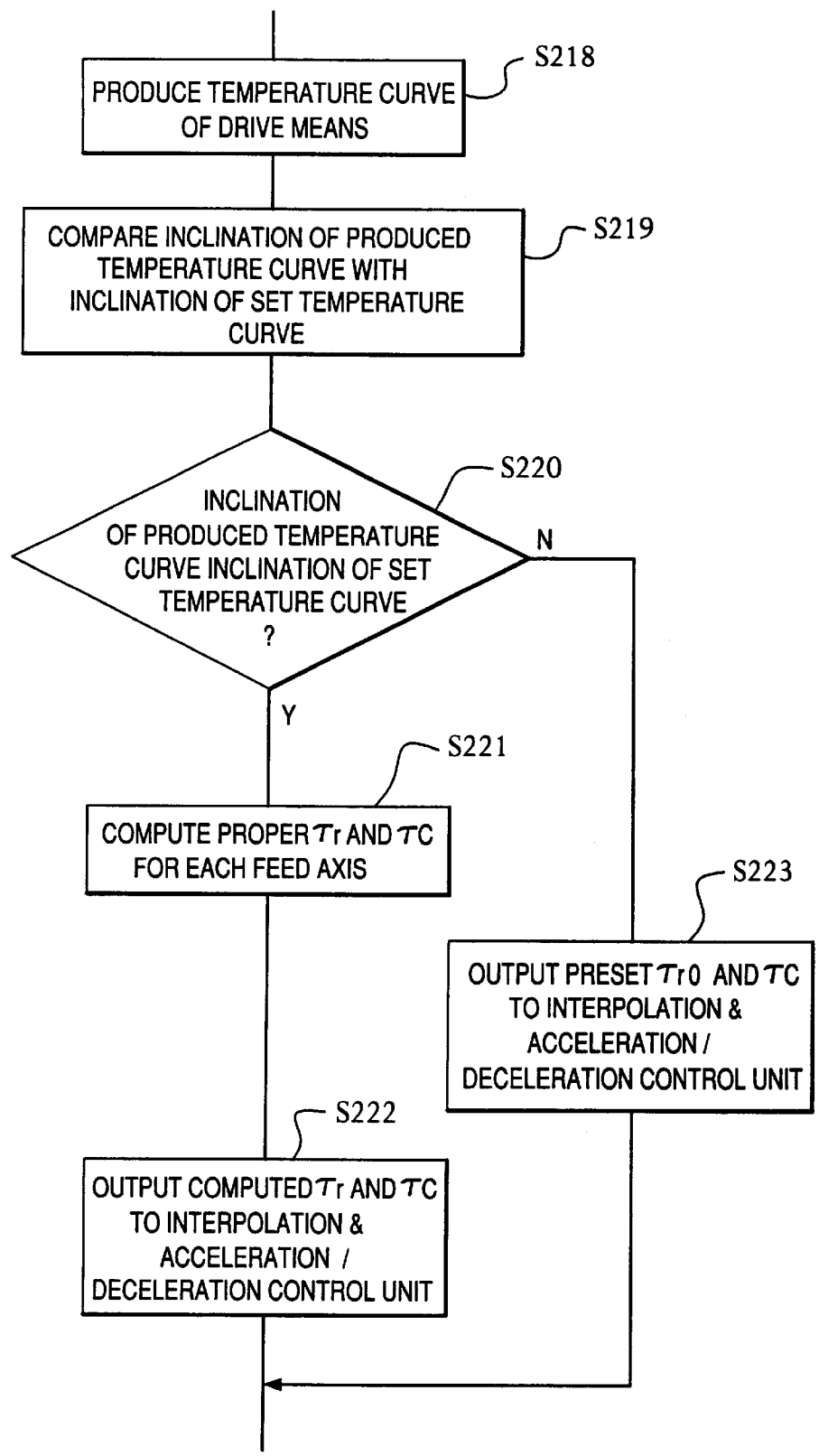
FIG. 25 is a flowchart showing the remaining portion of the control steps of a control method according to the third embodiment.

On the other hand, when the temperature of the drive means computed by simulation in the drive means heat generation amount computing unit 31 is transferred from the drive means heat accumulation model 37, the process for computing the acceleration/deceleration time constant is also performed according to the flow chart of FIG. 25 based on the output data. This will be described later.

Following the computation of the tolerable heat generation amount Qa in step S204, the computation in the feed heat generation amount computing unit 39 is carried out. Specifically, the total heat generation amount computing unit 41 computes the total heat generation amount $Q_A$ (=$Q_R+Q_C+Q_S$) at intervals of a predetermined time t (step S205). By the way, as in the above-described embodiments, the predetermined time t is selected at a value in the time range of approximately 1 through 3 min. for a sampling time of, say, 5 msec.

Subsequently, it is determined whether or not the operation in the feed axis is in the rapid feed mode in accordance with the mode signal of rapid feed or cutting feed output from the interpolation and acceleration/deceleration control unit 13 (step S206). In the case where the rapid feed mode is prevailing, the process is executed for computing the rapid feed heat generation amount $Q_R$ for a predetermined time t (step S207). Unless the rapid feed mode is involved, in contrast, the process proceeds to the step for determining whether or not the cutting feed mode is prevailing (step S208). In the case where the cutting feed mode is prevailing, the cutting feed heat generation amount $Q_C$ and the cutting load heat generation amount $Q_{CL}$ for a predetermined time t are computed by the cutting feed heat generation amount/cutting feed acceleration/deceleration heat generation amount computing unit 43 (S209). Also, in the case where it is determined that neither the rapid feed mode nor the cutting feed mode is involved, it is determined that the feeding operation in the feed axis is stopped, and the process proceeds to the next step to wait until the lapse of the predetermined time t (step S210).

In this way, it is determined first in step S210 whether the predetermined time t set in advance as a time interval for execution of the heat generation amount computation has passed or not.

In the case where the predetermined time t has not yet elapsed, the process returns to step S202 described above and the computation is restarted, thereby computing the various heat generation amounts such as $Q_A$, $Q_R$, $Q_C$ and $Q_{CL}$ for the predetermined time t.

In the process, according to a control method of the third embodiment, the total heat generation amount $Q_A$ and the cutting feed mode heat generation amounts $Q_C$ and $Q_{CL}$ are transferred from the computing units 41, 43, respectively, to the cutting feed rate override computing unit 27 at intervals of the predetermined time t.

By doing so, the cut feed rate override computing unit 27 determines the relative magnitude of the total heat generation amount $Q_A$ and the tolerable heat amount Qa (step S211). In the case where the total heat generation $Q_A$ is larger than the tolerable heat generation amount Qa of the drive means, i.e. in the state where the total heat generation $Q_A$ exceeds the line of the tolerable heat generation amount Qa indicated in the graph in the upper part of FIG. 12, the computation for changing and adjusting the override value FV for the cut feed rate in order to reduce the total heat generation $Q_A$ to less than the tolerable heat generation amount Qa is executed by the cutting feed rate override computing unit 27 (step S212).

More specifically, the computation of step S212 will be explained. In the case where $Q_A>Qa$, the ratio of the excess of $Q_A$ with respect to the tolerable heat generation amount Qa is computed. Also, in the cutting feed heat rate override computing unit 27, the ratio at which the cutting feed rate override value FV is changed to the reference override value $FV_0$ determined based on the cutting rate command according to the NC program is computed and delivered in accordance with the ratio which the cutting load heat generation amount $Q_{CL}$ represents of the cutting feed heat generation amount $Q_C$ based on the cutting load value obtained from the servo control unit 15.

When it is determined in step S211 that the relation $Q_A>Qa$ cannot be satisfied, on the other hand, the process proceeds to step S213 for determining whether or not the total heat generation amount Qa is smaller than the tolerable heat generation amount Qa ($Q_A<Qa$). When the relation $Q_A<Qa$ is established as a result, it indicates that the total heat generation amount $Q_A$ of the drive means is less than the tolerable heat generation amount Qa. Therefore, the computation of the cutting feed rate override value FV is executed to control the direction in which the cutting feed rate is increased within a range of the total heat generation amount $Q_A$ not exceeding the tolerable heat generation amount Qa (step S214). More specifically, in step S214, the override value FV (which is set to 100%, for example, of the initially set override value in the commanded speed in the NC program 5) of the cutting feed rate near to the initially set reference override value $FV_0$ in accordance with the ratio which the cutting load heat generation amount $Q_{CL}$ represents of the cutting feed heat generation amount $Q_C$.

When step S213 determines that the relation $Q_A<Qa$ is not satisfied, on the other hand, it is determined that the total heat generation amount $Q_A$ is equal to the tolerable heat generation amount Qa ($Q_A=Qa$), and the next step (step S215) is executed. Specifically, the cutting feed rate override computing unit 27 delivers an initially set reference override value $FV_0$ (=100%) as the cutting feed rate override value FV set in advance for the two modes of rapid and cutting feeds.

Upon output of the override value of each cutting feed rate through the process of steps S212, S214 or S215, the cutting feed rate override value FV is transferred as a command from the cutting feed rate override command unit 29 to the interpolation and acceleration/deceleration control unit 13 (step S216).

By referring to the flow chart shown in FIG. 25, the computation is performed by the temperature data computing unit 47 to produce a temperature curve of the drive means (step S218). The temperature curve thus produced is output to the rapid feed/cutting feed acceleration/deceleration time constant computing unit 21, which compares the inclination θ of the two curves (θ1 for the temperature curve (1) and θ2 for the temperature curve (2)) with a preset temperature curve (a temperature curve for the rated current, having an inclination θ0 at the temperature MT1 on the ordinate of FIG. 15, for example) sent from the data storage unit 17 (step S219).

When it is determined that the inclination of the temperature curve produced is larger than the inclination of the set temperature curve, it means that the acceleration/deceleration heat generation amounts $Q_{RA}$ and $Q_{CA}$ for the two feed modes of rapid and cutting feeds are larger than the rated heat generation amount $Q_T$ of the drive means. Therefore, the computation is executed for setting the acceleration/deceleration time constants $\tau_r$ and $\tau_C$ for each feed axis to a proper value (step S221).

The acceleration/deceleration time constants $\tau_r$ and $\tau_C$ for each feed axis thus computed are delivered to the interpolation and acceleration/deceleration control unit 13 of the NC unit through the parameter storage unit 25. In other words, the acceleration/deceleration time constants $\tau_r$ and $\tau_C$ are temporarily stored in the parameter storage unit 25 and are output to the interpolation and acceleration/deceleration control unit 13 at an appropriate timing in keeping with the progress of operation of the numerically controlled machine tool 1 (step S222).

When it is determined that the inclination of the temperature curve thus produced is smaller than the inclination of the set temperature curve, on the other hand, the acceleration/deceleration time constants are computed and adjusted to have the initially set acceleration/deceleration time constants $\tau_{C0}$ and $\tau_{r0}$ or to approach $\tau_{C0}$ and $\tau_{r0}$, respectively, and are then output to the interpolation and acceleration/deceleration control unit 13 at an appropriate timing in the same manner as in the preceding case (step S223).

By the way, the temperature curve of the drive means can be in such a form, other than the graph shown in FIG. 15, that the relation between the time T and the inclination θ is expressed as a numerical table at predetermined time intervals.

Figure 7:
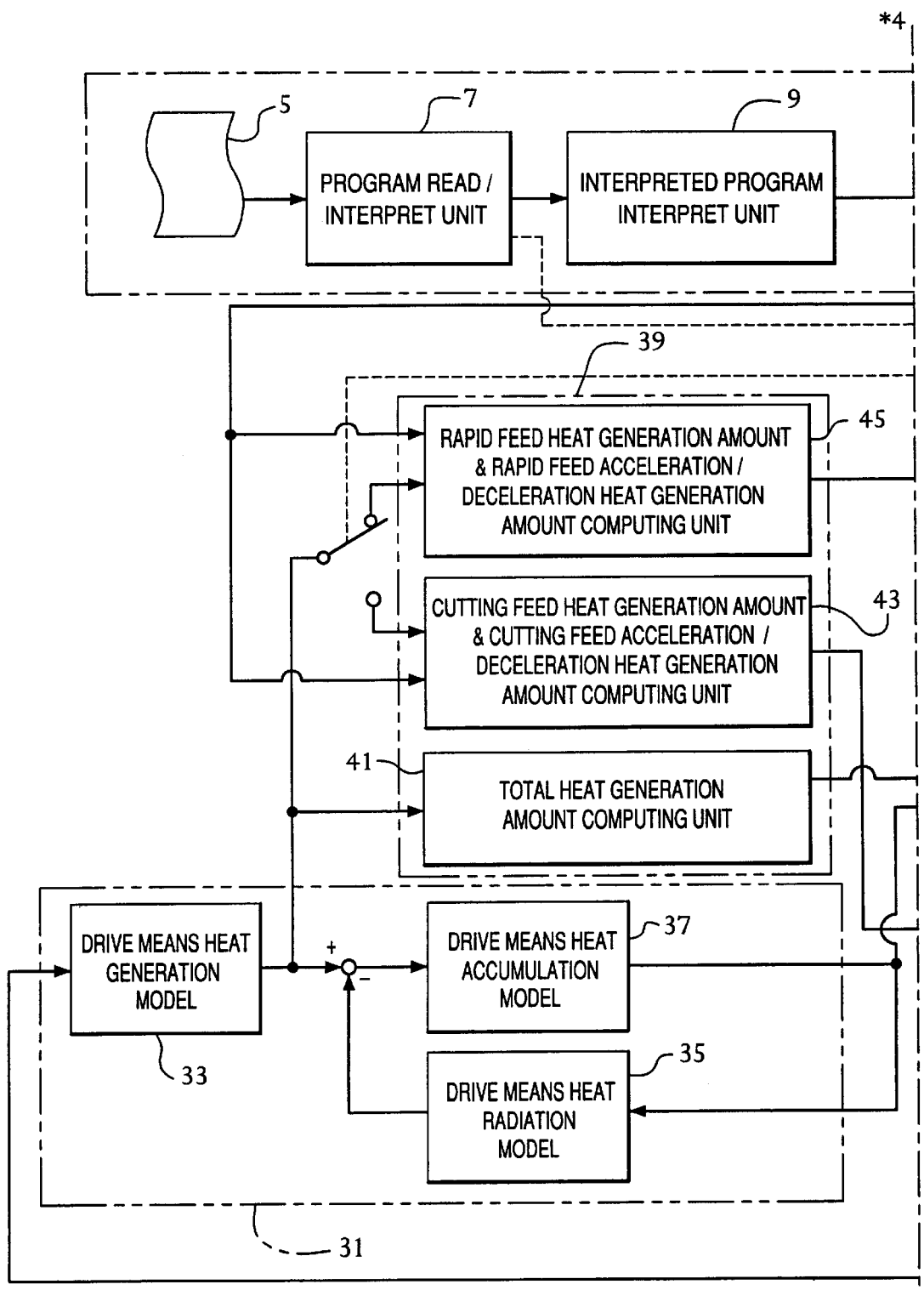
FIG. 7 is a block diagram showing the left half portion of the configuration, divided for brevity's sake, of a control unit of a numerically controlled machine tool according to a fourth embodiment of the present invention.
Figure 8:
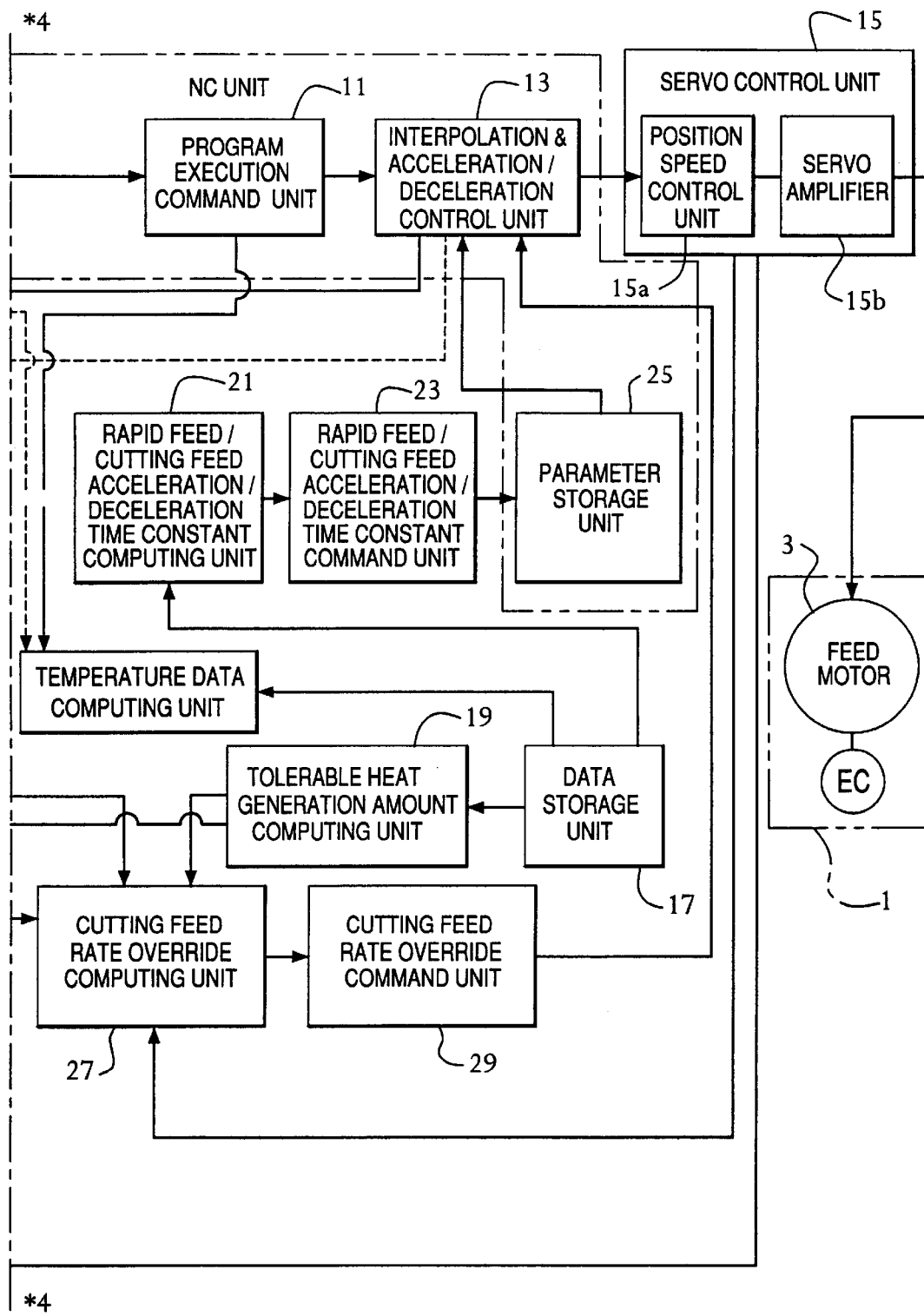
FIG. 8 is a block diagram showing the right half portion of the configuration, divided for brevity's sake, of the control unit of the numerically controlled machine tool according to the fourth embodiment of the present invention.

Now, an explanation will be provided with regard to the configuration and the operation for a method and an apparatus for controlling the numerically controlled machine tool according to a fourth embodiment of the invention with reference to FIGS. 7 and 8.

The fourth embodiment is a modification of the above-described third embodiment. Specifically, the third embodiment takes into consideration the inclination θ of the temperature curve of the drive means in computing the acceleration/deceleration time constant for the rapid feed and the cutting feed of the drive means, whereas the fourth embodiment takes into consideration the number of times the rapid feed or cutting feed is accelerated or decelerated.

The normal control process starting from the NC program 5 to the drive control of the feed motor 3 of the numerically controlled machine tool 1 is the same in the fourth embodiment as in the first to third embodiments described above. Therefore, only the difference in configuration will be described below.

First, as in the third embodiment, the fourth embodiment includes the temperature data computing unit 47. The temperature data computing unit 47 of the fourth embodiment, however, is not configured to acquire the current data or the torque command data from the servo control unit 15. Specifically, the temperature data computing unit 47 is connected in such a manner as to be supplied with the command data from the program read and interpret unit 7 or the program execution command unit 11 of the NC unit on the one hand and connected to the data storage unit 17 and the rapid feed/cutting feed acceleration/deceleration time constant computing unit 21 on the other hand.

Figure 17:
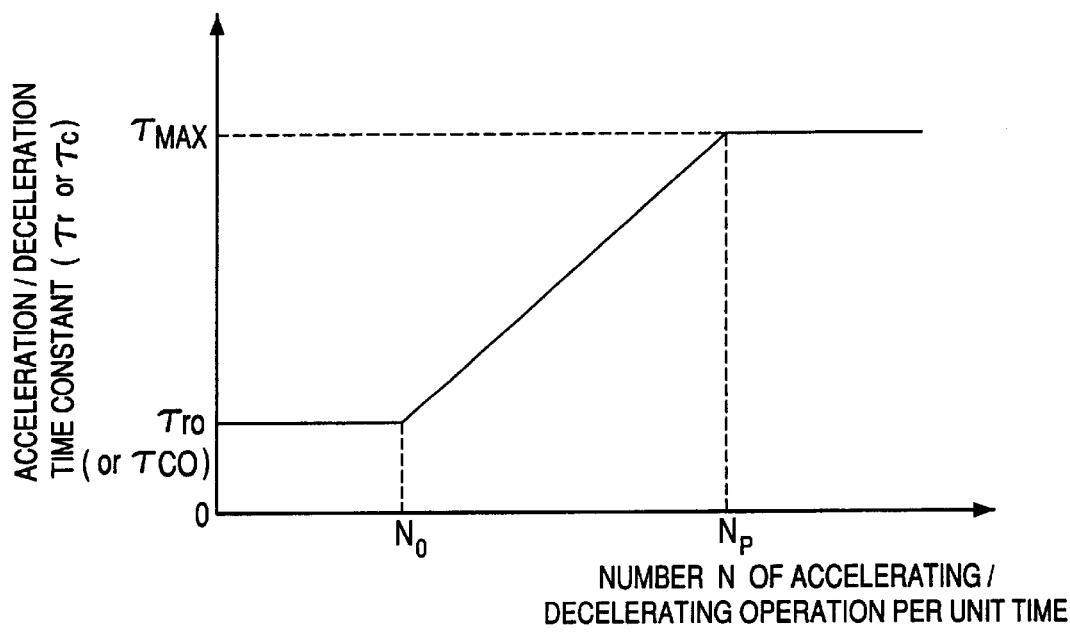
FIG. 17 is a graph showing the relation between the number of times accelerated/decelerated per unit time and the acceleration/deceleration time constant τ according to the fourth/embodiment.

The data storage unit 17 has set and stored therein, as determined by experiments in advance, the initial values of the acceleration/deceleration time constants $\tau_{r0}$ and $\tau_{C0}$ for rapid feed and cutting feed, respectively, of the feed axis adapted to the numerically controlled machine tool 1, the tolerable number of times accelerated/decelerated per unit time of the drive means of a feed axis and the relation between the number of times accelerated/decelerated per unit time of the drive means of the feed axis and the acceleration/deceleration time constants $\tau_{r0}$ and $\tau_{C0}$ of the feed axis as shown in FIG. 17. Also, whenever required, the weight of a workpiece to be machined, and the sizes of the feed motor 3 and the servo amplifier 15b are also set and stored in the data storage unit 17.

The temperature data computing unit 47, which predictively computes the temperature data of the feed axis drive means, counts and computes the number N of times accelerated/decelerated per unit time as temperature data, taking into consideration the number of times accelerated/decelerated of the feed axis per unit time correlated with the temperature of the drive means. In the process, the number N of times accelerated/decelerated per unit time is counted by receiving the same program data as those transferred to the interpolation and acceleration/deceleration control unit 13 from the program execution command unit 11 (or the program read and interpret unit 7 as shown by dashed line) in accordance with the progress of the operation.

The rapid feed/cutting feed acceleration/deceleration time constant computing unit 21, upon receipt of the result of computation from the temperature data computing unit 47, computes and outputs the acceleration/deceleration time constants $\tau_r$ and $\tau_C$ of the feed axis adapted to the state at each moment based on the relation between the number N of times accelerated/decelerated per unit time and the acceleration/deceleration time constants $\tau_r$ and $\tau_C$ stored in the data storage unit 17. The rapid feed/cut feed acceleration/deceleration time constant command unit 23 issues as a command the acceleration/deceleration time constants $\tau_r$ and $\tau_C$ of the feed axis conforming to the state at each moment output from the rapid feed/cutting feed acceleration/deceleration time constant computing unit 21 to the interpolation and acceleration/deceleration control unit 13 through the parameter storage unit 25 of the NC unit in timing with the progress of operation of the numerically controlled machine tool 1. In initial stages of control process, the preset acceleration/deceleration time constants $\tau_{r0}$ and $\tau_{C0}$ are directly delivered from the data storage unit 17 to the interpolation and acceleration/deceleration control unit 13.

Also in the fourth embodiment comprising the drive means heat generation amount computing unit 31 and the feed heat generation amount computing unit 39, on the other hand, the temperature of the drive means (the feed shaft motor temperature MT, etc.), the rapid feed heat generation amount $Q_R$, the rapid feed acceleration/deceleration heat generation amount $Q_{RA}$, the cutting feed heat generation amount $Q_C$, the cut feed acceleration/deceleration heat generation amount $Q_{CA}$, the cutting load heat generation amount $Q_{CL}$, the total heat generation amount $Q_A$, etc. are computed and output at each moment based on the current data or the torque command data of the drive means from the servo control unit 15. Thus, the cutting feed rate override computing unit 27 computes the proper feed rate override value FV for cutting feed of the feed axis from the total heat generation amount $Q_A$ at each moment of the drive means as related to the cutting load based on the command data of the cutting load value fetched at each moment from the servo control unit 15, the cutting load heat generation amount $Q_{CL}$, and the tolerable heat generation amount $Q_a$ of the drive means computed by the tolerable heat generation amount computing unit 19. The feed rate override value FV thus computed is transferred as a command to the interpolation and the acceleration/deceleration control unit 13 through the cutting feed rate override command unit 29. This configuration of giving the cutting feed rate override value FV as a command is exactly the same as that of the first to third embodiments described above.

Now, a control method according to the fourth embodiment will be described with reference to the flow charts of FIGS. 26, 27 and 28.

Figure 26:
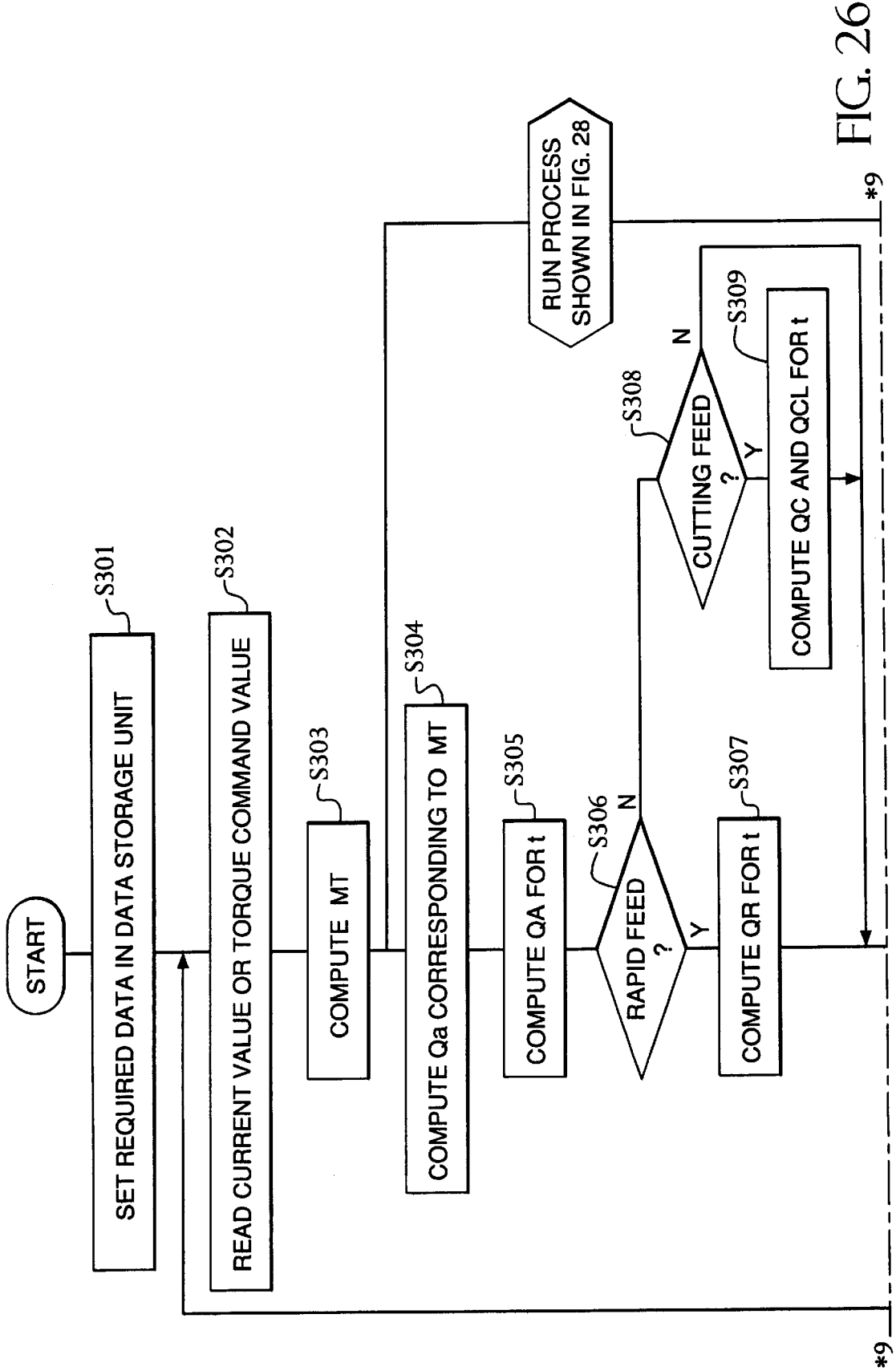
FIG. 26 shows the first half portion of the flowchart representing a part of the control steps of a control method according to the fourth embodiment.
Figure 27:
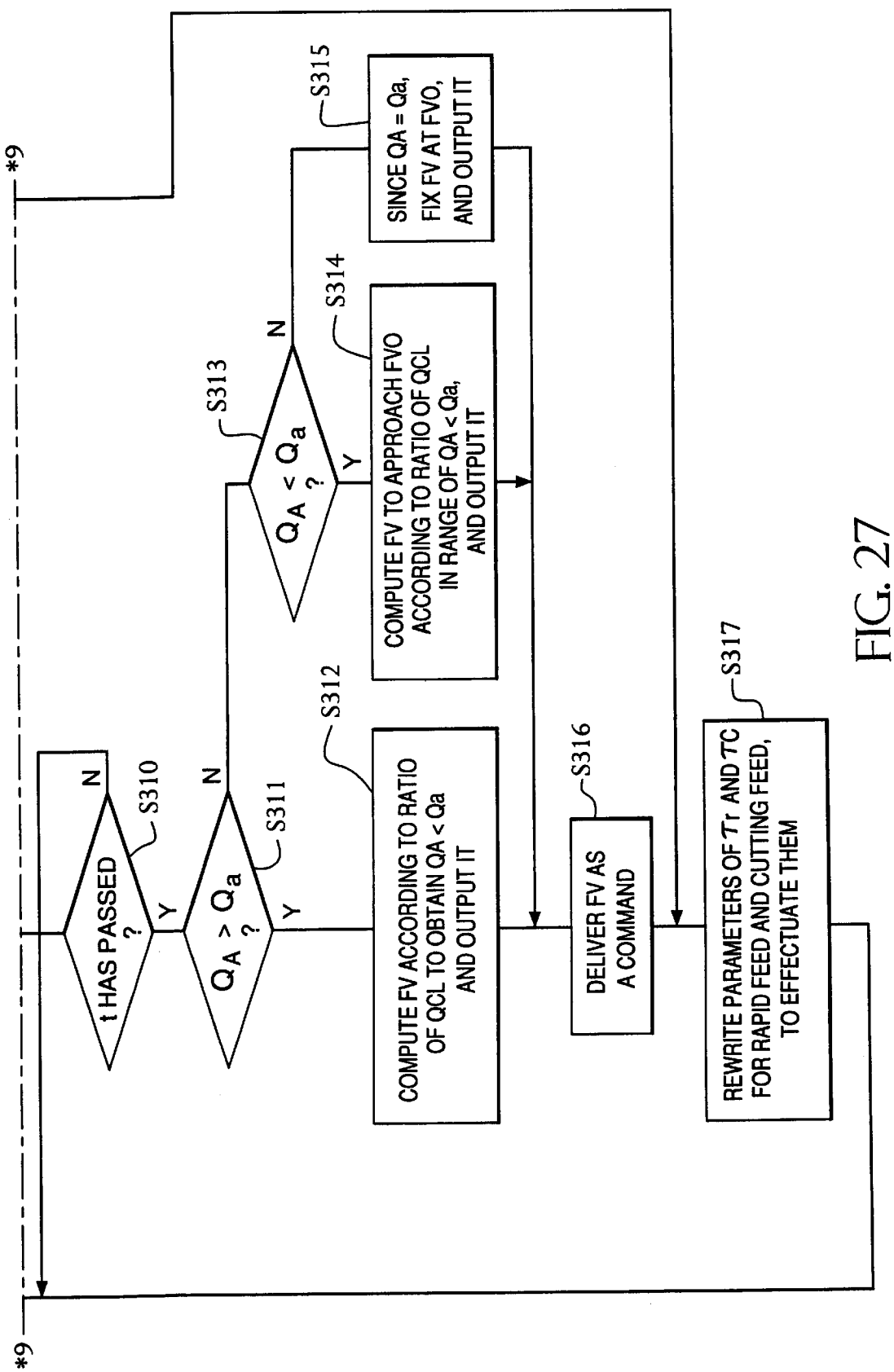
FIG. 27 shows the last half portion of the same flowchart.

The flow charts of FIGS. 26 and 27 are for explaining the process of computing the override value FV of the cutting feed rate of the drive means in the cutting feed rate override computing unit 27 based on the total heat generation amount $Q_A$, the tolerable heat generation amount $Q_a$, the cutting feed heat generation amount $Q_C$ and the cutting feed acceleration/deceleration heat generation amount $Q_A$ computed by simulation of the drive means, taking the total heat generation amount $Q_A$ and the cutting load heat generation amount $Q_{CL}$ as conditions for determination, and the process of outputting them to the interpolation and acceleration/deceleration control unit 13 of the NC unit.

These steps S301 through S316, which are identical to steps S201 through S216 of the above-described third embodiment, are simply a replacement of steps S201 through S216 of the third embodiment and, accordingly, will not be described in detail.

Figure 28:
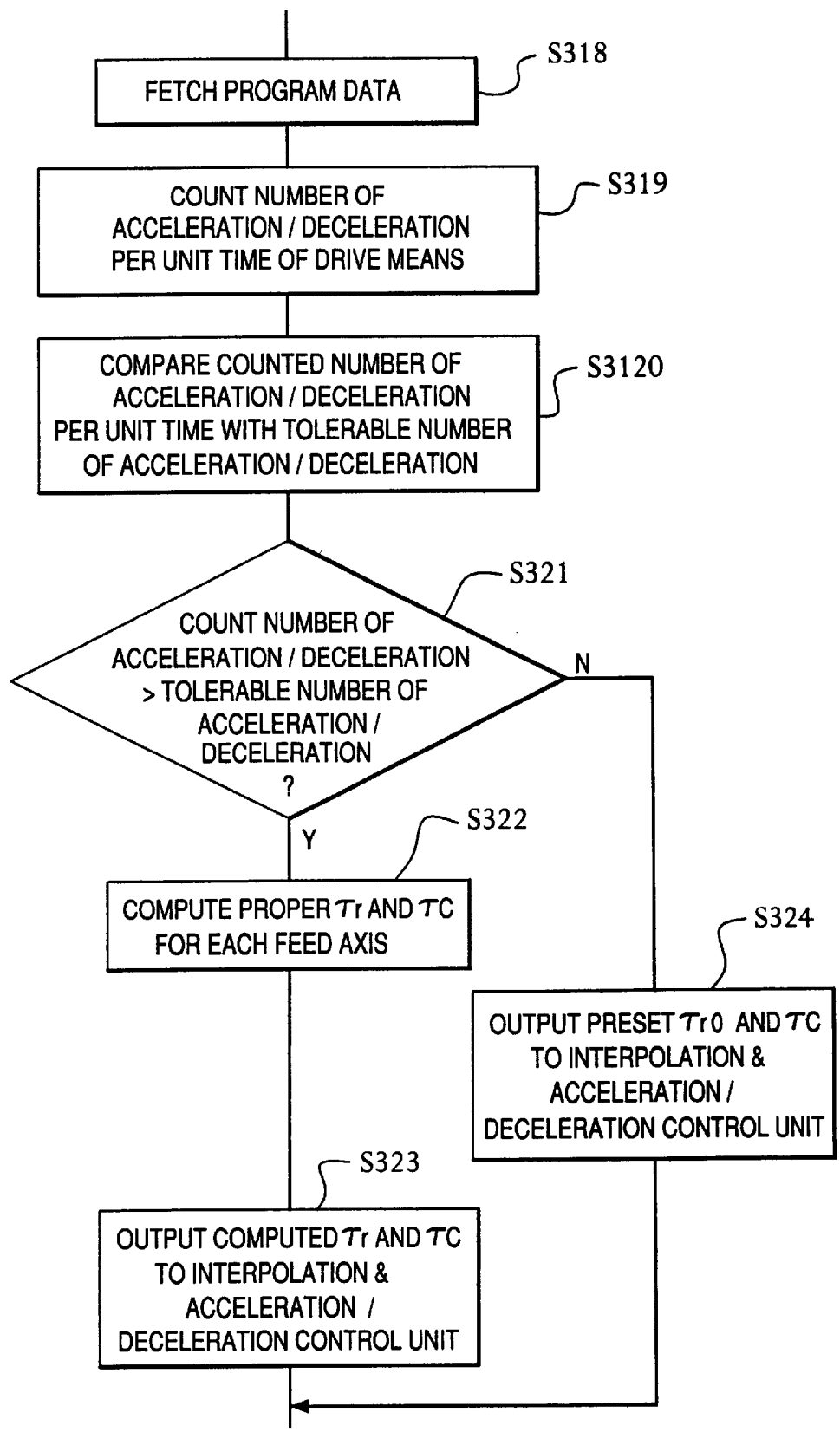
FIG. 28 is a flowchart showing the remaining portion of the control steps of a control method according to the fourth embodiment.

The process of FIG. 28 shown in the flow charts of FIGS. 26 and 27, however, will be described below with reference to the flow chart of FIG. 28.

FIG. 28 illustrates the process executed by the rapid feed/cutting feed acceleration/deceleration time constant computing unit 21. As described above, the temperature data computing unit 47 reads the program data delivered from the program read and interpret unit 7 or the program execution command unit 11 of the NC unit (step S318). Then, the temperature data computing unit 47 counts the number of times accelerated/decelerated per unit time of the drive means based on the program data thus read (step S319).

Further, the number N of times accelerated/decelerated per unit time as well as the tolerable number of times accelerated/decelerated per unit time for the drive means set and stored in the data storage unit 17 in advance are read. Thus, the counted number N of times accelerated/decelerated is compared with the tolerable number of times accelerated/decelerated (step S320), and it is determined whether or not the counted number N of times accelerated/decelerated has exceeded the tolerable number of times accelerated/decelerated (step S321). As a result, when the result of determination shows that the counted number N of times accelerated/decelerated exceeds the tolerable number of times accelerated/decelerated, the proper acceleration/deceleration time constants $\tau_r$ and $\tau_C$ adapted to the feed axis at that particular time point are computed from the relation shown in FIG. 17 between the number of times accelerated/decelerated per unit time and the feed axis acceleration/deceleration time constants $\tau_r$ and $\tau_C$ fetched from the data storage unit 17 (step S322). The computed acceleration/deceleration time constants $\tau_r$ and $\tau_C$ are transferred to the interpolation and acceleration/deceleration control unit 13 of the NC unit through the rapid feed/cutting feed acceleration/deceleration time constant command unit 23 and the parameter storage unit 25 (step S323).

When the determination in step S321 indicates that the number N of times accelerated/decelerated does not exceed the tolerable number of times accelerated/decelerated, it means that the number N of times accelerated/decelerated is less than or equal to the tolerable number of times accelerated/decelerated. Therefore, the accelerated/deceleration time constants are computed and adjusted to reach or approach the feed axis acceleration/deceleration time constants $\tau_{r0}$ and $\tau_{C0}$ set in step S301 and transferred to the interpolation and acceleration/deceleration control unit 13 of the NC unit through the rapid feed/cutting feed acceleration/deceleration time constant command unit 23 and the parameter storage unit 25 (step S324). Then, the interpolation and acceleration/deceleration control unit 13 effectuates by rewriting the parameters including the rapid feed/cutting feed acceleration/deceleration time constants $\tau_r$, $\tau_C$ (step S317 in FIG. 27).

In FIG. 17, the feed axis acceleration/deceleration time constant $\tau_r$ or $\tau_C$ has an upper limit $\tau_{MAX}$. It should be understood that this upper limit value is an acceleration/deceleration time constant at which the drive means is not overheated even when the acceleration/deceleration is continuously repeated, and there exists a maximum number $N_P$ of times accelerated/decelerated per unit time corresponding to $\tau_{MAX}$. Namely, as far as N is larger than $N_P$, $\tau_r$ and $\tau_C$ becomes $\tau_{MAX}$. In the fourth embodiment, taking into account the fact that the temperature of the drive means and the number of times accelerated/decelerated per unit time are correlated to each other, it is assumed that the process of counting the number N of times accelerated/decelerated per unit time as temperature data in the temperature data computing unit 47 is equivalent to the process of computing the temperature data. Of course, the temperature of the drive means can be predictively computed from the counted number N of times accelerated/decelerated per unit time and the weight of a workpiece to be machined which is set and stored in the data storage unit 17 in advance, and the acceleration/deceleration time constants for each feed mode of the feed axis can be controlled in a manner similar to the aforementioned embodiments.

Figure 9:
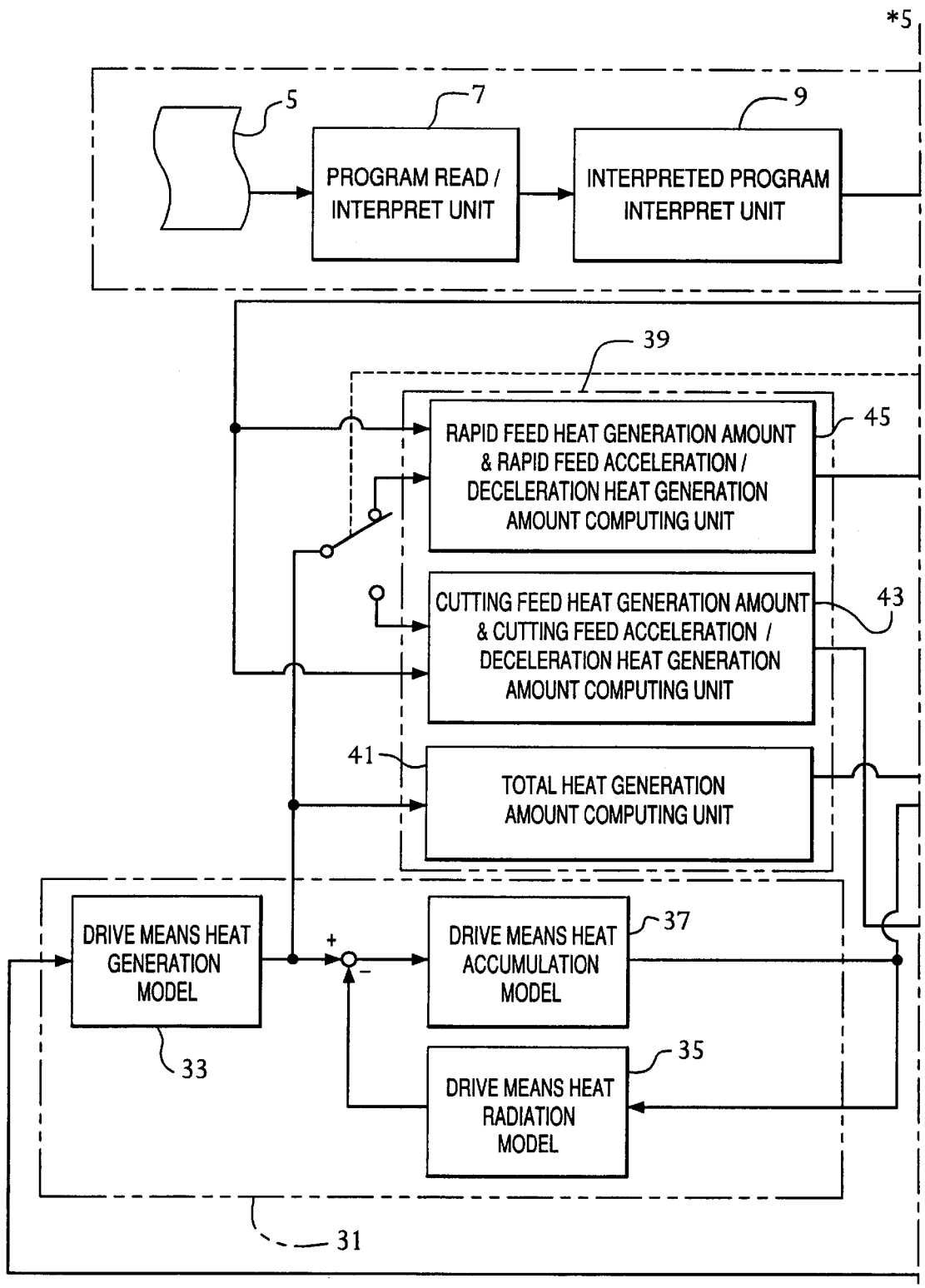
FIG. 9 is a block diagram showing the left half portion of the configuration, divided for brevity's sake, of a control unit of a numerically controlled machine tool according to a fifth embodiment of the present invention.
Figure 10:
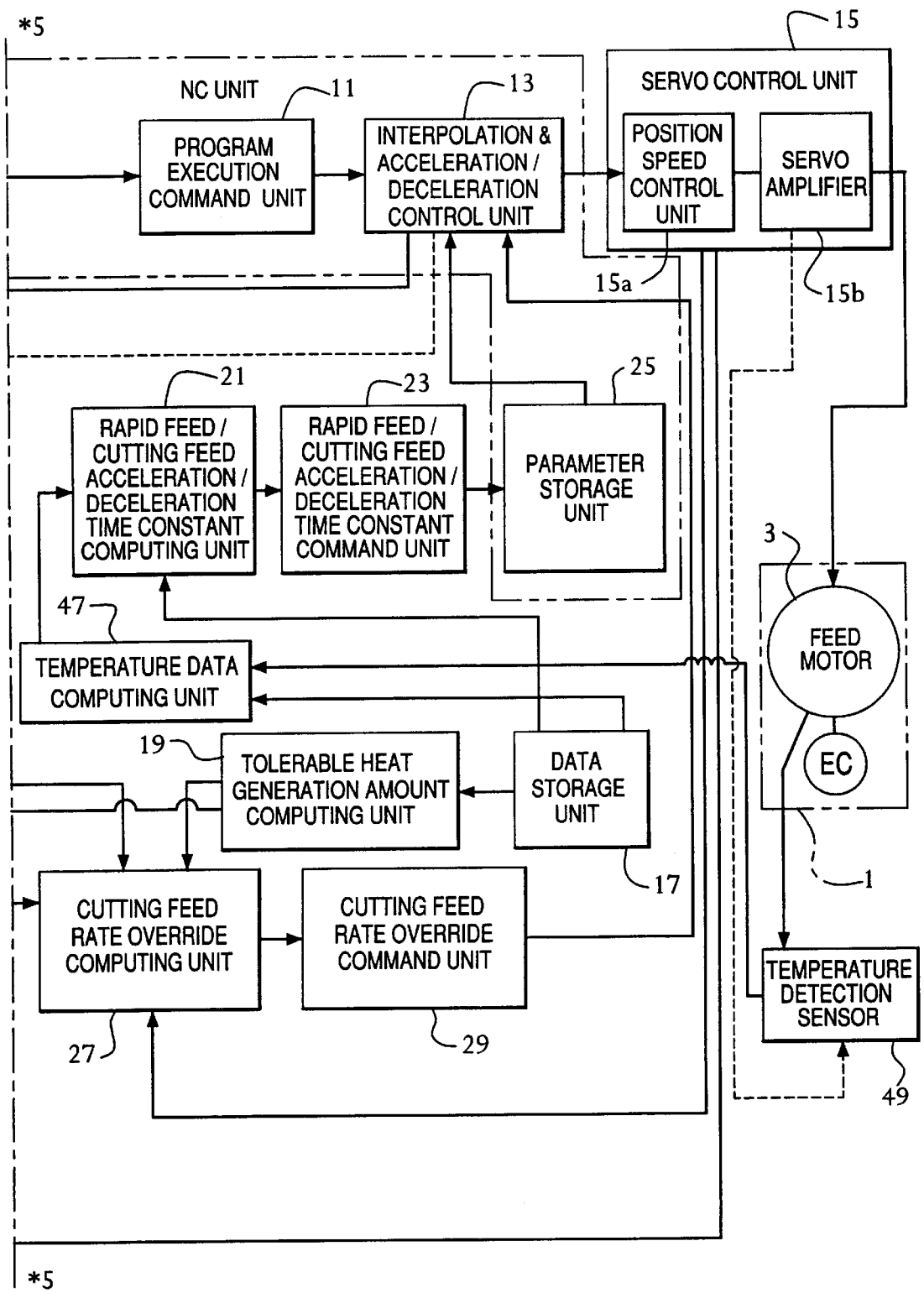
FIG. 10 is a block diagram showing the right half portion of the configuration, divided for brevity's sake, of the control unit of a numerically controlled machine tool according to the fifth embodiment of the present invention.

The configuration and operation of a method and an apparatus for controlling a numerically controlled machine tool according to a fifth embodiment of the present invention will be described below with reference to FIGS. 9 and 10.

The fifth embodiment may be considered as a modification of the third embodiment described above. Also, in the fifth embodiment, the normal control operation starting from the NC program 5 to the drive control of the feed motor 3 of the numerically controlled machine tool 1 is identical to the corresponding control operation in the afore-described first through fourth embodiments. Therefore, only the description of different parts of the configuration will be provided below.

In the afore-described third embodiment, the acceleration/deceleration time constants $\tau_r$ and $\tau_C$ for rapid feed and cutting feed are computed in the temperature data computing unit 47 based on the relation between the inclination θ of the temperature curve exhibited by the drive means and a preset inclination of the temperature curve taking the particular inclination θ into account. In accordance with the fifth embodiment, on the other hand, a temperature detection sensor 49 for measuring the temperature of the feed motor 3 is further provided (the temperature measurement for the servo amplifier 15b is effected by the temperature detection sensor 49 as shown by dotted line) for computing the acceleration/deceleration time constants for rapid feed and cutting feed, so that the actual temperature measurement of the drive means is delivered to the temperature data computing unit 47 thereby to produce the actual temperature measurement data. Also, the acceleration/deceleration time constants $\tau_r$ and $\tau_c$ for the two modes of rapid feed and cutting feed are computed in the rapid feed/cutting feed acceleration/deceleration time constant computing unit 21 based on the relation with the tolerable temperature data set and stored in advance in the data storage unit 17, i.e. the data of the tolerable temperature experimentally determined in advance by the continuous operation of the drive means at the rated current, and the acceleration/deceleration time constant thus computed is used for the controlling operation.

The data storage unit 17 has set and stored therein, together with the above-described tolerable temperature data, the experimentally determined acceleration/deceleration time constants $\tau_r$ and $\tau_c$ providing the initial values as related to the tolerable temperature for rapid feed and cutting feed of the feed axis adapted to the numerically controlled machine tool 1. Also, the relation between the detection temperature of the temperature detection sensor 49 and the actual temperature data of the drive means is determined by experiments and set and stored. Further, the size, etc. of the feed motor 3 for each feed axis and the servo amplifier 15b are also set and stored.

In the temperature data computing unit 47, the actual temperature of the drive means (both the feed motor 3 and the servo amplifier 15b) is computed from the temperature data received from the temperature detection sensor 49 based on the relation between the detected temperature data set and stored in the data storage unit 17 in advance and the actual temperature. The rapid feed/cutting feed acceleration/deceleration time constant computing unit 21 fetches the actual temperature data of the drive means from the temperature data computing unit 47 and the predetermined tolerable temperature of the drive means from the data storage unit 17, compares the two temperatures and, in accordance with the result of comparison, computes and outputs the acceleration/deceleration time constants $\tau_r$ and $\tau_c$ for rapid feed and cutting feed of the feed axis. At the same time, the rapid feed/cutting feed acceleration/deceleration time constant command unit 23 supplies the interpolation acceleration/deceleration control unit 13, through the parameter storage unit 25 of the NC unit, with the acceleration/deceleration time constants $\tau_r$ and $\tau_c$ for rapid feed and cutting feed of the feed axis adapted for each state output from the rapid feed/cutting feed acceleration/deceleration time constant computing unit 21 as a command, in time with the progress of the operation of the numerically controlled machine tool 1.

In the initial stages of control, the initial acceleration/deceleration time constants $\tau_{r0}$ and $\tau_{c0}$ are directly delivered to the interpolation and acceleration/deceleration control unit 13 from the data storage unit 17.

Also in the fifth embodiment, there are provided the drive means heat generation amount computing unit 31 and the feed heat generation amount computing unit 39, which compute and output at each moment the temperature of the drive means (feed motor temperature MT), the rapid feed heat generation amount $Q_R$, the rapid feed acceleration/deceleration heat generation amount $Q_{RA}$, the cutting feed heat generation amount $Q_C$, the cutting feed acceleration/deceleration heat generation amount $Q_{CA}$, the cutting load heat generation amount $Q_{CL}$ and the total heat generation amount $Q_A$ based on the current data or the torque command data of the drive means from the servo control unit 15. Therefore, the cutting feed override computing unit 27 computes an adequate feed rate override value FV for the cutting feed of the feed axis from the total heat generation amount $Q_A$ at each moment of the drive means associated with the cutting load, based on the command data of the cutting load value fetched each moment from the servo control unit 15, the cutting load heat generation amount $Q_{CL}$ and the tolerable heat generation amount $Q_a$ of the drive means which is computed by the tolerable heat generation amount computing unit 19. The feed rate override value FV thus computed is provided as a command output to the interpolation and acceleration/deceleration control unit 13 of the NC unit through the cutting feed rate override command unit 29. This configuration of providing a command of the cutting feed rate override value FV is exactly the same as that of the first through fourth embodiments.

Now, a control method according to a fifth embodiment will be explained with reference to the flow charts shown in FIGS. 29, 30 and 31.

Figure 29:
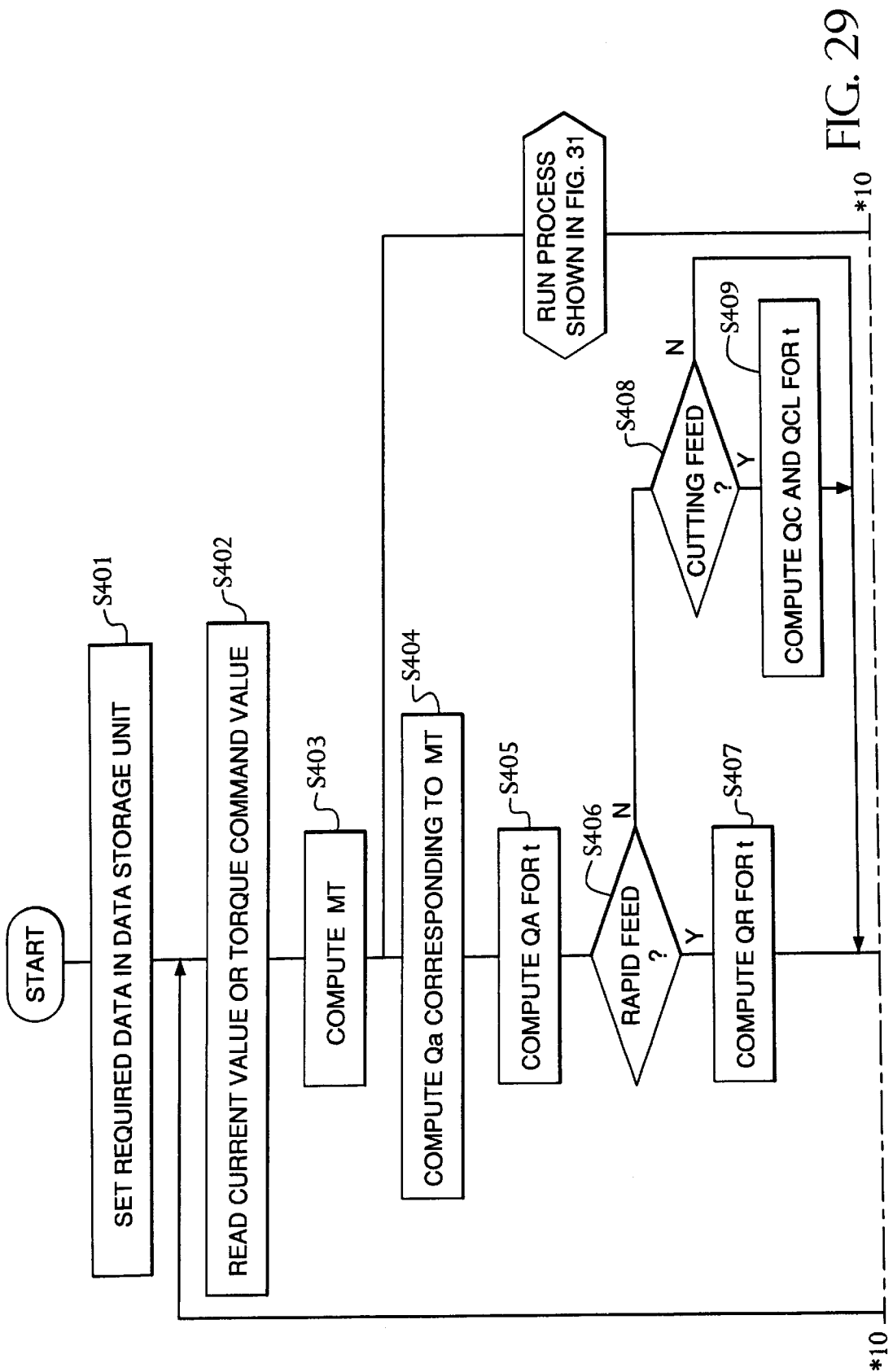
FIG. 29 shows the first half portion of the flowchart representing a part of the control steps of a control method according to the fifth embodiment.
Figure 30:
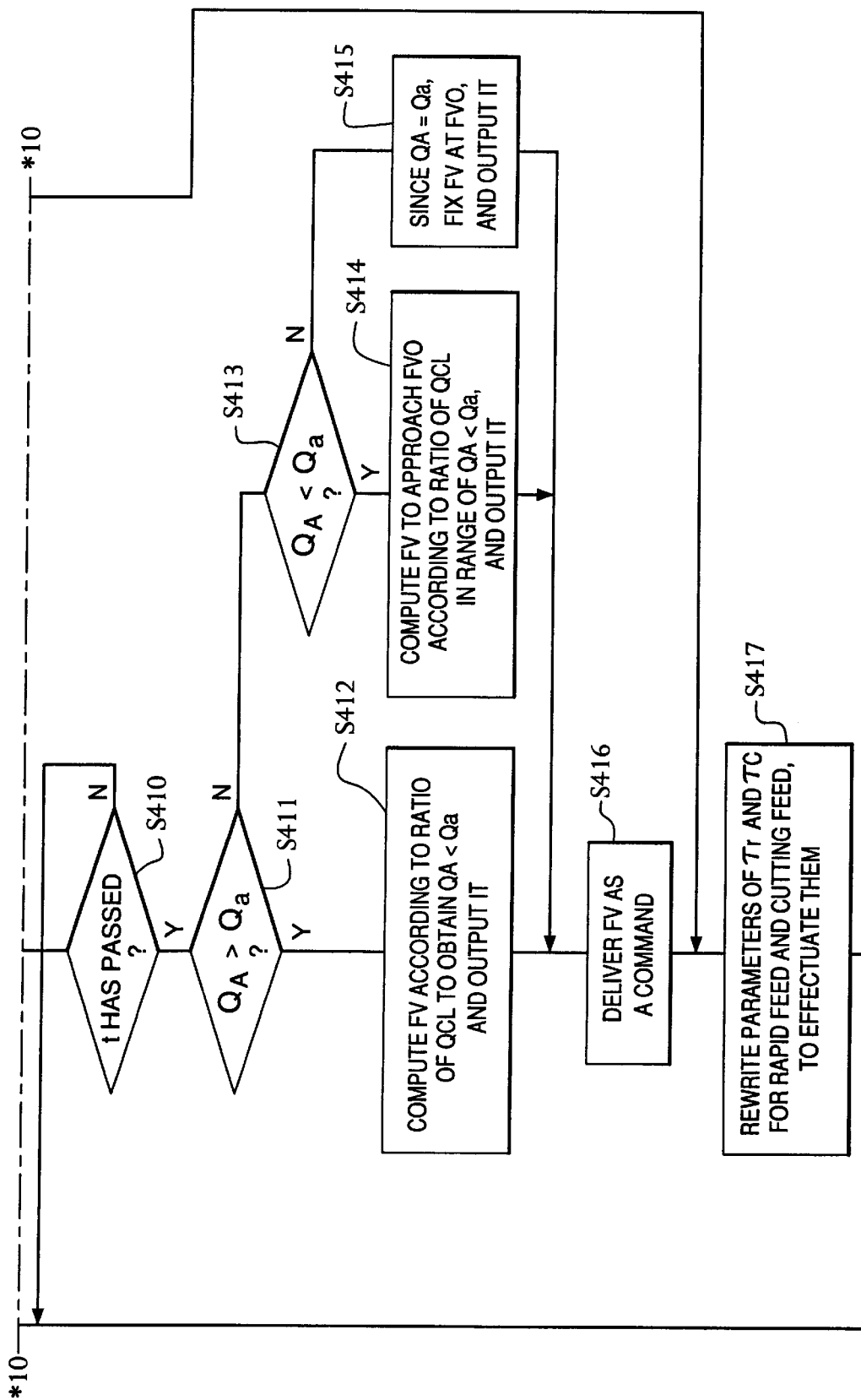
FIG. 30 shows the last half portion of the same flowchart.

The flow charts shown in FIGS. 29 and 30 explain the process in which the cutting feed rate override value FV is computed by the cutting feed rate override computing unit 27 based on the total heat generation amount $Q_A$ of the drive means computed by simulation, the tolerable heat generation amount $Q_a$, the cutting feed heat generation amount $Q_C$ and the cutting feed acceleration/deceleration heat generation amount $Q_{CA}$ by reference to the total heat generation amount $Q_A$ and the cutting load heat generation amount $Q_{CL}$ as conditions for determination, and is delivered as an output to the interpolation and acceleration/deceleration control unit 13 of the NC unit. The process of steps S401 through S416, which is identical to that of steps S201 through S216 and that of S301 through S316 in the third and fourth embodiments, and can be considered as only a replacement for either one of the latter two embodiments. Thus, detailed description of the process will be curtailed below for the sake of brevity. Nevertheless, the process of FIG. 31 appearing in the flow chart of FIGS. 29, 30 will be explained below with reference to the flow chart of FIG. 31.

Figure 31:
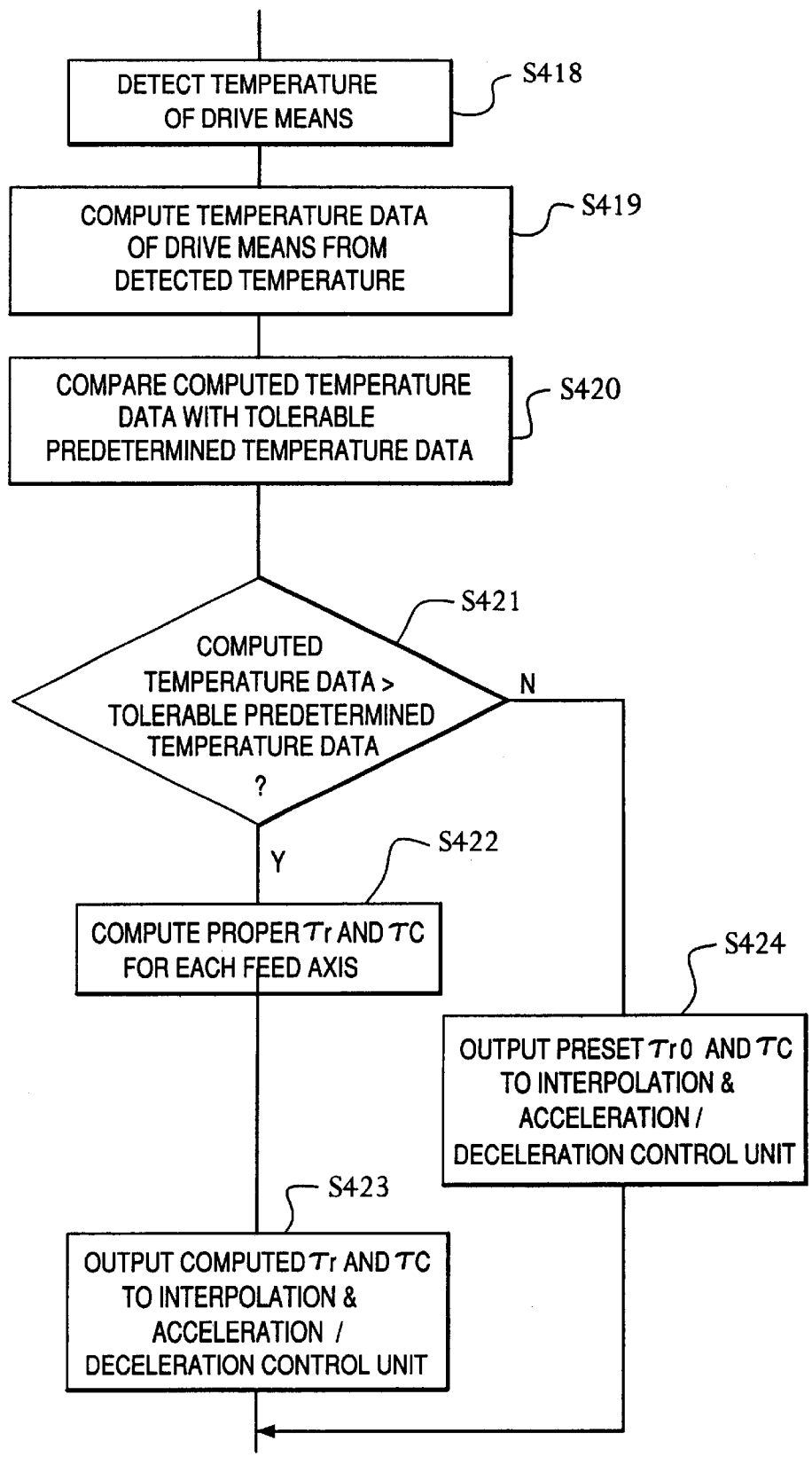
FIG. 31 is a flowchart showing the remaining portion of the control steps of a control method according to the fifth embodiment.

FIG. 31 illustrates the process executed by the temperature data computing unit 47, and as described above, the temperature data computing unit 47 receives at each moment the temperature detection value of the drive means from the temperature detection sensor 49 (step S418) on the one hand, and receives the information of the relation between the detected temperature data and the actual temperature of the drive means based on actual temperature tests from the data storage unit 17 on the other hand, so that the temperature data of the drive means is computed from these two types of data (step S419).

Figure 11:
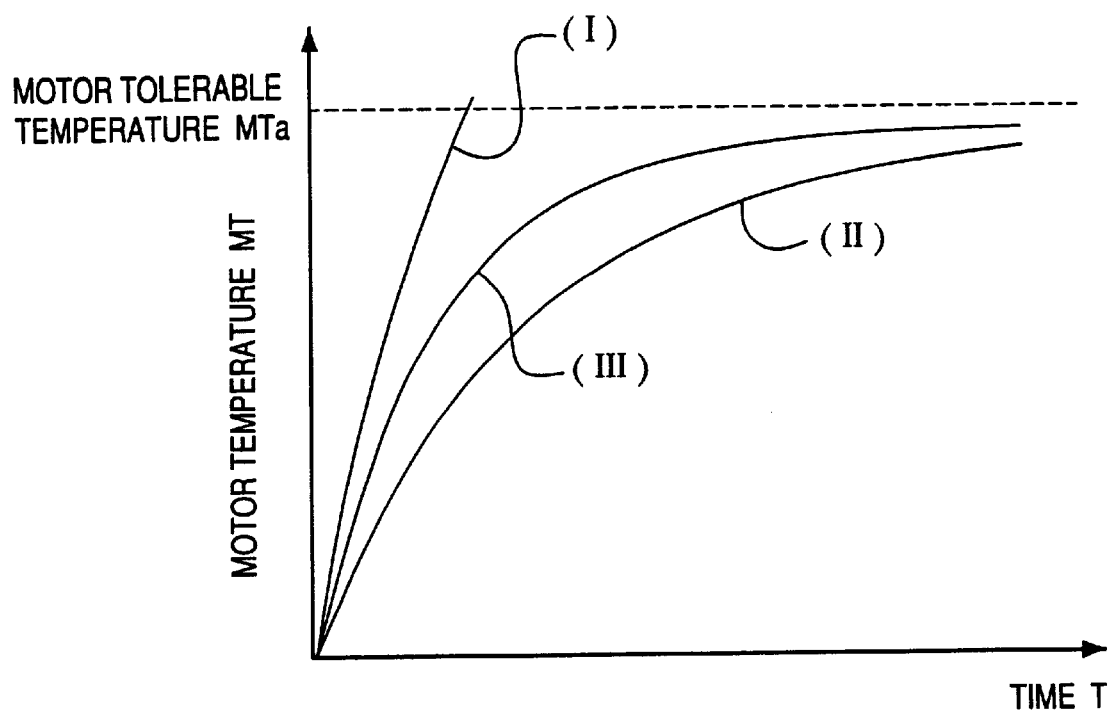
FIG. 11 is a graph showing temperature curves as against a motor tolerable temperature MTa, in which the abscissa thereof represents the time T and the ordinate thereof represents the motor temperature MT.

In the process, the rapid feed/cutting feed acceleration/deceleration time constant computing unit 21 compares the computed temperature data of the drive means with the predetermined tolerable temperature data MTa as shown in FIG. 11 fetched from the data storage unit 17 (step S420). Normally, the predetermined tolerable temperature data MTa is set to a level lower than the upper limit temperature causing an alarm state of the drive means according to thermal conditions and slightly higher than the shown temperature curve for the rated current.

In the case where the computed temperature data is higher than the tolerable predetermined temperature data MTa (Y in step S421), the acceleration/deceleration time constants τr and τc for the two modes of rapid feed and cutting feed of the feed axis are reduced by a preset amount into proper acceleration/deceleration time constants (step S422). The result of this computation is delivered to the interpolation and acceleration/deceleration control unit 13 through the rapid feed/cutting feed acceleration/deceleration time constant command unit 23 and the data storage unit 25 of the NC unit (step S423).

When the determination made in step S421 is N, i.e. in the case where the computed temperature data is not higher than the predetermined tolerable temperature data MTa, the acceleration/deceleration time constants of the feed axis are computed and adjusted to the acceleration/deceleration time constants τr0 and τc0 or near thereto, and directly sent out to the parameter storage unit 25 temporarily through the rapid feed/cutting feed acceleration/deceleration time constant command unit 23, and then to the interpolation and acceleration/deceleration control unit 13 (step S424). As a result, as shown in step S417 of FIG. 30, the interpolation and acceleration/deceleration control unit 13 rewrites the parameters of the acceleration/deceleration time constants τr and τc for rapid feed and cutting feed to effectuate them.

The value of the predetermined amount used in the computation for reducing the acceleration/deceleration time constants in step S422 is set and stored in advance in the data storage unit 17 in step S401.

With any of the configurations of the above-described first through fifth embodiments, the feed axis acceleration/deceleration time constants are finally and automatically controlled to adequate values in response to the temperature condition of the drive means at each moment. Also, in view of the fact that the cutting feed rate override value is set to a proper value, neither the servo amplifier 15b nor the feed motor 3 constituting the drive means causes overheating in any case.

The various embodiments are described above by referring, for convenience sake, to the case in which the numerically controlled machine tool performs the cutting operation. It should, however, be understood that the present invention is applicable not only to the process of cutting a workpiece but also to various numerically controlled machines for performing such works as pressing and laser beam machining with equal effect using the drive means including a servo amplifier or the like drive amplifier and a feed motor for driving the feed axis system. Also, the present invention is not limited to general machines but applicable also to robots and other various similar numerically controlled machines having a linear or rotational feed axis system and driven by the drive means similar to the one described above.

As will be understood from the foregoing description of the various embodiments of the present invention, the heat generation and the temperature of the drive means of a numerically controlled machine tool are computed by simulation by fetching command data based on a NC program. Thus, data are obtained at each moment including the total heat generation amount of the drive means, the rapid feed/cutting feed heat generation amount, the rapid feed/cutting feed acceleration/deceleration heat generation amount and the cutting load heat generation amount, or the temperature data are determined by computation from the current value or torque command value. Using these various data, the acceleration/deceleration time constants for the two feeds of rapid feed and cutting feed of the machine tool are computed and adjusted to adequate values. At the same time, the override value of the feed rate is computed to a value of a proper ratio with respect to the override value given as an instruction in the NC program in advance and effectuated by being fed back to the NC Control system. Thus, the drive means can be prevented from being overheated without changing the commanded feed rate based on the NC program.

In view of the fact that the feed rate override value is controlled in accordance with the heat generation amount of the cutting load, the drive means can continuously run while avoiding an overheated condition even in a machining process performed under a large cutting load. Thus, the machining efficiency of the machining operation under a large cutting load can be appreciably improved as compared with the conventional controlling method.

Further, in the process of computing the temperature of the drive means by simulation, the tolerable heat generation amount is made variable in accordance with the temperature of the drive means. When the feed motor is cool at low temperatures, for example, the tolerable heat generation amount is increased to allow the heat generation of the drive means to increase or, otherwise, the control operation is performed with versatility. Thus, the machining efficiency is further improved.

In addition, since the drive means is controlled automatically to avoid the overheated condition positively in advance, various burdens applied to an operator can be considerably reduced as compared with the prior art in which an operator must participate in the operation of a numerically controlled machine tool in order to take into consideration the machining conditions for preventing overheating.

What is claimed is:

1. A method of controlling a numerically controlled machine tool by performing a numerical control program supplied from a read and interpret unit of a numerical control unit to control a drive means of at least one feed axis via an execution command unit, an interpolation unit and a servo control unit, comprising the steps of:

presetting acceleration/deceleration time constants for rapid feed and cutting feed of the feed axis, and data on a predetermined temperature and data on a predetermined heat generation amount tolerable for said drive means of said feed axis;

computing a temperature of said drive means based on control data of said numerical control program;

determining a heat generation amount tolerable for said drive means in accordance with the computed temperature of said drive means;

computing a total amount of heat generation of said drive means within a predetermined time, a rapid feed heat generation amount within a predetermined during a rapid feed operation and a cutting feed heat generation amount within a predetermined time during a cutting feed operation, based on the control data of said numerical control program;

comparing each of said computed total heat generation amount within the predetermined time, the rapid feed heat generation amount within the predetermined time and the cutting feed heat generation within the predetermined time with the fore-determined tolerable heat generation amount, respectively; and controlling an acceleration/deceleration time constant for at least one of the rapid feed operation and the cutting feed operation of said feed axis in accordance with a result of said comparing step.

2. A method of controlling a numerically controlled machine tool by executing a numerical control program fetched from a read and interpret unit of a numerical control unit to control a drive means of at least one feed shaft via an execution command unit, an interpolation unit and a servo control unit, comprising the steps of:

presetting acceleration/deceleration time constants for rapid and cutting feed operations of said feed axis, a cutting feed rate, and predetermined temperature and heat generation amount data tolerable for said drive means of said feed axis;

computing a temperature of said drive means based on control data of said numerical control program;

determining an amount of heat generation tolerable for said drive means in accordance with the computed temperature of said drive means;

computing, during the cutting feed operation, a cut feed heat generation amount and a cutting load heat generation amount in response to a cutting load, based on control data of said numerical control program;

comparing said predetermined tolerable heat generation amount with said computed cutting feed heat generation amount; and controlling a cutting feed rate of said feed axis from the result of said comparing step while taking a ratio that said computed amount of the cutting load heat generation represents of said cutting feed heat generation amount into consideration.

3. A method of controlling a numerically controlled machine tool by performing a numerical control program fetched from a read and interpret unit of a numerical control unit to control a drive means of at least one feed axis via an execution command unit, an interpolation unit and a servo control unit, comprising the steps of:

presetting acceleration/deceleration time constants $\tau_{r0}$ and $\tau_{C0}$ during rapid and cutting feed operations, respectively, of said feed axis, and temperature data representing a predetermined temperature MT and heat generation amount data representing a predetermined heat generation amount Qa which are tolerable for said drive means of said feed axis;

computing the temperature and the heat generation amount at each moment of said drive means from the current data or the torque command data output from said servo control unit to said drive means;

determining the heat generation amount Qa tolerable within a predetermined time t of said drive means in accordance with said computed temperature at each moment;

computing the total heat generation amount $Q_A$ within said predetermined time t, the rapid feed heat generation amount $Q_R$ at the time of rapid feed and the cutting feed heat generation amount $Q_C$ at the time of cutting feed of said drive means from said computed heat generation amount at each moment;

comparing said computed total heat generation amount $Q_A$ within the predetermined time t with said determined tolerable heat generation amount Qa;

computing the acceleration/deceleration time constants $\tau_r$ and $\tau_C$ for rapid feed and cutting feed, respectively, of said feed axis in accordance with the ratio which said rapid feed heat generation amount $Q_R$ and said cutting feed heat generation amount $Q_C$ represents of said total heat generation amount $Q_A$ within said predetermined time t, in the case where the total heat generation amount $Q_A$ within said predetermined time t is larger than said tolerable heat generation amount Qa; and controlling the acceleration/deceleration time constants for rapid feed and cutting feed of said feed axis by changing the set time constants $\tau_{r0}$ and $\tau_{C0}$ to said computed acceleration/deceleration time constants $\tau_r$ and $\tau_C$, respectively.

4. The method of controlling a numerically controlled machine tool according to claim 3, further comprising the steps of:

computing a rapid feed acceleration/deceleration heat generation amount $Q_{RA}$ at the time of rapid feed acceleration/deceleration and a cutting feed acceleration/deceleration heat generation amount $Q_{CA}$ at the time of cutting feed acceleration/deceleration of said drive means within said predetermined time t from said computed heat generation amount at each moment;

comparing said rapid feed heat generation amount $Q_R$ and said cut feed heat generation amount $Q_C$ within said computed predetermined time t with said determined tolerable heat generation amount Qa;

computing said acceleration/deceleration time constants $\tau_r$ and $\tau_C$ for rapid feed and cutting feed of said feed axis in accordance with a ratio between said rapid feed acceleration/deceleration heat generation amount $Q_{RA}$ and said cutting feed acceleration/deceleration heat generation amount $Q_{CA}$ in the case where one of said rapid feed heat generation amount $Q_R$ and said cutting feed heat generation amount $Q_C$ within said predetermined time t is larger than said tolerable heat generation amount Qa; and adjustably changing said acceleration/deceleration time constants for the rapid and cutting feed operations of said feed axis from said set acceleration/deceleration time constants $\tau_{r0}$ and $\tau_{C0}$ to said computed acceleration/deceleration time constants $\tau_r$ and $\tau_C$.

5. The method of controlling a numerically controlled machine tool according to claim 3, further comprising the steps of:

setting a cutting feed rate $FV_0$ of said feed axis;

computing a cutting load heat generation amount $Q_{CL}$ corresponding to a cut load applied to said drive means from current data or torque command data transferred from said servo control unit to said drive means;

comparing said computed total heat generation amount $Q_A$ within said predetermined time t and said cutting feed heat generation amount $Q_C$ with said determined tolerable heat generation amount Qa, respectively;

computing a cutting feed rate FV of said feed axis in accordance with a ratio which said computed cutting load heat generation amount $Q_{CL}$ represents of said cutting feed heat generation amount $Q_C$, in the case where said total heat generation amount $Q_A$ within said predetermined time t and said cutting feed heat generation amount $Q_C$ are larger than said tolerable heat generation amount Qa; and adjustably changing said cutting feed rate of said feed axis from said set cutting feed rate $FV_0$ to said computed cutting feed rate FV.

6. The method of controlling a numerically controlled machine tool according to claim 5, further comprising the steps of:

comparing said computed total heat generation amount $Q_A$ within said predetermined time t with said determined tolerable heat generation amount Qa;

controlling said acceleration/deceleration time constants $\tau_r$ and $\tau_C$ for the rapid and cutting feed operations of said feed axis to approach said set acceleration/ deceleration time constants $\tau_{r0}$ and $\tau_{C0}$ in accordance with the ratio which said rapid feed heat generation amount $Q_R$ and said cutting feed heat generation amount $Q_C$ represent of said total heat generation amount $Q_A$ with said predetermined time t, in the case where said total heat generation amount $Q_A$ within said predetermined time t is smaller than said tolerable heat generation amount Qa;

comparing said computed total heat generation amount $Q_A$ within said predetermined time t and said cutting feed heat generation amount $Q_C$ with said determined tolerable heat generation amount Qa, respectively; and controlling said cutting feed rate FV of said feed axis to approach said set cutting feed rate $FV_0$ in accordance with the ratio which said computed cutting load heat generation amount $Q_{CL}$ represents of said cutting feed heat generation amount $Q_C$, in the case where said total heat generation amount $Q_A$ within said predetermined time t and said cut feed heat generation amount $Q_C$ are smaller than said tolerable heat generation amount Qa, respectively.

7. A method of controlling a numerically controlled machine tool by performing a numerical control program fetched from a read and interpret unit of a numerical control unit to control a drive means of at least one feed axis via an execution command unit, an interpolation unit and a servo control unit, comprising the steps of:

presetting acceleration/deceleration time constants for said feed axis, a cut feed rate, data on a predetermined tolerable temperature of said drive means of said feed axis and data on a tolerable predetermined heat generation amount;

predictively computing temperatures of said drive means at respective moments based on control data of said numerical control program while at the same time computing heat generation amounts at the respective moments;

comparing said computed temperatures with said set predetermined tolerable temperature data;

controlling acceleration/deceleration time constants of said feed axis in accordance with a result of the comparing step while determining a tolerable heat generation amount of said drive means in accordance with said computed temperatures of said drive means at respective moments;

computing a cutting feed heat generation amount during the cutting feed operation of said drive means from said computed heat generation amount at each moment;

computing a cutting load heat generation amount corresponding to a cutting load of said drive means, based on the control data of said numerical control program;

comparing said computed cutting feed heat generation amounts with said determined tolerable heat generation amounts; and controlling said cutting feed rate of said feed axis in accordance with the ratio which said computed cutting load heat generation amount represents of said cutting feed heat generation amount from the result of the comparing step.

8. A method of controlling a numerically controlled machine tool by performing a numerical control program fetched from a read and interpret unit of a numerical control unit to control a drive means of at least one feed axis via an execution command unit, an interpolation unit and a servo control unit, comprising the steps of:

presetting acceleration/deceleration time constants of said feed axis, a cut feed rate, a curve indicating a predetermined tolerable temperature of said drive means of said feed axis and a curve indicating a tolerable predetermined heat generation amount;

computing temperatures at respective moments of said drive means from current data or torque command data transferred from said servo control unit to said drive means to produce a temperature curve thereof and to compute a heat generation amount at the respective moments;

comparing an inclination of said produced temperature curve with that of the temperature curve indicating said set tolerable predetermined temperature;

computing acceleration/deceleration time constants of said feed axis from a relation between the inclination of the temperature curve indicating said set tolerable predetermined temperature and said acceleration/ deceleration time constants to control said acceleration/ deceleration time constants of said feed axis and to determine a tolerable heat generation amount of said drive means in accordance with said computed temperatures at the respective moments, in the case where the inclination of said produced temperature curve is larger than that of the temperature curve indicating said set tolerable predetermined temperature;

computing a cutting feed heat generation amount at the time of cutting feed of said drive means from said computed heat generation amount at the respective moments;

computing a cutting load heat generation amount corresponding to a cutting load of said drive means from the current data or the torque command data output from said servo control unit to said drive means;

comparing said computed cutting feed heat generation amount with said determined tolerable heat generation amount; and controlling the cutting feed rate of said feed axis in accordance with the ratio which said computed cutting load heat generation amount represents of said cutting feed heat generation amount from the result of the afore-comparing step.

9. A method of controlling a numerically controlled machine tool by executing the numerical control program fetched from a read and interpret unit of a numerical control unit to control a drive means of at least one feed axis via an execution command unit, an interpolation unit and a servo control unit, comprising the steps of:

presetting acceleration/deceleration time constants of said feed axis, a cut feed rate, data on a tolerable predetermined temperature of said drive means of said feed axis, data on a tolerable predetermined heat generation amount and tolerable number of times accelerated/ decelerated per unit time;

counting the number of times accelerated/decelerated per unit time of said drive means from a program data output from the read and interpret unit or said execution command unit of said numerical control unit;

comparing the counted number of times accelerated/ decelerated per unit time with said set tolerable number of times accelerated/decelerated per unit time;

computing the acceleration/deceleration time constants of said feed axis from a relation between the set number of times accelerated/decelerated per unit time and the acceleration/deceleration time constants to control said acceleration/deceleration time constants of said feed axis and to compute the cutting load heat generation amount corresponding to the temperature, the heat generation amount and the cutting load at respective moments of said drive means from the current data or the torque command data transferred from said servo control unit to said drive means, in the case where said counted number of times accelerated/decelerated exceeds said tolerable number of times accelerated/decelerated;

determining said tolerable heat generation amount of said drive means in accordance with said computed temperature at the respective moments;

computing a cutting feed heat generation amount during the cutting feed operation of said drive means from said computed heat generation amount at the respective moments;

comparing said computed cutting feed heat generation amount with said determined tolerable heat generation amount; and controlling said cutting feed rate of said feed axis in accordance with the ratio which said computed cutting load heat generation amount represents of said cutting feed heat generation amount from the result of the afore-comparing step.

10. A method of controlling a numerically controlled machine tool by executing the numerical control program fetched from a read and interpret unit of a numerical control unit to control a drive means of at least one feed axis via an execution command unit, an interpolation unit and a servo control unit, comprising the steps of:

presetting acceleration/deceleration time constants of said feed axis, a cut feed rate, data on a predetermined tolerable temperature of said drive means of said feed axis and data on a predetermined tolerable heat generation amount;

detecting temperatures of said drive means;

comparing said detected temperature data with said set tolerable predetermined temperature data;

increasing acceleration/deceleration time constants of said feed axis while computing a cutting load heat generation amount corresponding to a heat generation amount and said cutting load at respective moments of said drive means from current data or torque command data transferred from said servo control unit to said drive means, in the case where said detected temperature data is higher than said set tolerable predetermined temperature data;

determining a tolerable heat generation amount of said drive means in accordance with said detected temperatures;

computing a cut feed heat generation amount during the cutting feed operation of said drive means from said computed heat generation amount at the respective moments;

comparing said computed cutting feed heat generation amount with said determined tolerable heat generation amount; and controlling the cutting feed rate of said feed axis in accordance with the ratio which said computed cutting load heat generation amount represents of said cutting feed heat generation amount from the result of the afore-comparing step.

11. An apparatus for controlling a numerically controlled machine tool by executing the numerical control program fetched from a read and interpret unit of a numerical control unit to control a drive means of at least one feed axis via an execution command unit, an interpolation unit and a servo control unit, comprising:

data storage means for setting and storing acceleration/deceleration time constants for rapid and cut feed operations of the feed axis, data on a tolerable predetermined temperature of said drive means of said feed axis and data on a predetermined tolerable heat generation amount;

temperature computing means for computing a temperature of said drive means based on a control data of said numerical control program;

tolerable heat generation amount determining means for determining the tolerable heat generation amount of said drive means in accordance with the temperature computed by said temperature computing means;

heat generation amount computing means for computing a total heat generation amount within a predetermined time, a rapid feed heat generation amount during the rapid feed operation of said drive means and a cutting feed heat generation amount during the cutting feed operation of said drive means based on a control data of said numerical control program; and acceleration/deceleration time constant computing means for computing and outputting said acceleration/deceleration time constant of said feed axis based on the total heat generation amount within a predetermined time computed by said heat generation computing means, the rapid feed heat generation amount, the cutting feed heat generation amount and the tolerable heat generation amount determined by said tolerable heat generation amount determining means.

12. The apparatus for controlling a numerically controlled machine tool according to claim 11:

wherein said data storage means further sets and stores a cut feed rate of said feed axis; and wherein said apparatus further comprises a cutting feed rate computing means for computing a cutting load of said drive means based on the control data of said numerical control program, and computing and outputting the cutting feed rate of said feed axis based on the cutting load heat generation amount corresponding to said cutting load, the cutting feed heat generation amount computed by said heat generation amount computing means and the tolerable heat generation amount determined by said tolerable heat generation amount determining means.

13. The apparatus for controlling a numerically controlled machine tool according to claim 11, wherein said tolerable predetermined temperature data of said feed axis and said tolerable predetermined heat generation amount data set and stored in said data storage means are data on a rated temperature and a rated heat generation amount when said drive means of said feed axis is operated at a rated current.

14. The apparatus for controlling a numerically controlled machine tool according to claim 11, wherein said tolerable predetermined temperature data and the tolerable predetermined heat generation amount data of said drive means of said feed axis set and stored in said data storage means comprise a predetermined tolerable temperature data higher than a temperature of said temperature curve in a low temperature area of said temperature curve of the temperature data when said drive means of said feed axis at a rated current on one hand and predetermined tolerable heat generation amount data larger than said rated heat generation amount in said low temperature area and converged to the rated heat generation amount when said drive means of said feed axis is operated at the rated current according as said low temperature area transfers to a high temperature area.

15. An apparatus for controlling a numerically controlled machine tool by executing the numerical control program fetched from a read and interpret unit of a numerical control unit to control a drive means of at least one feed axis via an execution command unit, an interpolation unit and a servo control unit, comprising:

data storage means for setting and storing a cutting feed rate of said feed axis, tolerable predetermined temperature data of said drive means of said feed axis, and tolerable predetermined heat generation amount data;

temperature computing means for computing a temperature of said drive means based on a control data of said numerical control program;

tolerable heat generation amount determining means for determining a tolerable heat generation amount of said drive means in accordance with the temperatures computed by said temperature computing means;

heat generation amount computing means for computing a heat generation amount of said drive means based on the control data of said numerical control program; and cutting feed rate computing means for computing a cutting load of said drive means based on the control data of said numerical control program while computing and outputting the cutting feed rate of said feed axis based on the cutting load heat generation amount corresponding to said cutting load, the cutting feed heat generation amount computed by said heat generation amount computing means and the tolerable heat generation amount determined by said tolerable heat generation amount determining means.

16. The apparatus for controlling a numerically controlled machine tool according to claim 15, wherein said data storage means further sets and stores acceleration/deceleration time constants of said feed axis; and wherein said apparatus further comprises:

acceleration/deceleration time constant computing means for computing and outputting the acceleration/deceleration time constants of said feed axis based on the temperatures computed by said temperature computing means and the tolerable predetermined temperature data set in said data storage means.

17. The apparatus for controlling a numerically controlled machine tool according to claim 15, wherein said data storage means further sets and stores a curve indicating acceleration/deceleration time constants of said feed axis and tolerable predetermined temperature of said drive means of said feed axis, and wherein said temperature computing means computes temperatures of said drive means based on a control data of said numerical control program and produces a temperature curve thereof;

said apparatus further comprising acceleration/deceleration time constant computing means for computing and outputting acceleration/deceleration time constants of said feed axis based on an inclination of the temperature curve produced by said temperature computing means and an inclination of a temperature curve indicating tolerable predetermined temperatures set in said data storage means.

18. The apparatus for controlling a numerically controlled machine tool according to claim 15, wherein said data storage means further sets and stores acceleration/deceleration time constants of said feed axis and tolerable number of times accelerated/decelerated per unit time of said drive means of said feed axis; and wherein said apparatus further comprises:

acceleration/deceleration time constant computing means for computing and outputting acceleration/deceleration time constants of said feed axis based on number of times accelerated/decelerated per unit time as counted from the program data output from the read and interpret unit or the execution command unit of said numerical control unit and the tolerable number of times accelerated/decelerated per unit time set in said data storage means.

19. The apparatus for controlling a numerically controlled machine tool according to claim 15, wherein said data storage means further sets and stores acceleration/deceleration time constants of said feed axis; and wherein said apparatus further comprises:

temperature detecting means for detecting temperatures of said drive means of said feed axis and acceleration/deceleration time constant computing means for computing and outputting acceleration/deceleration time constants of said feed axis based on the temperatures detected by said temperature detecting means and the tolerable predetermined temperature data set in said data storage means.

20. A numerically controlled machining apparatus by executing the numerical control program fetched from a read and interpret unit of a numerical control unit to control a drive means of each feed axis via an execution command unit, an interpolation unit and a servo control unit, comprising:

a plurality of feed axes, each including a drive means provided with a servo amplifier and a feed motor;

a mechanical assembly including at least a mechanical element and a moving member coupled to each of said feed axes; and a control unit for controlling the operation of said mechanical assembly;

wherein said control unit comprises:

data storage means for setting and storing acceleration/deceleration time constants for rapid and cutting feed operations of each of said feed axes, a cut feed rate, predetermined tolerable temperature data of each of said drive means and tolerable predetermined heat generation amount data;

temperature computing means for computing by simulation temperatures of said drive means based on the control data of said numerical control program;

tolerable heat generation determining means for determining a tolerable heat generation amount of said drive means in accordance with the temperature computed by said temperature computing means;

heat generation amount computing means for computing a total heat generation amount within a predetermined time of said drive means, a rapid feed heat generation amount at the time of rapid feed, a rapid feed acceleration/deceleration heat generation amount at the time of acceleration/deceleration, a cutting feed heat generation amount at the time of cutting feed and a cutting feed acceleration/ deceleration heat generation amount at the time of acceleration/deceleration from control data of said numerical control unit;

acceleration/deceleration time constant computing means for computing and outputting the acceleration/deceleration time constants of said feed axes based on the total heat generation amount within a predetermined time, the rapid feed heat generation amount, the rapid feed acceleration/deceleration heat generation amount and the cut feed heat generation amount computed by said heat generation amount computing means, and the tolerable heat generation amount determined by said tolerable heat generation determining means; and cutting feed rate computing means for computing a cutting load of each of said drive means based on control data of said numerical control program, and computing and outputting a cutting feed rate of each of said feed axes based on the cutting load heat generation amount corresponding to said cutting load, the cutting feed heat generation amount computed by said heat generation amount computing means and the tolerable heat generation amount determined by said tolerable heat generation determining means.

* * * * *